US011991477B2

(12) United States Patent
Itoh

(10) Patent No.: US 11,991,477 B2
(45) Date of Patent: May 21, 2024

(54) OUTPUT CONTROL APPARATUS, DISPLAY TERMINAL, REMOTE CONTROL SYSTEM, CONTROL METHOD, AND NON-TRANSITORY COMPUTER-READABLE MEDIUM

(71) Applicant: Ricoh Company, Ltd., Tokyo (JP)

(72) Inventor: Atsushi Itoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 87 days.

(21) Appl. No.: 17/563,079

(22) Filed: Dec. 28, 2021

(65) Prior Publication Data

US 2022/0124288 A1 Apr. 21, 2022

Related U.S. Application Data

(62) Division of application No. 16/935,265, filed on Jul. 22, 2020, now Pat. No. 11,228,737.

(30) Foreign Application Priority Data

Jul. 31, 2019 (JP) .................................. 2019-141212
Jul. 31, 2019 (JP) .................................. 2019-141328

(51) Int. Cl.
*H04N 7/18* (2006.01)
*B25J 9/16* (2006.01)
(Continued)

(52) U.S. Cl.
CPC ............ *H04N 7/181* (2013.01); *B25J 9/1689* (2013.01); *B25J 9/1697* (2013.01); *H04L 67/12* (2013.01);
(Continued)

(58) Field of Classification Search
CPC .... H04N 7/181; H04N 13/117; H04N 13/183; H04N 5/23299; H04N 5/23203;
(Continued)

(56) References Cited

U.S. PATENT DOCUMENTS 6,809,760 B1 * 10/2004 Takagi ................. H04N 5/77
348/207.1
2003/0132948 A1 * 7/2003 Bhogal ................ G06F 3/1431
345/660
(Continued)

FOREIGN PATENT DOCUMENTS

JP 2006-270175 A 10/2006
JP 2007-288527 A 11/2007
(Continued)

OTHER PUBLICATIONS

Extended European Search Report dated Dec. 7, 2020 in European Patent Application No. 20 18 7719, 13 pages.
(Continued)

*Primary Examiner* — Joseph Suh
(74) *Attorney, Agent, or Firm* — XSENSUS LLP

(57) ABSTRACT

An output control apparatus is communicable with a communication apparatus through a communication network. The communication apparatus includes a first image capturing device configured to capture a subject at a remote site to acquire a first image and a second image capturing device configure to capture a part of the subject to acquire a second image. The output control apparatus includes circuitry to: receive the first image transmitted from the communication apparatus; output the received first image so as to be displayed on a display; receive, from the communication apparatus, the second image acquired by capturing a part of the subject corresponding to a display position of the first image displayed on the display; output the received second image so as to be displayed on the display; and control the display to display the first image and the second image that are output.

16 Claims, 46 Drawing Sheets

(51) Int. Cl.
| | |
|---|---|
| *H04L 67/12* | (2022.01) |
| *H04N 5/272* | (2006.01) |
| *H04N 13/117* | (2018.01) |
| *H04N 13/183* | (2018.01) |
| *H04N 23/66* | (2023.01) |
| *H04N 23/695* | (2023.01) |
| *H04N 23/698* | (2023.01) |
| *H04N 23/90* | (2023.01) |

(52) U.S. Cl.
CPC ........... *H04N 5/272* (2013.01); *H04N 13/117* (2018.05); *H04N 13/183* (2018.05); *H04N 23/66* (2023.01); *H04N 23/695* (2023.01); *H04N 23/698* (2023.01); *H04N 23/90* (2023.01)

(58) Field of Classification Search
CPC .... H04N 5/23238; H04N 5/247; H04N 5/272; H04N 7/185; H04N 7/147; H04N 7/142; H04N 23/66; H04N 23/695; H04N 23/698; H04N 23/90; B25J 9/1689; B25J 9/1697; B25J 5/005; B25J 19/023; H04L 67/12; G05B 2219/40617; G05B 2219/40298; G05D 2201/0207; G05D 1/0038
See application file for complete search history.

(56) References Cited

U.S. PATENT DOCUMENTS

| | | | | |
|---|---|---|---|---|
| 2004/0100563 | A1* | 5/2004 | Sablak | H04N 23/611 348/E7.087 |
| 2006/0092181 | A1* | 5/2006 | Park | H04N 23/69 345/660 |
| 2007/0078566 | A1* | 4/2007 | Wang | A61B 34/70 700/259 |
| 2007/0165033 | A1* | 7/2007 | Matsuno | H04N 7/18 345/475 |
| 2008/0123903 | A1* | 5/2008 | Matsuo | G01C 15/00 382/106 |
| 2008/0239102 | A1* | 10/2008 | Okada | H04N 23/661 348/240.99 |
| 2009/0013262 | A1* | 1/2009 | Hamaguchi | G06Q 10/10 715/751 |
| 2009/0147090 | A1* | 6/2009 | Miki | G06T 5/003 348/208.1 |
| 2011/0228985 | A1* | 9/2011 | Uchida | G06T 7/215 382/103 |
| 2011/0298885 | A1* | 12/2011 | Root | H04N 7/142 348/E7.083 |
| 2012/0094754 | A1* | 4/2012 | Suzuki | A63F 13/655 463/43 |
| 2012/0229507 | A1* | 9/2012 | Hayashi | A63F 13/26 345/632 |
| 2013/0215146 | A1* | 8/2013 | Kusakabe | G02B 21/365 345/619 |
| 2014/0085661 | A1* | 3/2014 | Nakajo | H04N 1/00026 358/1.14 |
| 2014/0316611 | A1* | 10/2014 | Parente Da Silva | G06T 7/70 701/2 |
| 2015/0208070 | A1* | 7/2015 | Verzijp | H04N 19/172 375/240.02 |
| 2016/0046024 | A1 | 2/2016 | Wang et al. | |
| 2016/0088287 | A1* | 3/2016 | Sadi | H04N 5/265 348/43 |
| 2016/0196030 | A1* | 7/2016 | Kim | G06F 3/04817 715/781 |
| 2016/0277772 | A1* | 9/2016 | Campbell | G06T 19/006 |
| 2017/0220879 | A1 | 8/2017 | Nakamura et al. | |
| 2017/0257576 | A1* | 9/2017 | Mitsui | H04N 23/63 |
| 2018/0009108 | A1* | 1/2018 | Yamamoto | B25J 9/1664 |
| 2018/0013957 | A1* | 1/2018 | Irie | H04N 23/62 |
| 2018/0104591 | A1* | 4/2018 | Fukuda | G06F 3/0488 |
| 2018/0107863 | A1* | 4/2018 | Wang | H04N 13/305 |
| 2018/0177561 | A1* | 6/2018 | Mintz | A61B 5/107 |
| 2018/0210442 | A1 | 7/2018 | Guo et al. | |
| 2018/0247457 | A1* | 8/2018 | Nadler | G06F 3/012 |
| 2018/0279847 | A1* | 10/2018 | Park | A47L 9/2868 |
| 2018/0329609 | A1* | 11/2018 | De Swarte | G06T 19/00 |
| 2018/0332219 | A1* | 11/2018 | Corcoran | G06V 10/751 |
| 2019/0011981 | A1* | 1/2019 | Noguchi | G06F 3/017 |
| 2019/0089643 | A1* | 3/2019 | Westphal | H04N 21/44209 |
| 2019/0101405 | A1* | 4/2019 | Feng | G08G 1/0969 |
| 2019/0149744 | A1 | 5/2019 | Fukunaga | |
| 2019/0205003 | A1* | 7/2019 | Kim | G06F 3/0485 |
| 2019/0289201 | A1* | 9/2019 | Nishimura | H04N 23/62 |
| 2019/0289203 | A1* | 9/2019 | Suitoh | H04N 23/90 |
| 2020/0007751 | A1 | 1/2020 | Itoh et al. | |
| 2020/0036892 | A1 | 1/2020 | Araumi et al. | |
| 2020/0084432 | A1* | 3/2020 | Ravirala | H04N 13/271 |

FOREIGN PATENT DOCUMENTS

| | | |
|---|---|---|
| JP | 2013-112030 A | 6/2013 |
| JP | 2016-031576 A | 3/2016 |
| JP | 2017-41780 A | 2/2017 |
| JP | 2017-218105 A | 12/2017 |
| JP | 2019-087974 A | 6/2019 |
| JP | 2019-114194 A | 7/2019 |
| JP | 2020-005146 A | 1/2020 |
| JP | 2020-017829 A | 1/2020 |
| JP | 2020-022152 A | 2/2020 |
| KR | 10-2016-0094168 A | 8/2016 |

OTHER PUBLICATIONS

Office Action dated May 16, 2023, in corresponding Japanese Patent Application No. 2019-141212, 7pp.
Office Action dated May 16, 2023 in Japanese Patent Application No. 2019-141328, 7 pages.
Office Action dated Aug. 1, 2023 in Japanese Patent Application No. 2019-141328, 7 pages.

* cited by examiner

HEMISPHERICAL IMAGE
(FRONT SIDE)

HEMISPHERICAL IMAGE
(BACK SIDE)

CAPTURED IMAGE
(EQUIRECTANGULAR PROJECTION IMAGE EC)

FIG. 16B
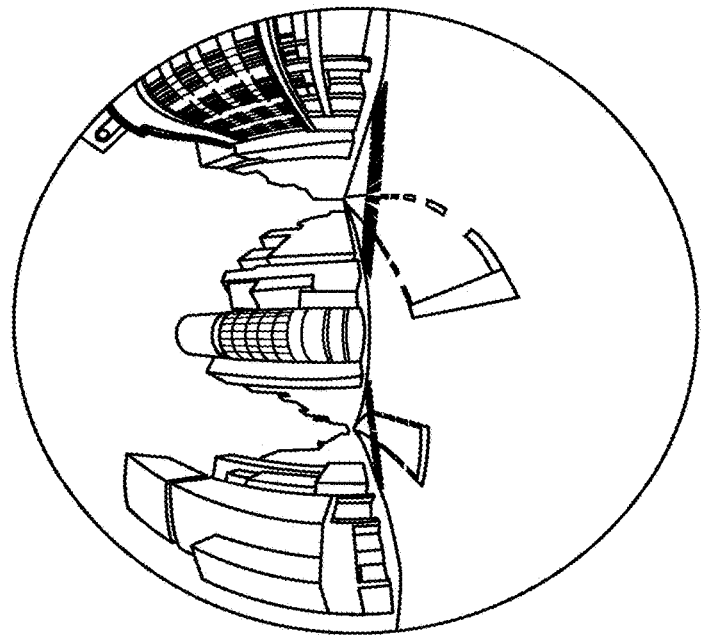
SPHERICAL IMAGE CE
FIG. 16A
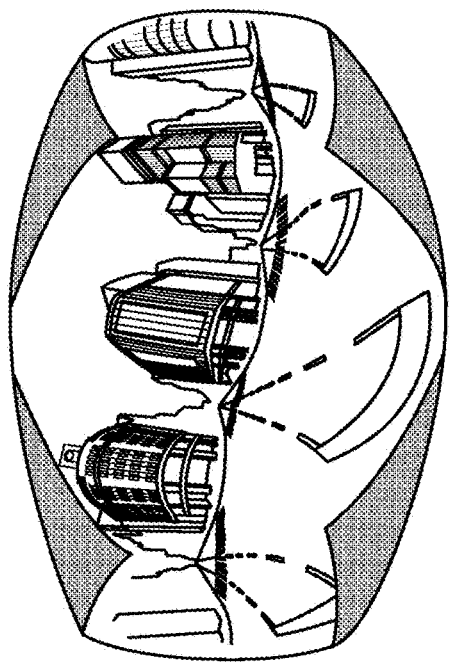 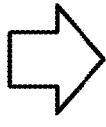 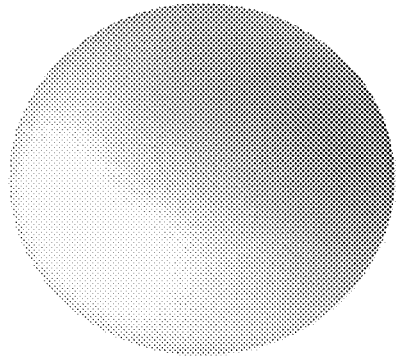
EQUIRECTANGULAR PROJECTION IMAGE EC

FIG. 21A
COMMAND MANAGEMENT TABLE

| COMMAND | VARIABLES | PROCESSING |
|---|---|---|
| MOVE | L, R | ROTATE THE LEFT WHEEL BY L DEGREES, ROTATE THE RIGHT WHEEL BY R DEGREES |
| AIM | H, V, Z | MOVE THE IMAGING DIRECTION OF THE GENERIC IMAGE CAPTURING DEVICE 24 SO THAT THE IMAGING DIRECTION IS THE HORIZONTAL ANGLE H DEGREES AND THE VERTICAL ANGLE V DEGREES WITH RESPECT TO THE FRONT OF THE ROBOT 10, CHANGE THE ZOOM AMOUNT TO Z% |
| LOOK | H, V, Z | THE DIRECTION (V, H) IN THE SPHERICAL IMAGE VIEWED BY THE OPERATOR, ZOOM AMOUNT Z% |
| FPS | F | IMAGE CAPTURING BY THE SPECIAL IMAGE CAPTURING DEVICE (FPS: F) |
| RESOLUTION | P | IMAGE CAPTURING BY THE SPECIAL IMAGE CAPTURING DEVICE (RESOLUTION; P% OF INITIAL STATE) |

FIG. 21B
IMAGE CAPTURING PARAMETER MANAGEMENT TABLE

| ITEM | PARAMETER |
|---|---|
| FPS(FRAME RATE) | 30 |
| RESOLUTION | 100% |
| AIM(H, V, Z) | (-22.2, 10.0, 22.3) |

FIG. 22A
STATE INFORMATION MANAGEMENT TABLE

| VARIABLE NAME | ITEM NAME | PARAMETER | RANGE |
|---|---|---|---|
| DRIVE_H_ANGLE | DRIVE DIRECTION OF ROBOT (HORIZONTAL DIRECTION) | 30° | 0° to 360° |
| DRIVE_V_ANGLE | DRIVE DIRECTION OF ROBOT (VERTICAL DIRECTION) | 45° | -90° to 90° |
| DRIVE_SPEED | DRIVE SPEED OF ROBOT | 3.0km/h | 0km/h to |
| CAMERA_H_ANGLE | CURRENT ORIENTATION OF GENERIC IMAGE CAPTURING DEVICE 24 (HORIZONTAL ANGLE) | -22.2° | -170° to 170° |
| CAMERA_V_ANGLE | CURRENT ORIENTATION OF GENERIC IMAGE CAPTURING DEVICE 24 (VERTICAL ANGLE) | 10.0° | -85° to 85° |
| CAMERA_ZOOM | ZOOM AMOUNT OF GENERIC IMAGE CAPTURING DEVICE 24 | 22.3% | 0 to 100% |

FIG. 22B
CONDITION INFORMATION MANAGEMENT TABLE

| CONDITION | PROCESSING CONTENT | COMMAND |
|---|---|---|
| SPEED > 5.0 km/h | WHEN THE DRIVE SPEED EXCEEDS 5.0km/h, REDUCE THE FRAME RATE BY 3 | FPS(3) |
| SPEED ≤ 5.0 km/h | WHEN THE DRIVE SPEED IS EQUAL TO OR LESS THAN 5.0km/h, SET THE FRAME RATE BACK TO THE INITIAL STATE | FPS(30) |
| SPEED > 1.0 km/h | WHEN THE DRIVE SPEED EXCEEDS 1.0km/h, REDUCE THE RESOLUTION BY 50% | RESOLUTION(50%) |
| SPEED ≤ 1.0 km/h | WHEN THE DRIVE SPEED IS EQUAL TO OR LESS THAN 1.0km/h, SET THE RESOLUTION BACK TO THE INITIAL STATE | RESOLUTION(100%) |
| SPEED > 2.0 km/h | WHEN THE DRIVE SPEED EXCEEDS 2.0km/h, ZOOM OUT THE DISPLAY OF THE SPHERICAL IMAGE | ZOOM = 10 |
| SPEED ≤ 2.0 km/h | WHEN THE DRIVE SPEED IS EQUAL TO OR LESS THAN 2.0km/h, SET THE ZOOM AMOUNT OF THE SPHERICAL IMAGE TO THE INITIAL STATE | ZOOM = 0 |
| THE DISPLAY POSITION OF THE SPHERICAL IMAGE AND THE IMAGING POSITION OF THE GENERIC IMAGE CAPTURING DEVICE 24 ARE CLOSE TO EACH OTHER | SWITCH DISPLAY FROM THE SPHERICAL IMAGE TO THE DETAILED IMAGE | |

FIG. 23A

USER COMMAND MANAGEMENT TABLE

| INPUT COMMAND | PROCESSING | TYPE OF PROCESSING |
|---|---|---|
| PRESS "↑ (FORWARD)" KEY | MOVE(10.0, 10.0) | TRANSMIT REQUEST COMMAND |
| PRESS "↓ (BACKWARD)" KEY | MOVE(-8.0, -8.0) | TRANSMIT REQUEST COMMAND |
| PRESS "→ (RIGHT ROTATION)" KEY | MOVE(5.0, -5.0) | TRANSMIT REQUEST COMMAND |
| PRESS "← (RIGHT ROTATION)" KEY | MOVE(-5.0, 5.0) | TRANSMIT REQUEST COMMAND |
| MOUSE MOVEMENT | LOOK(H, V, Z) | TRANSMIT REQUEST COMMAND CHANGE DISPLAY POSITION SPHERICAL IMAGE |
| STOP AFTER MOUSE MOVEMENT | AIM(H, V, Z) | TRANSMIT REQUEST COMMAND |

FIG. 23B

DISPLAY STATE MANAGEMENT TABLE

| IMAGE TYPE | PARAMETER |
|---|---|
| SPHERICAL IMAGE | (22.0, 15.0, 50) |
| DETAILED IMAGE | (-22.2, 10.0, 22.3) |

FIG. 24A

AUTHENTICATION MANAGEMENT TABLE

| TERMINAL ID | PASSWORD |
|---|---|
| o01 | aaaa |
| o02 | abab |
| o03 | baba |
| ... | ... |

FIG. 24B

TERMINAL MANAGEMENT TABLE

| TERMINAL ID | TERMINAL NAME | IP ADDRESS | OPERATING STATE | SITE NAME |
|---|---|---|---|---|
| o01 | DISPLAY TERMINAL 50A | 1.2.1.3 | ONLINE (BUSY) | – |
| o02 | DISPLAY TERMINAL 50B | 1.2.1.4 | ONLINE (BUSY) | – |
| o03 | DISPLAY TERMINAL 50C | 1.2.2.3 | OFFLINE | – |
| ... | ... | ... | ... | ... |
| rA01 | ROBOT10A-1 | 1.3.2.3 | ONLINE (READY) | SITE A |
| rA02 | ROBOT10A-2 | 1.3.2.4 | ONLINE (READY) | SITE A |
| ... | ... | ... | ... | ... |
| rB01 | ROBOT10B-1 | 1.4.2.3 | ONLINE (BUSY) | SITE B |
| rB02 | ROBOT10B-2 | 1.4.2.4 | ONLINE (BUSY) | SITE B |
| ... | ... | ... | ... | ... |
| rC01 | ROBOT10C-1 | 1.3.3.3 | OFFLINE | SITE C |
| rC02 | ROBOT10C-2 | 1.3.3.4 | OFFLINE | SITE C |
| ... | ... | ... | ... | ... |

FIG. 25A

DESTINATION LIST MANAGEMENT TABLE

| TERMINAL ID OF DISPLAY TERMINAL | TERMINAL ID OF DESTINATION CANDIDATE |
|---|---|
| o01 | rA01,rA02,rC01 |
| o02 | rB01,rB02 |
| o03 | rA01,rB02 |
| ... | ... |

FIG. 25B

SESSION MANAGEMENT TABLE

| SESSION ID | TERMINAL ID |
|---|---|
| se1 | o01,rA02,rC01 |
| se2 | o02,rA01,rB02 |
| se3 | o01,rA01 |
| ... | ... |

FIG. 31

| VARIABLE NAME | PARAMETER |
|---|---|
| DRIVE_H_ANGLE | 30° |
| DRIVE_V_ANGLE | 45° |
| DRIVE_SPEED | 3.0km/h |
| CAMERA_H_ANGLE | -22.2° |
| CAMERA_V_ANGLE | 10.0° |
| CAMERA_ZOOM | 22.3% |

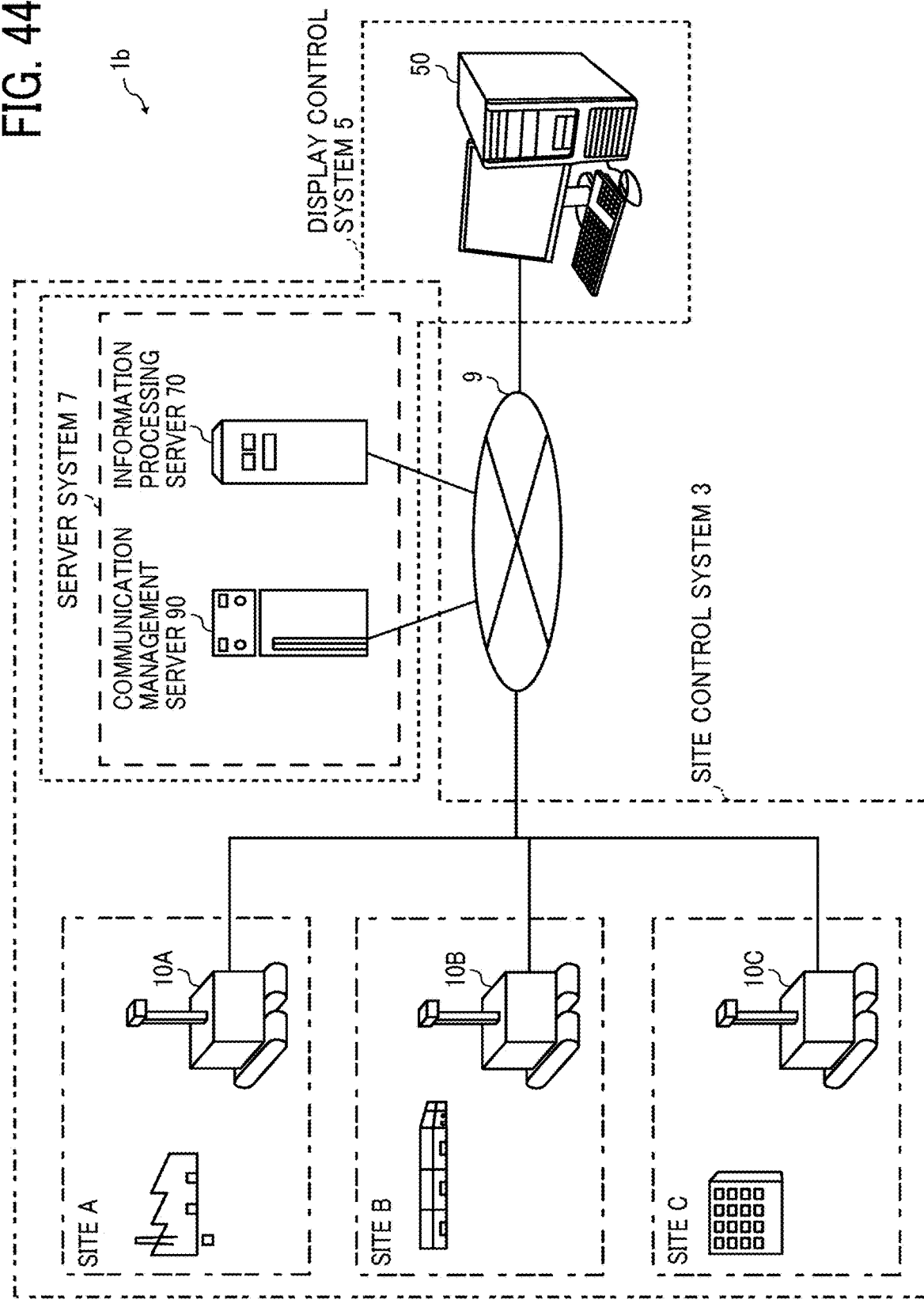

OUTPUT CONTROL APPARATUS, DISPLAY TERMINAL, REMOTE CONTROL SYSTEM, CONTROL METHOD, AND NON-TRANSITORY COMPUTER-READABLE MEDIUM

CROSS-REFERENCE TO RELATED APPLICATIONS

The present application is a divisional of U.S. application Ser. No. 16/935,265, filed Jul. 22, 2020, which claims priority pursuant to 35 U.S.C. § 119(a) to Japanese Patent Application Nos. 2019-141212, filed on Jul. 31, 2019, and 2019-141328, filed on Jul. 31, 2019, in the Japan Patent Office, the entire disclosures of each are hereby incorporated by reference herein.

BACKGROUND

Technical Field

The present disclosure relates to an output control apparatus, a display terminal, a remote control system, a control method, and a non-transitory computer readable medium.

Description of the Related Art

A remote control system is known in which a telepresence robot (hereinafter, referred to as a "robot" in order to simplify the description) provided at a remote site is remotely controlled using a display terminal located at a different site through a communication network. This remote control system controls the display terminal to display an image captured by an image capturing device provided at the robot, whereby allowing a user to check information of the site where the robot is provided from a remote location.

Another technique is known that uses a robot provided with different types of image capturing devices, to allow a user to check surroundings of the robot in more detail. For example, a radio-controlled mobile object is known that includes a front camera and a rear camera that images the front and the rear of a traveling apparatus and an overhead camera that can image the entire surroundings around the mobile object.

SUMMARY

According to an embodiment, an output control apparatus is communicable with a communication apparatus through a communication network. The communication apparatus includes a first image capturing device configured to capture a subject at a remote site to acquire a first image and a second image capturing device configure to capture a part of the subject to acquire a second image. The output control apparatus includes circuitry to: receive the first image transmitted from the communication apparatus; output the received first image so as to be displayed on a display; receive, from the communication apparatus, the second image acquired by capturing a part of the subject corresponding to a display position of the first image displayed on the display; output the received second image so as to be displayed on the display; and control the display to display the first image and the second image that are output.

BRIEF DESCRIPTION OF THE SEVERAL VIEWS OF THE DRAWINGS

A more complete appreciation of the disclosure and many of the attendant advantages and features thereof may be readily obtained and understood from the following detailed description with reference to the accompanying drawings, wherein:

FIG. 16A is a conceptual diagram illustrating an example of how an equirectangular projection image maps to a surface of a sphere, according to an embodiment of the present disclosure;

FIG. 16B is an illustration of a spherical image, according to an embodiment of the present disclosure;

FIG. 21A is a conceptual diagram illustrating an example of a command management table, according to an embodiment of the present disclosure;

FIG. 21B is a conceptual diagram illustrating an example of an image capturing parameter management table, according to an embodiment of the present disclosure;

FIG. 22A is a conceptual diagram illustrating an example of a state information management table, according to an embodiment of the present disclosure;

FIG. 22B is a conceptual diagram illustrating an example of a condition information management table, according to an embodiment of the present disclosure;

FIG. 23A is a conceptual diagram illustrating an example of a user command management table, according to an embodiment of the present disclosure;

FIG. 23B is a conceptual diagram illustrating an example of a display state management table, according to an embodiment of the present disclosure;

FIG. 24A is a conceptual diagram illustrating an example of an authentication management table, according to an embodiment of the present disclosure;

FIG. 24B is a conceptual diagram illustrating an example of a terminal management table, according to an embodiment of the present disclosure;

FIG. 25A is a conceptual diagram illustrating an example of a destination list management table, according to an embodiment of the present disclosure;

FIG. 25B is a conceptual diagram illustrating an example of a session management table, according to an embodiment of the present disclosure;

FIG. 31 is a diagram illustrating an example of state information indicating a state of the robot, according to an embodiment of the present disclosure;

FIG. 44 is a diagram illustrating an example of a system configuration of a remote control system, according to a variation of an embodiment of the present disclosure;

Figure 1:
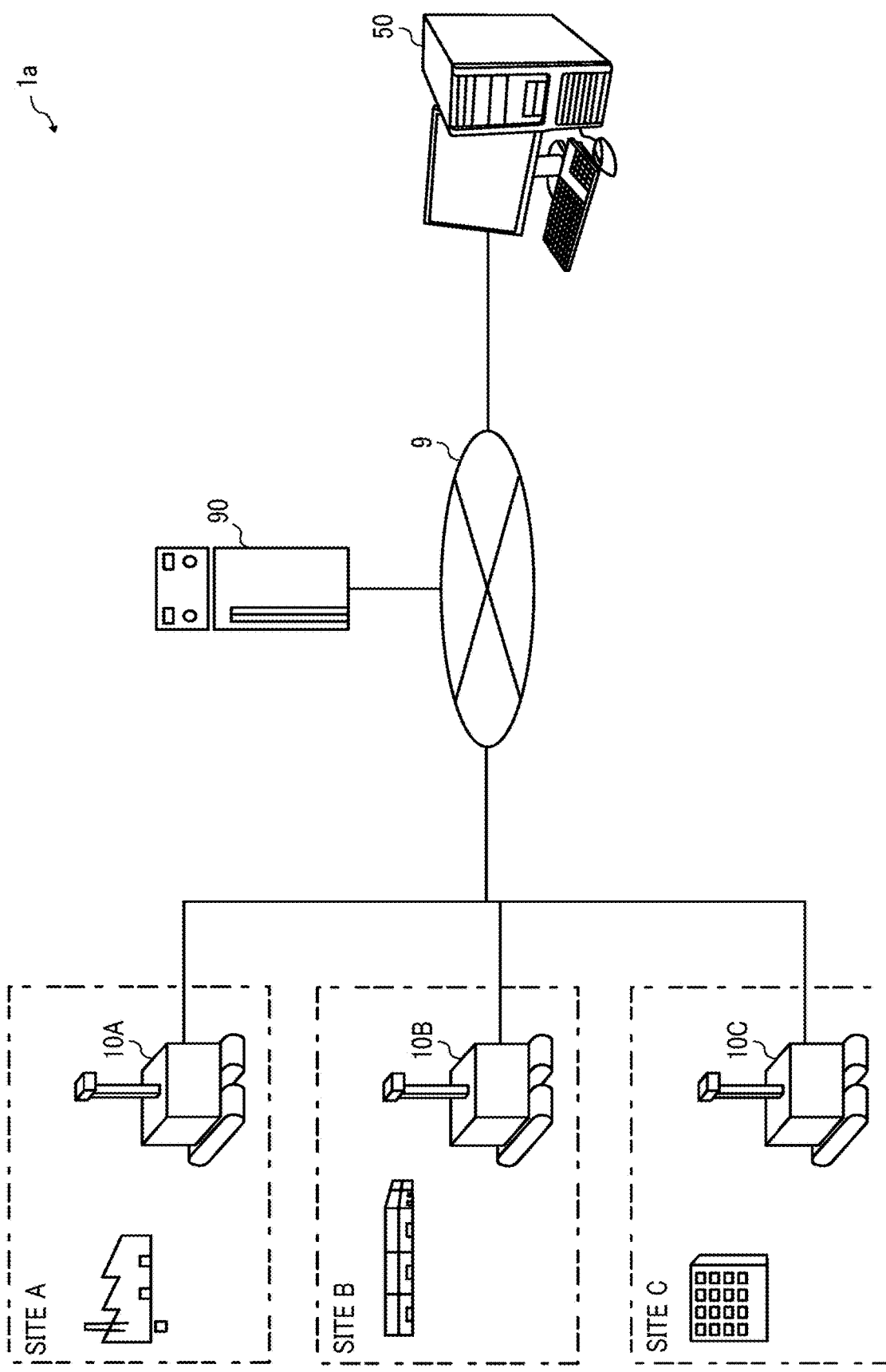
FIG. 1 is a diagram illustrating an example of a system configuration of a remote control system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described with reference to the drawings. In the description of the drawings, the same elements are denoted by the same reference numerals, and redundant descriptions thereof are omitted.

System Configuration:

FIG. 1 is a diagram illustrating an example of a system configuration of a remote control system, according to an embodiment. The remote control system illustrated in FIG. 1 allows robots 10 located at different sites and a display terminal 50 used by an administrator located at a remote place to perform remote communication, to perform management or maintenance of devices of apparatuses in the sites or check the position or movement route of persons who are in the sites.

The remote control system 1a includes robots 10A, 10B, 10C respectively located at a plurality of sites (site A, site B, site C), a display terminal 50, and a communication management server 90. The robots 10A, 10B, and 10C are collectively referred to as a "robot 10" or "robots 10", unless they need to be distinguished from each other. The robots 10, the display terminal 50, and the communication management server 90 are communicably connected through a communication network 9. The communication network 9 is implemented by, for example, a local area network (LAN), a dedicated line, the Internet, etc. The communication network 9 may not only include a wired network, but also a wireless network such as a network in compliance with Wi-Fi (registered trademark) or the like.

The robots 10 are mobile objects that are respectively provided in the sites (site A, site B, site C) and autonomously travel in accordance with remote control from the display terminal 50. Each of the robots 10 moves in the site while imaging subjects in a wide range around the robot 10 by a special image capturing device 21 described below, and transmits a spherical image acquired by the special image capturing device 21 to the display terminal 50, whereby providing information (image) in the site to an operator who operates the robot 10 using the display terminal 50. Further, each of the robots 10 captures a part of the subjects captured by the special image capturing device 21 by using a generic image capturing device 24 described below, and transmits a detailed image acquired by the generic image capturing device 24 to the display terminal 50, whereby providing detailed information (image) of a particular area in the site to the operator who operates the robot 10 using the display terminal 50. The robot 10 is an example of a mobile object.

The display terminal 50 is a terminal apparatus such as a personal computer (PC) configured to remotely control the robot 10 provided at each of the sites (site A, site B, site C). The display terminal 50 displays the spherical image or the detailed image transmitted from the robot 10. The operator can remotely operate the robot 10 while viewing the image displayed on the display terminal 50. The display terminal 50 is an example of an output control apparatus.

The display terminal 50 is any suitable apparatus, provided that it includes display means configured to display the image transmitted from the robot 10. Examples of the display terminal 50 include, but not limited to, a tablet terminal, a mobile phone, a smartphone, a wearable terminal such as a head-mounted display (HMD), a communication terminal provided with a wide-angle screen (cylindrical, spherical, semi-spherical screen, etc.), and a personal digital assistant (PDA).

The communication management server 90 is a server computer configured to manage communication between each of the robots 10 located at different sites and the display terminal 50. The communication management server 90 is connected to each of the robots 10 and the display terminal 50 through the communication network 9. In one example, the communication management server 90 is configured as a single computer. In another example, the communication management server 90 is configured as a plurality of computers to which divided portions (functions, means, or storages) are arbitrarily allocated.

Examples of the site where the robot 10 is provided include, but not limited to, an office, a school, a warehouse, a factory, and a construction site. The operator who operates the robot 10 by using the display terminal 50 checks the image of the site transmitted from the robot 10, to recognize the position or movement route of a person who is present in the site and to perform management and maintenance of an apparatus provided in the site. Further, the robot 10 and the display terminal 50 exchange images captured by both of them, to perform bidirectional communication (remote conference).

Although in FIG. 1, the description is given of the configuration in which one robot 10 is provided in each site, no limitation is intended thereby. In another example, plural robots 10 are provided in one site. Further, in one example, the display terminal 50 is configured to communicate with each of the robots 10 provided at plural sites. In another example, the display terminal 50 is configured to communicate only with the robot 10 provided in one site.

Figure 2:
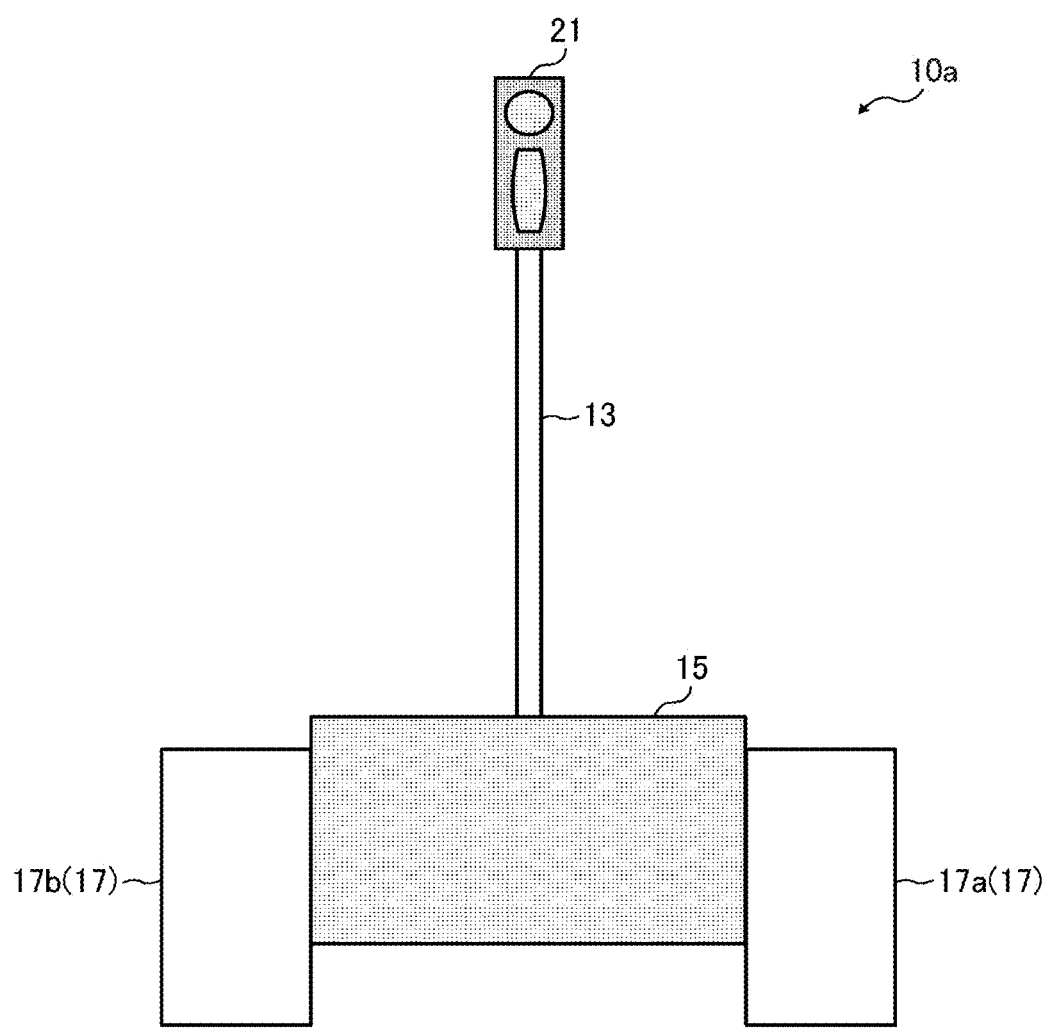
FIG. 2 is a diagram illustrating an example of a schematic configuration of a robot, according to an embodiment of the present disclosure.
Figure 3:
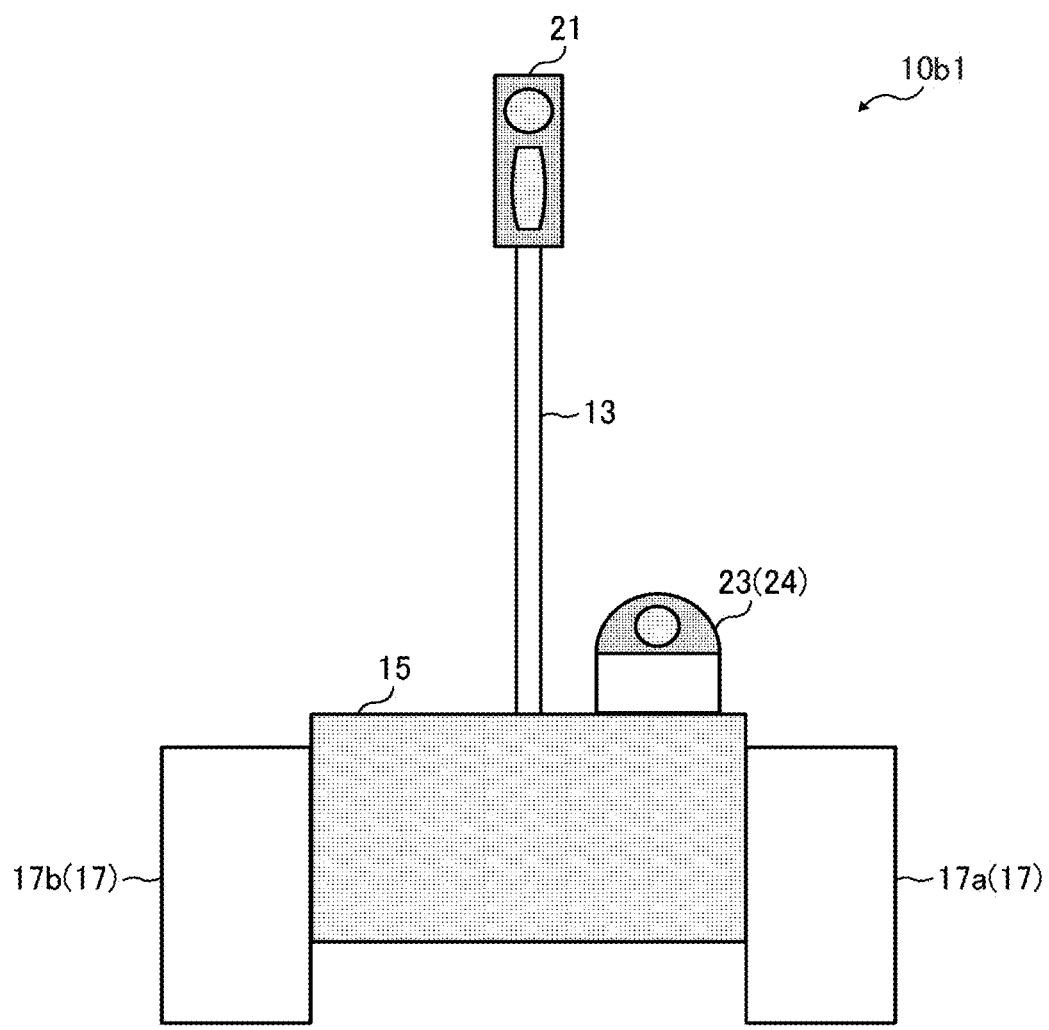
FIG. 3 is a diagram illustrating a variation 1 (1-1) of a schematic configuration of the robot, according to an embodiment of the present disclosure.

Configuration of Robot:

A description is now given of a detailed configuration of the robot 10 illustrated in FIG. 1, with reference to FIG. 2 to FIG. 10A, FIG. 10B, and FIG. 10C. FIG. 2 is a diagram illustrating an example of a schematic configuration of the robot, according to an embodiment.

The robot 10a illustrated in FIG. 2 includes the special image capturing device 21, a housing 15 including a control device 30 configured to control the processing or operation of the robot 10a, a movement mechanism 17a and a movement mechanism 17b, each being configured to move the robot 10a, and a support 13. The movement mechanism 17a and the movement mechanism 17b are hereinafter collectively referred to as a "movement mechanism 17", unless they need to be distinguished from each other.

The special image capturing device 21 is an image capturing device configured to photograph a subject such as a person, an object, and a landscape to obtain a spherical (360 degrees) panoramic image. The special image capturing device 21 is a special digital camera, which captures an image of a subject to obtain two hemispherical images, from which a spherical (panoramic) image is generated. A detailed description is given later of the spherical image captured by the special image capturing device 21 and the hemispherical images, from which the spherical image is generated, with reference to FIG. 15A, FIG. 15B, FIG. 15C to FIG. 19. The special image capturing device 21 is an example of image capturing means (first image capturing means) for capturing an image of a subject in a remote site.

The robot 10a transmits spherical image data, which is data of the spherical image acquired by the special image capturing device 21, to the display terminal 50. The image of the spherical image data is a moving image (video or a still image, or both of the moving image (video) and the still image. Further, the spherical image data may include sound data as well as image data.

The spherical image is one example of an image acquired by the special image capturing device 21. Another example of the image acquired by the special image capturing device 21 is a wide-angle image having an angle of view of a predetermined value or more. In this case, the wide-angle image is acquired by a wide-angle camera, a stereo camera, or the like. In other words, the special image capturing device 21 is image capturing means configured to acquire an image, such as a spherical image and a wide-angle image, photographed by using a lens having a focal length shorter than a predetermined value. The image (the spherical image or the wide-angle image) acquired by the special image capturing device 21 is an example of a first image. In the following embodiments, a description is given of an example in which an image acquired by the special image capturing device 21 is a spherical image.

The housing 15 is provided in the body of the robot 10a. The housing 15 includes a power supply unit that supplies necessary power to the robot 10a in its entirety and the control device 30 that controls the processing or operation of the robot 10a, which are built in the housing 15.

The support 13 is a member that mounts (fixes) the special image capturing device 21 on the robot 10a (housing 15). Examples of the support 13 include, but not limited to, a pole or the like fixed to the housing 15, and a base fixed to the housing 15. In another example, the support 13 is a movable member configured to adjust the imaging direction (orientation) and position (height) of the special image capturing device 21. In the robot 10a illustrated in FIG. 2, since the special image capturing device 21 is fixed by the support 13, the special image capturing device 21 always faces the same direction as the drive direction of the robot 10a. This makes it easy for the operator who operates the robot 10 to perform the operation while viewing the spherical image acquired by the special image capturing device 21.

The movement mechanism 17 is a unit that causes the robot 10a to move, and includes, but not limited to, wheels, a traveling motor, a traveling encoder, a steering motor, and a steering encoder. Since the movement control of the robot 10a is an existing technique, detailed description thereof is omitted herein. The robot 10a receives a traveling instruction from the operator (display terminal 50), and the movement mechanism 17 moves the robot 10 based on the received traveling instruction.

In the embodiment, a description is given of an example in which the movement mechanism 17 includes two wheels. In another example, the movement mechanism 17 is a bipedal type or a single wheel type. In addition, the shape of the robot 10a is not limited to the vehicle type as illustrated in FIG. 2. In another example, the robot 10a is a bipedal humanoid type, or has a shape imitating a living thing, a shape imitating a particular character, or the like.

Variations of Robot Configuration:

Variation 1:

A description is now given of Variation 1 of the configuration of the robot 10, with reference to FIG. 3 and FIG. 4A to FIG. 4C. The robot 10b (10b1 to 10b4) illustrated in FIG. 3 and FIG. 4A to 4C includes, in addition to the configuration of the robot 10a illustrated in FIG. 2, the generic image capturing device 24 that is movable and photographs a part of the subject photographed by the special image capturing device 21 to acquire a detailed image. Such generic image capturing device 24 that is movable is hereinafter referred to as a "movable camera 23". The movable camera 23 is one type of example of the generic image capturing device 24. The movable camera 23 illustrated in FIG. 3 and FIG. 4A to 4C is a movable generic image capturing device that includes a built-in movement mechanism, and is configured to acquire an image in a desired direction and to zoom-in and zoom-out. In the robot 10b1 illustrated in FIG. 3, the movable camera 23 is mounted on the housing 15.

In the disclosure, the generic image capturing device 24 is a digital camera configured to acquire a flat image (detailed image), such as a digital single-lens reflex camera and a compact digital camera. The generic image capturing device 24 is an example of second image capturing means. The robot 10b transmits data of the detailed image acquired by the generic image capturing device 24 (movable camera 23) to the display terminal 50. The detailed image acquired by the generic image capturing device 24 is an image acquired by photographing a part of the object photographed by the special image capturing device 21 at an angle of view of a predetermined value or more. In other words, the generic image capturing device 24 is image capturing means configured to acquire an image (detailed image) photographed using a lens having a longer focal length than the lens of the special image capturing device 21. The image (detailed image, flat image) acquired by the generic image capturing device 24 is an example of a second image.

The display terminal 50 displays the spherical image that allows the operator of the robot 10b to view the surroundings of the robot 10b in a wide range, when the robot 10b is moved by remote control by the operator, for example. Further, the display terminal 50 displays the detailed image acquired by the generic image capturing device 24 when the operator of the robot 10b wants to check detailed information of a particular area included in the spherical image. In other words, the special image capturing device 21 is an example of image capturing means configured to perform a photographing process to acquire an image (the spherical image or the wide-angle image) that allows the operator of the robot 10 to check the surroundings around the robot 10b in a wide range. The generic image capturing device 24 is an example of image capturing means configured to perform a photographing process to acquire an image (the detailed image) that allows the operator of the robot 10b to check the state of a specific part around the robot 10b in detail. This allows the operator of the robot 10b to select the spherical image or the detailed image to be displayed on the display terminal 50 according to applications. Thus, the operability of the operator of the robot 10 is improved.

Figure 4A:
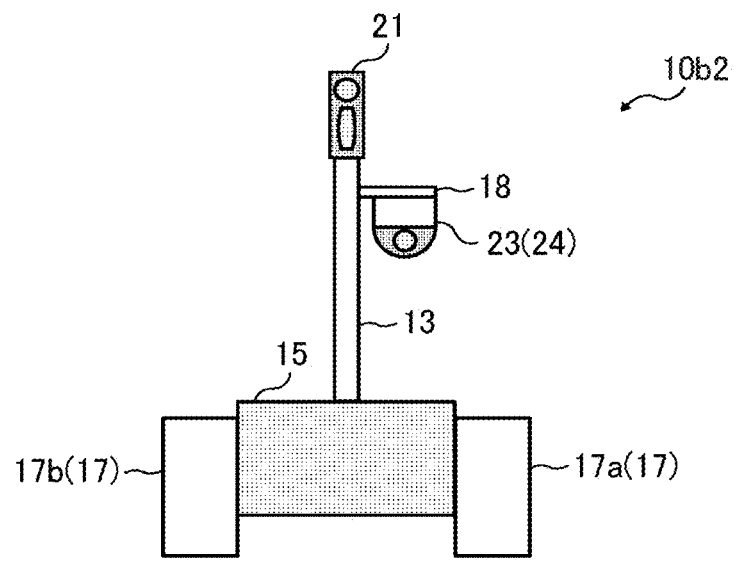
FIG. 4A, FIG. 4B and FIG. 4C are diagrams illustrating a variation 1 (1-2) of a schematic configuration of the robot, according to an embodiment of the present disclosure.

The robot 10b2 illustrated in FIG. 4A includes the movable camera 23 mounted downward on a mount member 18, which is fixed to the support 13. There is a blind spot where the movable camera 23 cannot photograph an object. In the case of the robot 10b1 illustrated in FIG. 3, the downward direction of the robot 10b1 is a blind spot of the movable camera 23. This makes it difficult for the operator to recognize obstacles when moving the robot 10b1. To address such issue, the movable camera 23 is mounted on the robot 10b2 downward to eliminate the downward blind spot. Further, the robot 10b3 illustrated in FIG. 4B includes a movable camera 23a mounted upward and a movable camera 23b mounted downward on the mount member 18 fixed to the support 13. With such configuration, the robot 10b3 photographs both the upward direction and the downward direction of the robot 10b2 using the movable camera 23a and the movable camera 23b, whereby further reducing the blind spot of the imaging position.

Figure 4B:
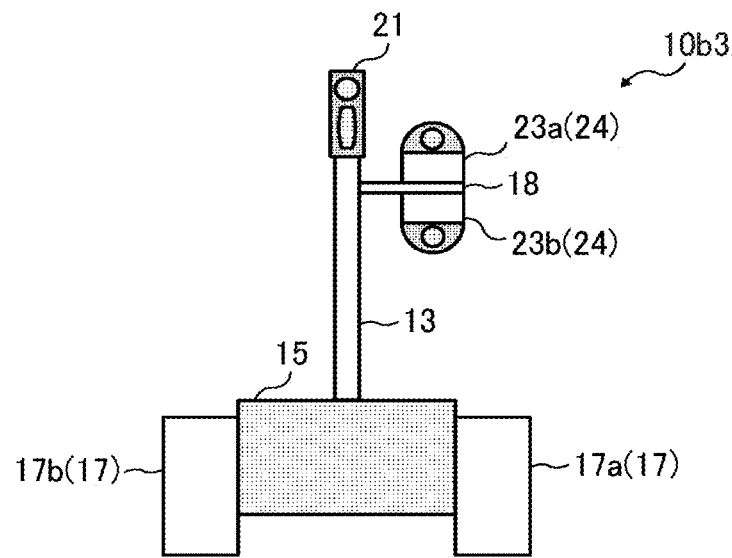
Figure 4C:
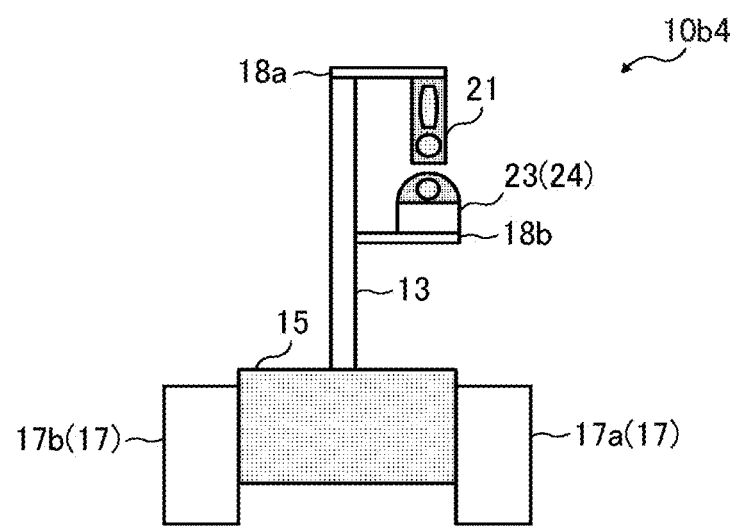

Further, in the robot 10b3 illustrated in FIG. 4C, the special image capturing device 21 is mounted downward on a mount member 18a fixed to the support 13, and the movable camera 23 is mounted upward on a mount member 18b fixed to the support 13. Thus, in the robot 10b3, the image capturing position of the special image capturing device 21 and the imaging position of the movable camera 23 are close to each other. This enables to minimize the difference between the visual fields of the special image capturing device 21 and the movable camera 23.

Variation 2:

A description is now given of Variation 2 of the configuration of the robot 10, with reference to FIG. 5A and FIG. 5B to FIG. 9A and FIG. 9B. The robot 10c (10c1 to 10c5) illustrated in FIG. 5A and FIG. 5B to FIG. 9A and FIG. 9B includes, in addition to the configuration of the robot 10a illustrated in FIG. 2, the generic image capturing device 24 that is fixed type and photographs a part of the subject photographed by the special image capturing device 21 to acquire a detailed image. Such generic image capturing device 24 that is fixed type is hereinafter referred to as a "normal camera 25". The normal camera 25 is one type of the generic image capturing device 24.

Figure 5A:
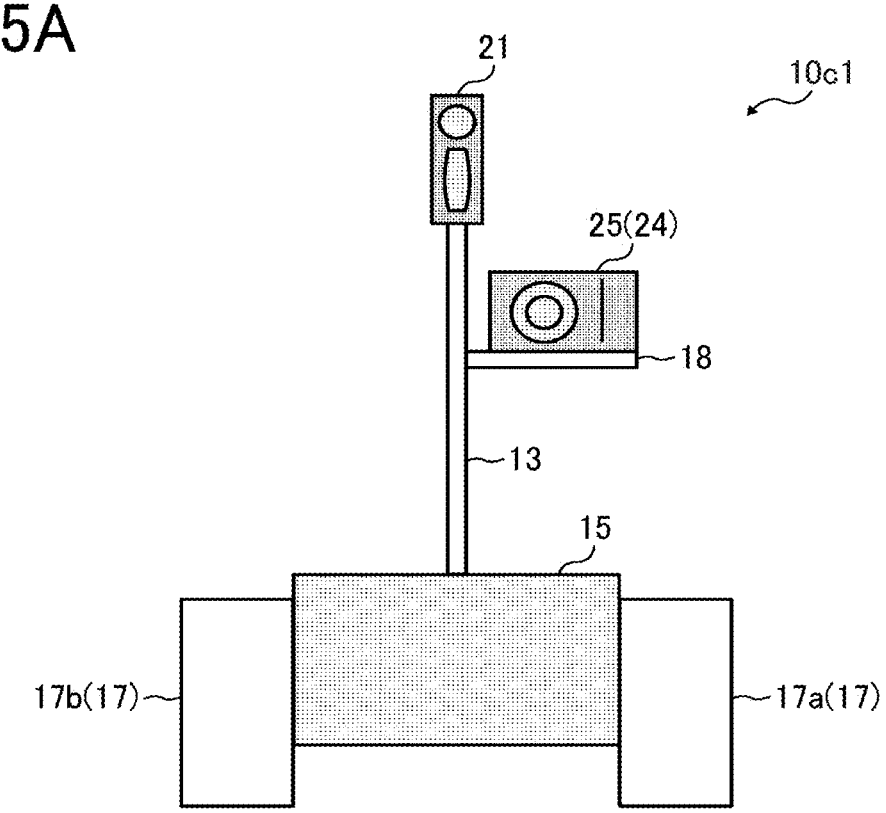
FIG. 5A and FIG. 5B are diagrams illustrating a variation 2 (2-1) of a schematic configuration of the robot, according to an embodiment of the present disclosure.

The robot 10c1 illustrated in FIG. 5A includes the normal camera 25 mounted on the mount member 18, which is fixed to the support 13. In this case, unlike the configuration of Variation 1 in which the movable camera 23 is provided, the robot 10c1 does not photograph a subject in a desired direction. However, the robot 10c1 acquires a detailed image of a subject in the front of the robot 10c1. Further, the robot 10c2 illustrated in FIG. 5B uses a movable arm 11 to adjust the imaging position (imaging direction) of the normal camera 25 mounted on the mount member 18. The movable arm 11 rotates by using a rotation shaft 12 to change the direction of the normal camera 25. The robot 10c2 changes the imaging position of the normal camera 25 by rotating or deforming the movable arm 11 as well as by changing the direction of the robot 10 by the movement mechanism 17. Furthermore, the robot 10c3 illustrated in FIG. 6 includes, in addition to the configuration of the robot 10b2 illustrated in FIG. 5B, the special image capturing device 21 mounted on the mount member 18. This configuration enables the robot 10b3 to use the movable arm 11 to change the imaging position of the special image capturing device 21 as well as the normal camera 25.

Figure 6:
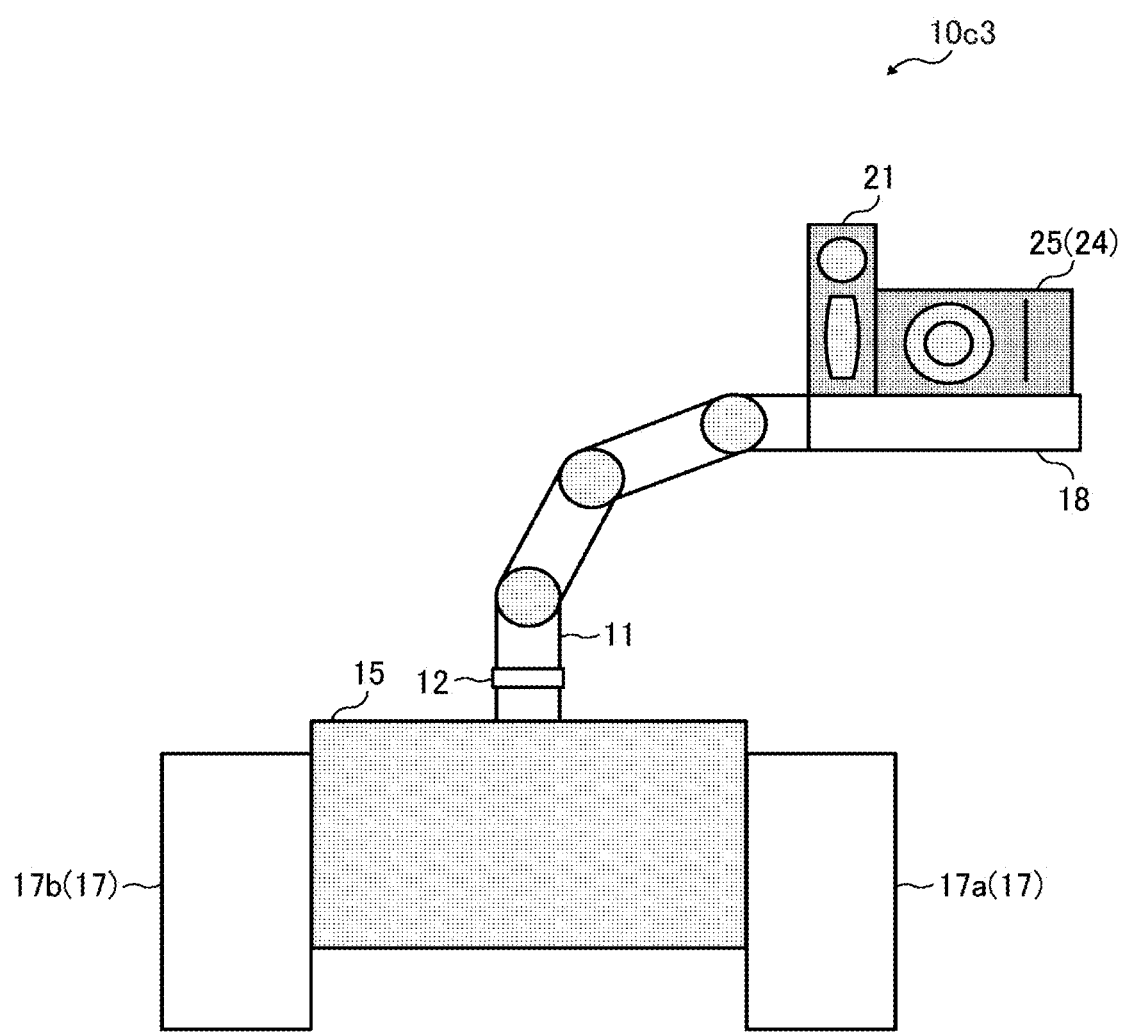
FIG. 6 is a diagram illustrating a variation 2 (2-2) of a schematic configuration of the robot, according to an embodiment of the present disclosure.
Figure 7A:
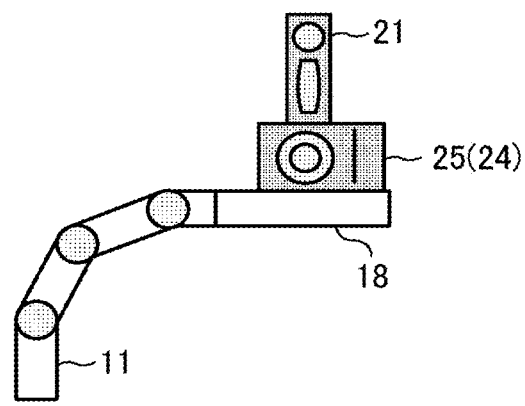
FIG. 7A, FIG. 7B and FIG. 7C are diagrams illustrating a variation 2 (2-3) of a schematic configuration of the robot, according to an embodiment of the present disclosure.
Figure 7B:
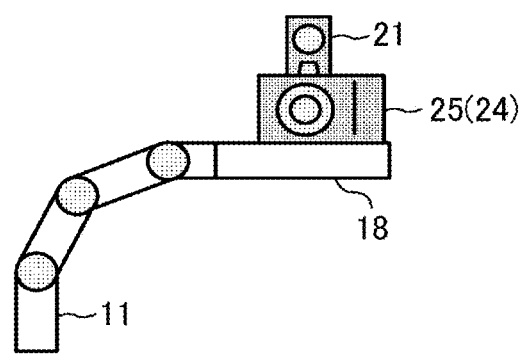
Figure 7C:
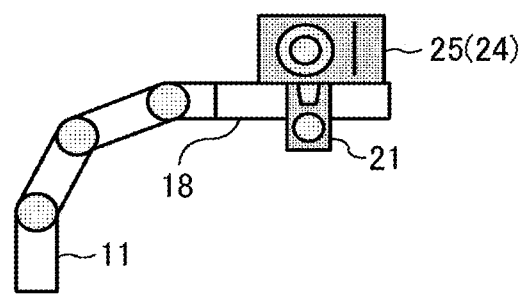

The robot 10 illustrated in FIG. 7A to FIG. 7C has a different configuration illustrated in FIG. 6 as to the arrangement of the special image capturing device 21. Since the special image capturing device 21 and the normal camera 25 have different photographing purposes as described with reference to FIG. 6, it is preferable to change the arrangement of the special image capturing device 21 and the normal camera 25 depending on usage.

The robot 10 illustrated in FIG. 7A includes the special image capturing device 21 arranged on the normal camera 25. The special image capturing device 21 is required to photograph a wide area around the robot 10. Therefore, as the robot 10 has the arrangement as illustrated in FIG. 7A, the effect of properly using the special image capturing device 21 and the normal camera 25 becomes more pronounced.

Further, the robot 10 illustrated in FIG. 7B includes the special image capturing device 21 arranged behind the normal camera 25. An area in the front direction (imaging direction) of the normal camera 25 is an area which the operator of the robot 10 wants to check in detail. Therefore, the arrangement as illustrated in FIG. 7B enables the normal camera 25 to photograph an area in the front direction (imaging direction) without being obstructed by obstacles or the like. Furthermore, the arranging as illustrated in FIG. 7B enables the special image capturing device 21 to photograph an area that cannot be photographed by the normal camera 25 (e.g., a region behind the normal camera 25) with a relatively good resolution, without the normal camera 25 and the like being reflected.

Moreover, the robot 10 illustrated in FIG. 7C includes the special image capturing device 21 arranged below the normal camera 25. The condition of the ground (foot) is important when the robot 10 moves. Therefore, the arrangement as illustrated in FIG. 7C enables the special image capturing device 21 to photograph the ground (foot) without being disturbed by the normal camera 25 or the mount member 18. This allows the operator of the robot 10 to move the robot 10 more safely while viewing the spherical image captured by the special image capturing device 21.

Figure 8A:
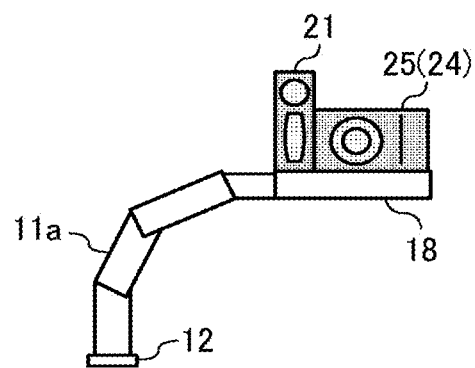
FIG. 8A and FIG. 8B are diagrams illustrating a variation 2 (2-4) of a schematic configuration of the robot, according to an embodiment of the present disclosure.
Figure 8B:
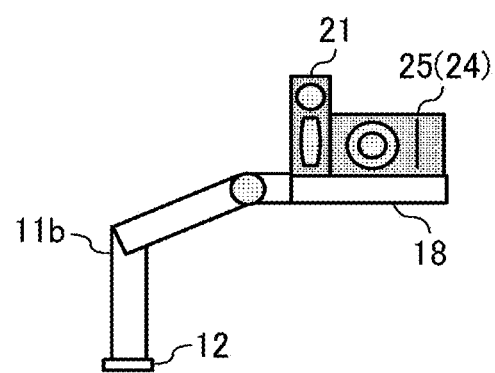

The robot 10 illustrated in FIG. 8A and FIG. 8B has a different configuration from that of FIG. 6 in the structure of the movable arm 11. It is preferable that the movable arm 11 have movable range required depending on usage of the robot 10. The movable arm 11a illustrated in FIG. 8A includes no joint member and only changes the direction thereof by the rotation shaft 12. Such configuration of the robot 10 suffices as long as the height and distance of the portion to be photographed by the special image capturing device 21 or the normal camera 25 are constant. The movable arm 11b illustrated in FIG. 8B includes a joint member configured to deform the movable arm 11a illustrated in FIG. 8A. In this case, the movable arm 11b is vertically deformed.

Figure 5B:
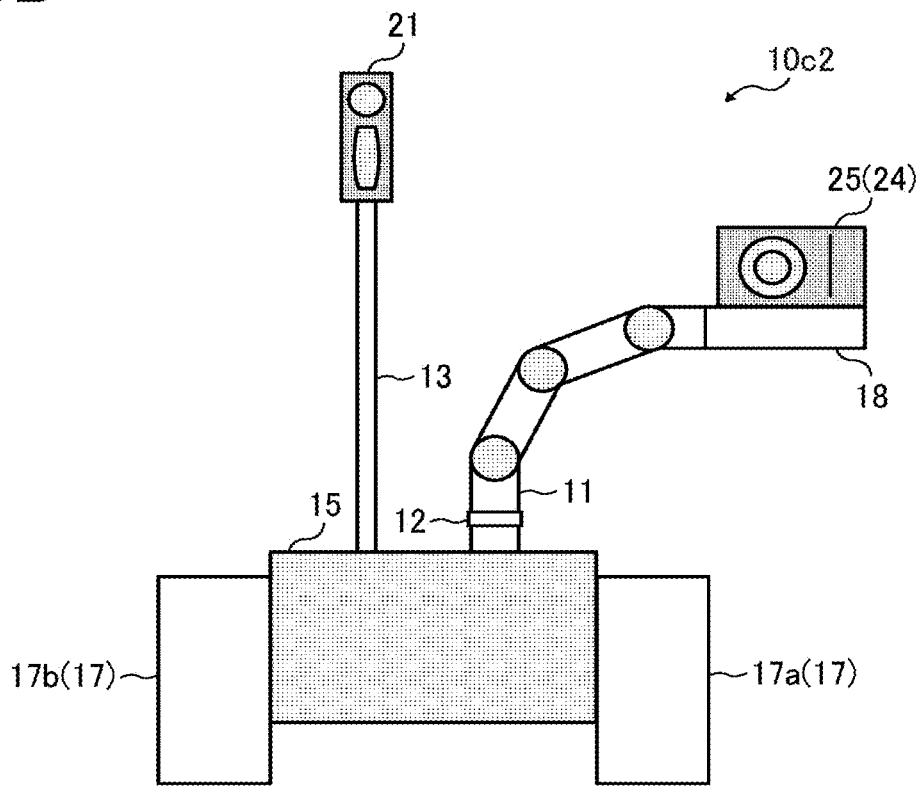
Figure 9A:
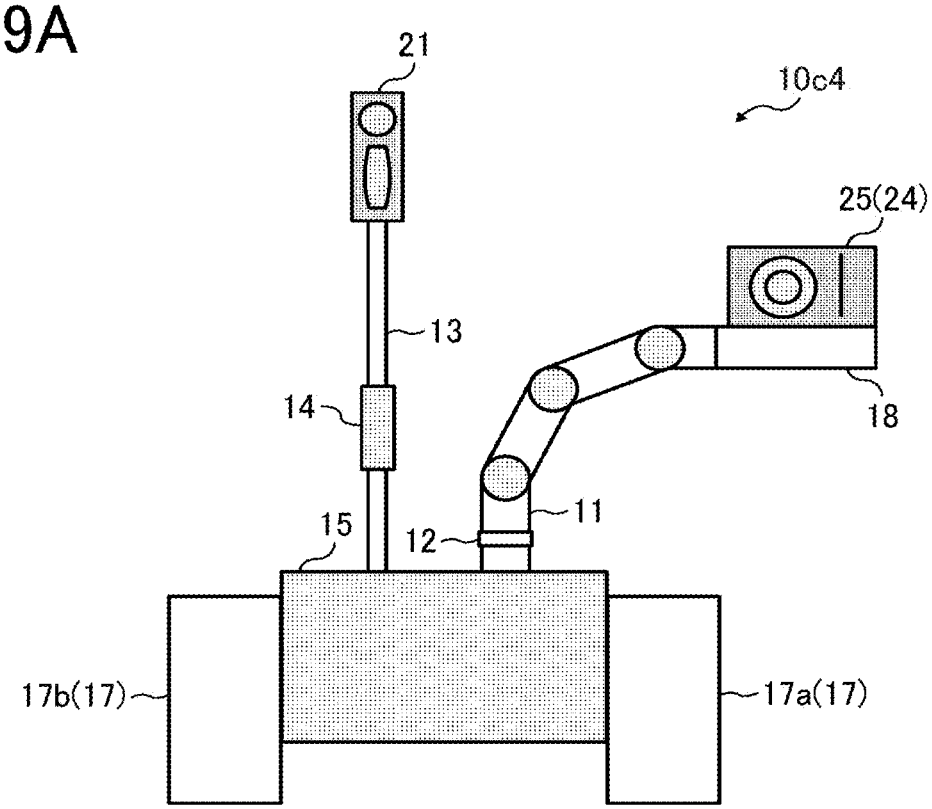
FIG. 9A and FIG. 9B are diagrams illustrating a variation 2 (2-5) of a schematic configuration of the robot, according to an embodiment of the present disclosure.

The robot 10c4 illustrated in FIG. 9A includes an expansion member 14 configured to expand and contract the support 13 of the robot 10c2 illustrated in FIG. 5B. The robot 10c4 adjusts the height of the special image capturing device 21 by expanding and contracting the support 13 using the expansion member 14. This allows the robot 10c4 to perform flexible processing. For example, by extending the support 13, the robot 10c4 enables the special image capturing device 21 to photograph a subject that exists ahead of an obstacle existing around the robot 10c4. Further, for example, by shrinking the support 13, the robot 10c4 moves while photographing the state of the ground (foot) by the special image capturing device 21.

Figure 9B:
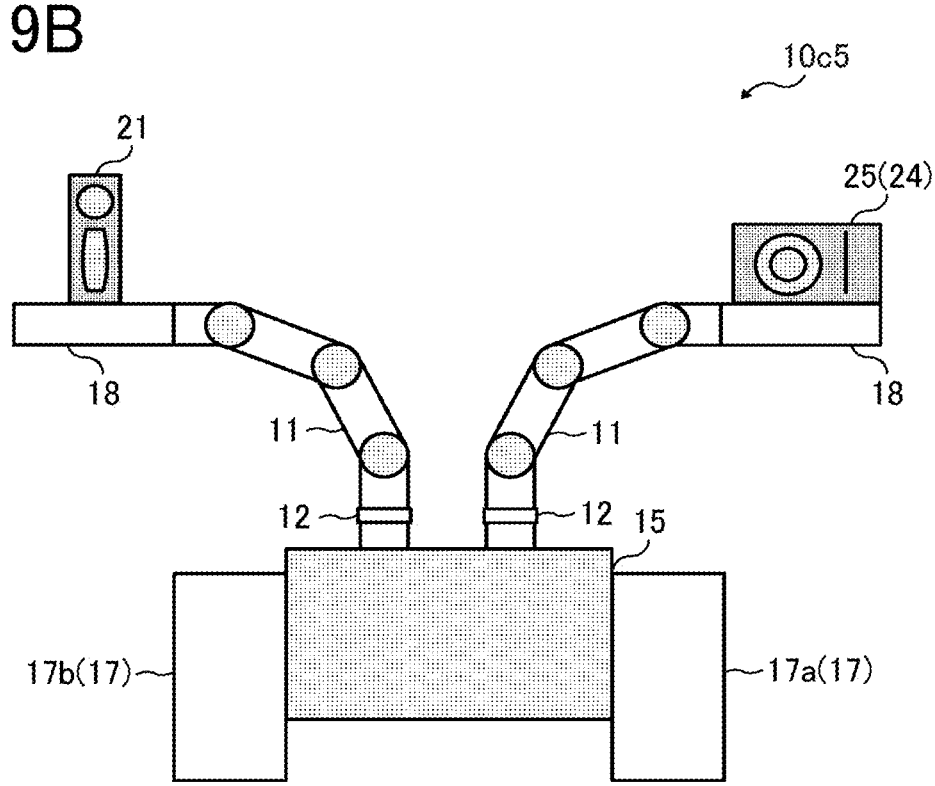

The robot 10c5 illustrated in FIG. 9B has a configuration in which the special image capturing device 21 and the normal camera 25 are mounted on different movable arms 11 respectively. With this configuration, the robot 10c5 enables the special image capturing device 21 to perform photographing from an appropriate position by deforming the movable arm 11 on which the special image capturing device 21 is mounted and enables the normal camera 25 to photograph a portion to be checked in more detail by deforming the movable arm 11 on which the normal camera 25 is mounted.

Figure 10A:
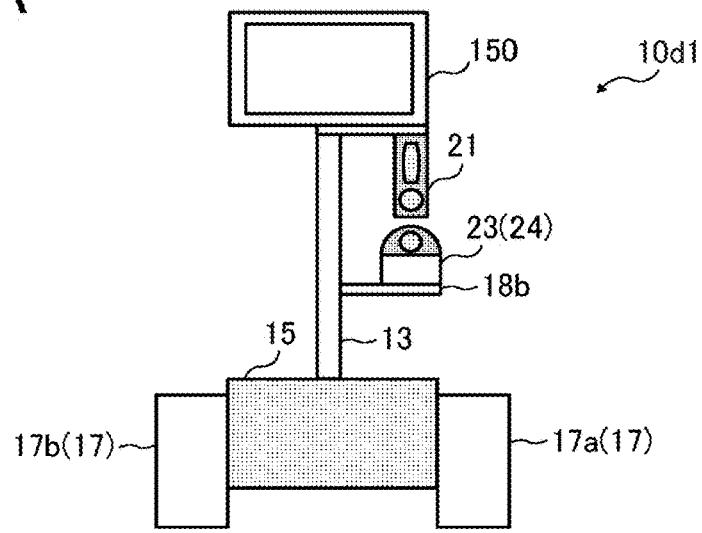
FIG. 10A, FIG. 10B and FIG. 10C are diagrams illustrating a variation 3 of a schematic configuration of the robot, according to an embodiment of the present disclosure.
Figure 10B:
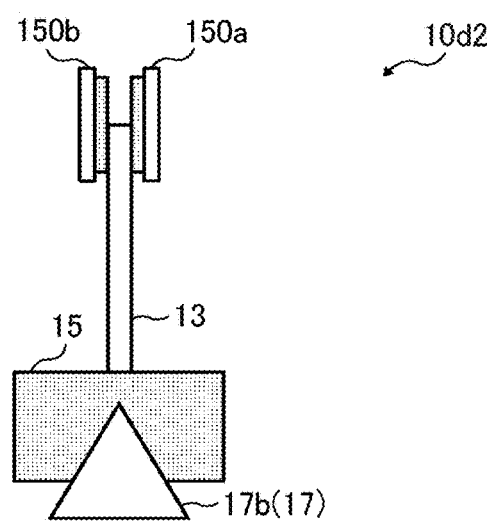
Figure 10C:
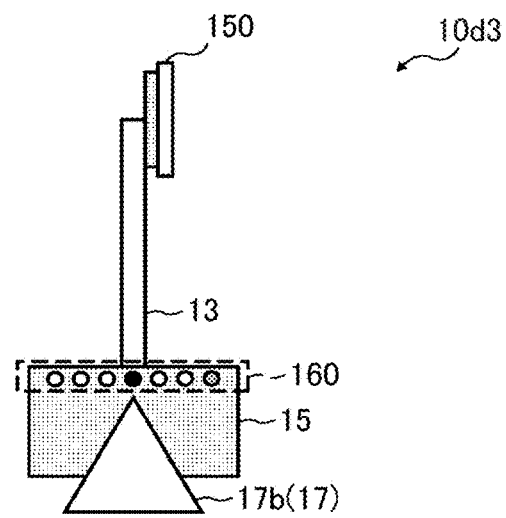

Variation 3:

A description is now given of Variation 3 of the configuration of the robot 10, with reference to FIG. 10A to FIG. 10C. The robot 10d (10d1 to 10d3) as illustrated in FIG. 10A to FIG. 10C includes a display 150 configured to display information on the display terminal 50 in addition to the configuration of the robots 10a to 10c as illustrated in FIG. 2 to FIG. 9A and FIG. 9B. The display 150 is arranged in the robot 10d1 illustrated in FIG. 10A so that the display screen can be checked from the front of the robot 10d1. The display 150 displays a captured image obtained by photographing the operator who is in the site where the display terminal 50 is provided. Further, on the display 150, information indicating where the operator is actually looking is displayed together with the image of the operator. Thus, the robot 10d1 enables the user who is in the site where the robot 10d1 is located to recognize the direction in which the operator at the remote location is looking.

The robot 10d2 illustrated in FIG. 10B includes a display 150a at the front side of the robot 10d2 so that the display screen can be checked from the front of the robot 10d2. Further, the robot 10d2 includes a display 150b at the rear side of the robot 10d2 so that the display screen can be checked from behind the robot 10d2. FIG. 10B illustrates the robot 10d2 viewed from the side. Thus, as the robot 10d2 includes plural displays 150 symmetrically at the front side and the rear side of the robot 10d2, also a user behind the robot 10d2 recognizes the direction in which the operator is looking. An image of the back of the operator's head, which image is prepared in advance, is displayed on the display 150a or the display 150b provided rearwardly relative to the direction in which the operator is looking. Although the description given above is of an example in which the robot 10d2 includes two displays, i.e., the display 150a and the display 150b, even the single display 150 displays the same or substantially the same images, when the display 150 is implemented by a convex display, a collapsible display, an omnidirectional display, or the like arranged around the robot 10d2. In this case, the user around the robot 10d2 can check the display screen from the side of the robot 10d2, for example.

Further, the robot 10d3 illustrated in FIG. 10C includes an indicator lamps 160 all around the housing 15. The indicator lamps 160 display the drive direction of the robot 10d3. FIG. 10C illustrates the robot 10d3 viewed from the side. The robot 10d3 turns on at least one of the indicator lamps 160, the at least one being provided at a position corresponding to the display position of the spherical image displayed on the display terminal 50 and the imaging position of the generic image capturing device 24. In another example, the robot 10d3 turns on at least one of the indicator lamps 160 in different colors or brightness, to distinguish the display position of the spherical image and the imaging position of the generic image capturing device 24. Thus, the robot 10d3 allows the user who is around the robot 10d3 to recognize the direction in which the operator is looking, depending on the lighting state of the indicator lamps 160. Although the description given above is of an example in which the indicator lamps 160 are arranged around the housing 15, the embodiment is not limited thereto. For example, the indicator lamps 160 are arranged in any suitable position, provided that they are arranged around the robot 10d3. The display 150 (150a, 150b) and the indicator lamps 160 of the robot 10d as illustrated in FIG. 10A to FIG. 10C are examples of display means configured to indicate the direction in which the operator of the robot 10 (the user of the display terminal 50) is looking at the spherical image.

In another example, the robot 10 described above with reference to FIG. 2 to FIG. 10A to FIG. 10C includes various sensors configured to detect information around the robot 10 in addition to the above-described configuration. Examples of the various sensors include sensor devices such as a barometer, a thermometer, a photometer, a human sensor, and an illuminance meter. In still another example, the robot 10 illustrated in FIG. 2 to FIG. 10A to FIG. 10c includes operation means configured to allow the robot 10 to perform other operations in addition to moving. Examples of the operation means include, but not limited to, a robot hand configured to grasp an object. In still another example, the robot 10 includes a single image capturing device that implements the functions of the special image capturing device 21 and the generic image capturing device 24.

Hardware Configuration:

A description is now given of a hardware configuration of each apparatus, device, or terminal of the remote control system 1a, with reference to FIG. 11 to FIG. 14. In the hardware configuration illustrated in FIG. 11 to FIG. 14, components or elements may be added or deleted as needed.

Figure 11:
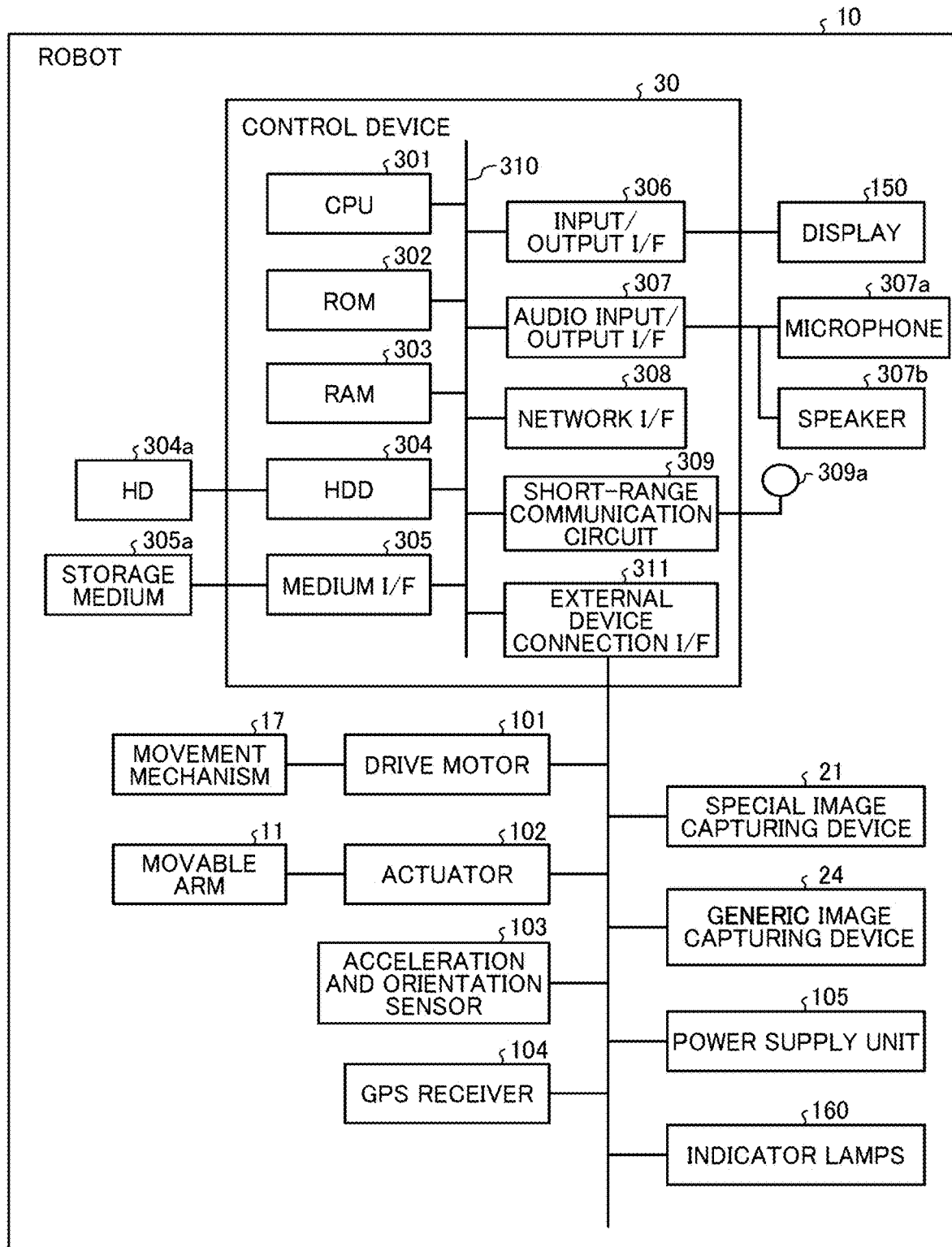
FIG. 11 is a block diagram illustrating an example of a hardware configuration of the robot, according to an embodiment of the present disclosure.

Hardware Configuration of Robot:

FIG. 11 is a block diagram illustrating an example of a hardware configuration of the robot 10, according to an embodiment. The robot 10 includes the control device 30 that controls processing or operation of the robot 10. The control device 30 is provided inside the housing 15 of the robot 10, as described above. In another example, the control device 30 is provided outside the housing 15 of the robot 10, or is provided as a separate device from the robot 10.

The control device 30 includes a central processing unit (CPU) 301, a read only memory (ROM) 302, a random access memory (RAM) 303, a hard disk drive (HDD) 304, a medium interface (I/F) 305, and an input/output I/F 306, an audio input/output I/F 307, a network I/F 308, a short-range communication circuit 309, an antenna 309a for the short-range communication circuit 309, an external device connection I/F 311, and a bus line 310.

The CPU 301 controls overall operation of the robot 10. The CPU 301 is an arithmetic unit that reads programs or data from the ROM 302 or a hard disk (HD) 304a onto the RAM 303, and executes processing according to the programs or data to implement functions of the robot 10.

The ROM 302 is a nonvolatile memory, which holds programs or data even after the robot 10 is turned off as the power is not supplied. The RAM 303 is a volatile memory used as a work area for the CPU 301. The HDD 304 controls reading or writing of various data from or to the HD 304a under control of the CPU 301. The HD 304a stores various data such as a control program. The medium I/F 305 controls reading or writing (storage) of data to a storage medium 305a such as a universal serial bus (USB) memory, a memory card, an optical disk, or a flash memory.

The input/output I/F 306 is an interface for controlling the output and input of characters, numerical values, various instructions, and the like to and from various external devices. The input/output I/F 306 controls display of various information such as a cursor, a menu, a window, characters, or an image on the display 150 such as a liquid crystal display (LCD). In one example, the display 150 is a touch panel display provided with an input device (input means). In another example, the input/output I/F 306 is connected to an input device (input means) such as a mouse and a keyboard, in addition to the display 150. The audio input/output I/F 307 is a circuit for controlling input and output of audio signals between a microphone 307a and the speaker 307b under control of the CPU 301. The microphone 307a is an example of a sound collecting device (sound collecting means), which is a built-in type, configured to input sound under control of the CPU 301. The speaker 308b is an example of a reproducing device (reproducing means) configured to output an audio signal under control of the CPU 301.

The network I/F 308 is a communication interface that allows the robot 10 to communicate (connect) with other devices or apparatuses through the communication network 9. The network I/F 308 is, for example, a communication interface such as a wired or wireless LAN. In another example, the network I/F 308 includes a communication interface such as 3rd Generation (3G), Long Term Evolution (LTE), 4th Generation (4G), 5th Generation (5G), Wi-Fi, Worldwide Interoperability for Microwave Access (WiMAX), Zigbee (registered trademark), or millimeter wave wireless communication. The short-range communication circuit 309 is a communication circuit that communicates in compliance with the near field communication (NFC) (Registered Trademark), the Bluetooth (Registered Trademark), and the like. The external device connection I/F 311 is an interface circuit that connects the control device 30 to external devices.

Examples of the bus line 310 include, but not limited to, an address bus and a data bus, which electrically connects the above-described hardware components. The bus line 310 transmits address signals, data signals, various control signals, and the like. The CPU 301, the ROM 302, the RAM 303, the HDD 304, the medium I/F 305, the input/output I/F 306, the audio input/output I/F 307, the network I/F 308, the short-range communication circuit 309, and the external device connection I/F 311 are connected to each other through the bus line 310.

Further, a drive motor 101, an actuator 102, an acceleration and orientation sensor 103, a global positioning system (GPS) receiver 104, the special image capturing device 21, a generic image capturing device 24, a power supply unit 105, and the indicator lamps 160 are connected to the control device 30 through the external device connection I/F 311.

The drive motor 101 drives the movement mechanism 17 to rotate in accordance with an instruction from the CPU 301 to move the robot 10 on the ground. The actuator 102 deforms the movable arm 11 in accordance with an instruction from the CPU 301. Examples of the acceleration and orientation sensor 103 include, but not limited to, an electromagnetic compass or gyrocompass for detecting geomagnetism, and an acceleration sensor. The GPS receiver 104 receives a GPS signal from a GPS satellite. The power supply unit 105 supplies power to the entirety of the robot 10. The control device 30 is an example of a communication device including the special image capturing device 21 and the generic image capturing device 24.

Figure 12:
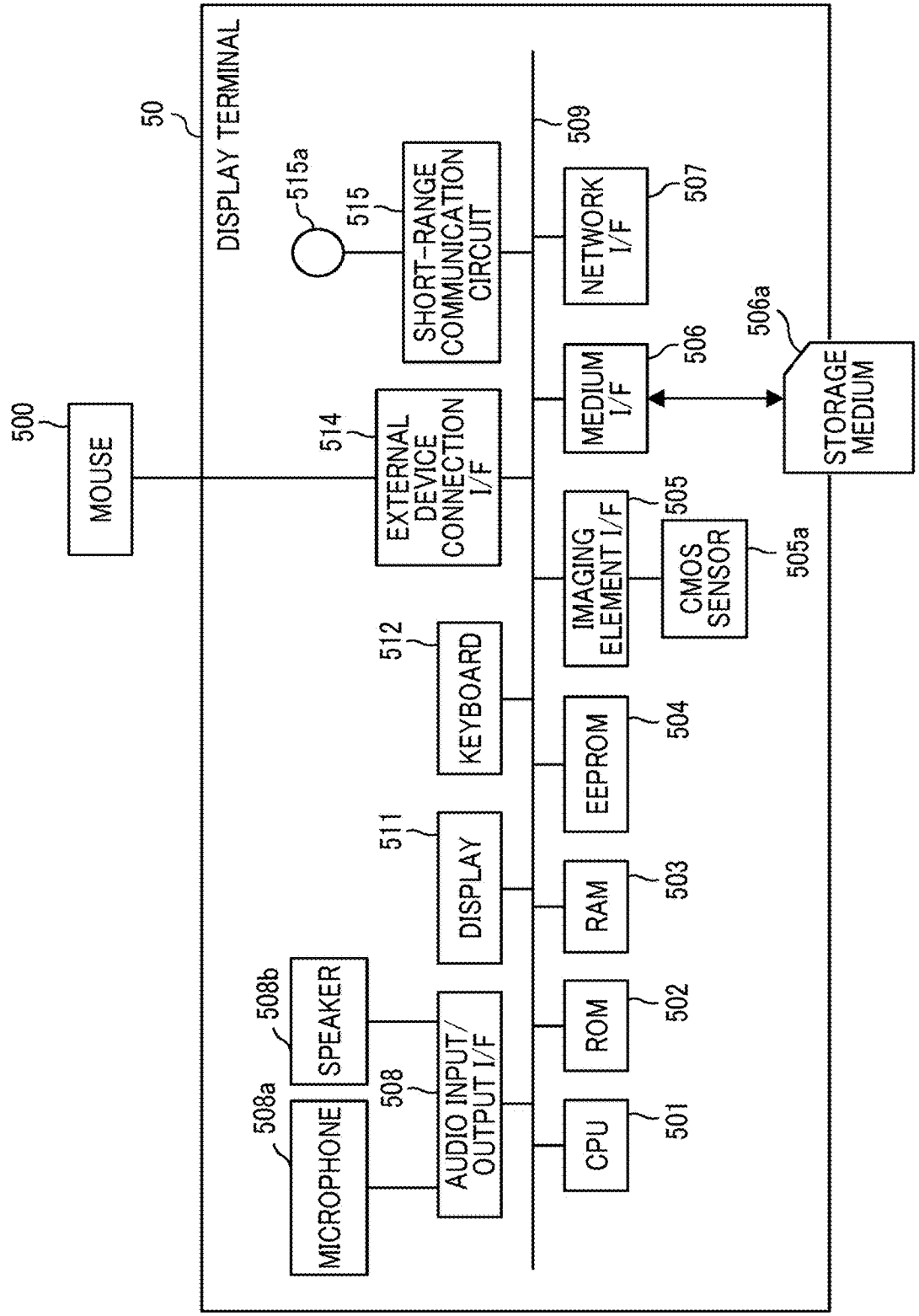
FIG. 12 is a block diagram illustrating an example of a hardware configuration of a display terminal, according to according to an embodiment of the present disclosure.

Hardware Configuration of Display Terminal:

FIG. 12 is a block diagram illustrating an example of a hardware configuration of the display terminal 50, according to an embodiment. The display terminal 50 includes a CPU 501, a ROM 502, a RAM 503, an electrically erasable programmable read-only memory (EEPROM) 504, an imaging element I/F 505, a complementary metal oxide semiconductor (CMOS) 505a, and a medium I/F 506.

The CPU 501 controls overall operation of the display terminal 50. The CPU 501 is an arithmetic unit that reads programs or data from the ROM 502, for example, onto the RAM 503, and executes processing according to the programs or data to implement functions of the display terminal 50.

The ROM 502 stores programs such as an initial program loader (IPL) to boot the CPU 501. The RAM 503 is used as a work area for the CPU 501. The EEPROM 504 reads or writes various data such as a control program for the display terminal 50 under control of the CPU 501.

The CMOS sensor 505a captures a subject (mainly, the user operating the display terminal 50) under control of the CPU 501 to obtain image data. The imaging element I/F 505 is a circuit that controls driving of the CMOS sensor 505a. The medium I/F 506 controls reading or writing (storing) of data with respect to a storage medium 506a such as a flash memory.

Further, the display terminal 50 includes a network I/F 507, an audio input/output I/F 508, a microphone 508a, a speaker 508b, a display 511, a keyboard 512, an external device connection I/F 514, a short-range communication circuit 515, and an antenna 515a for the short-range communication circuit 515.

The network I/F 507 is a communication interface that allows the display terminal 50 to communicate (connect) with other devices or apparatuses through the communication network 9. The network I/F 507 is, for example, a communication interface such as a wired or wireless LAN. In another example, the network I/F 507 includes a communication interface such as 3G, LTE, 4G, 5G, Wi-Fi, WiMAX, Zigbee, or millimeter wave wireless communication. The audio input/output I/F 508 is a circuit for controlling input and output of audio signals between a microphone 508a and the speaker 508b under control of the CPU 501. The microphone 508a is an example of a sound collecting device (sound collecting means), which is a built-in type, configured to input sound under control of the CPU 501. The speaker 508b is an example of a reproducing device (reproducing means) configured to output an audio signal under control of the CPU 501.

The display 511 is an example of a display unit configured to display an image of a subject, various kinds of icons, etc. Examples of the display 511 include, but not limited to, an LCD and an organic electroluminescence display. The keyboard 512 is one example of an input device (input means) provided with a plurality of keys that allows a user to input characters, numerals, or various instructions. The external device connection I/F 514 is an interface circuit that connects the display terminal 50 to various external devices. The external device connection I/F 514 is connected to a mouse 500 that allows a user to input an instruction such as selecting and executing various functions, selecting a target for processing, and moving a cursor. The mouse 500 is an example of an external input device (external input means), which is a pointing device that controls the display screen displayed on the display 511. The mouse 500 is just one example of the pointing device. Other examples of the pointing device include a touch panel (touch screen), a pen tablet, a touch pad, and a controller such as a joypad or a joystick. The short-range communication circuit 515 is a communication circuit that communicates in compliance with the NFC, the Bluetooth, and the like.

The display terminal 50 further includes a bus line 509. The bus line 509 is, for example, an address bus or a data bus, which electrically connects the components such as the CPU 501 illustrated in FIG. 12.

Figure 13:
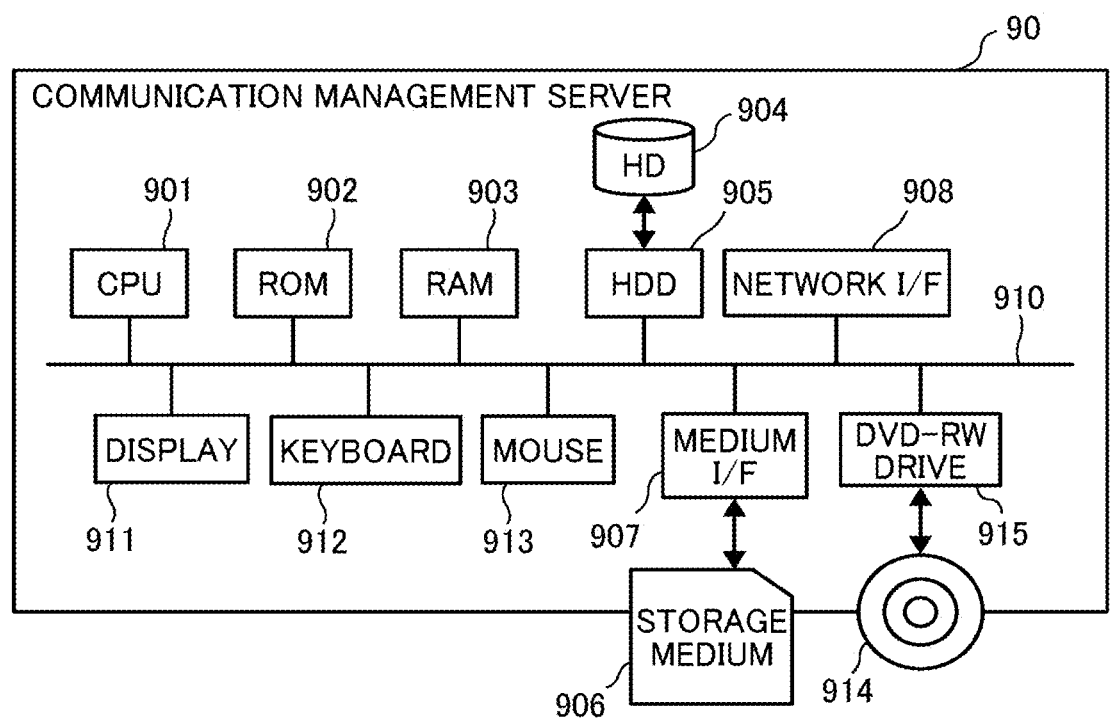
FIG. 13 is a block diagram illustrating an example of a hardware configuration of a communication management server, according to an embodiment of the present disclosure.

Hardware Configuration of Communication Management Server:

FIG. 13 is a block diagram illustrating an example of a hardware configuration of the communication management server 90, according to an embodiment. The communication management server 90 is implemented by a general-purpose computer. The communication management server 90 includes a CPU 901, a ROM 902, a RAM 903, an HD 904, an HDD 905, a medium I/F 907, a network I/F 908, a display 911, a keyboard 912, a mouse 913, a digital versatile disk rewritable (DVD-RW) drive 915, and a bus line 910.

The CPU 901 controls overall operation of the communication management server 90. The ROM 902 stores a control program for operating the CPU 901. The RAM 903 is used as a work area for the CPU 901. The HDD 905 controls reading or writing of various data to or from the HD 904 under control of the CPU 901. The HD 904 stores various data such as a control program. The medium I/F 907 controls reading or writing of data with respect to a storage medium 906 such as a flash memory.

The network I/F 908 is an interface that controls communication of data through the communication network 9. The display 911 displays various information such as a cursor, menu, window, characters, or image. The keyboard 912 is one example of an input device (input means) provided with a plurality of keys that allows a user to input characters, numerals, or various instructions. The mouse 913 is one example of an input device (input means) that allows a user to select a specific instruction or execution, select a target for processing, or move a cursor being displayed. The DVD-RW drive 915 controls reading or writing of various data from or to a DVD-RW 914, which is an example of a removable storage medium. The removable storage medium is not limited to the DVD-RW 914. In another example, a DVD-R can be used as the removal storage medium. In still another example, in alternative to or in addition to the DVD-RW drive 915, a Blu-ray (registered trademark) drive or a compact disc rewritable (CD-RW) drive are used to control reading or writing (storing) of data with respect to a Blu-ray disc rewritable (BD-RE) or a CD-RW.

The communication management server 90 further includes the bus line 910. The bus line 910 is, for example, an address bus or a data bus, which electrically connects the components such as the CPU 901 illustrated in FIG. 13.

Further, any one of the above-described control programs may be recorded in a file in a format installable or executable on a computer-readable storage medium for distribution. Examples of the storage medium include, but not limited to, compact disc-recordable (CD-R), DVD, Blu-ray disc, and secure digital (SD) card. In addition, such storage medium may be provided in the form of a program product to users within a certain country or outside that country. For example, the display terminal 50 implements the control method according to the present disclosure by executing the program according to the present disclosure.

Figure 14:
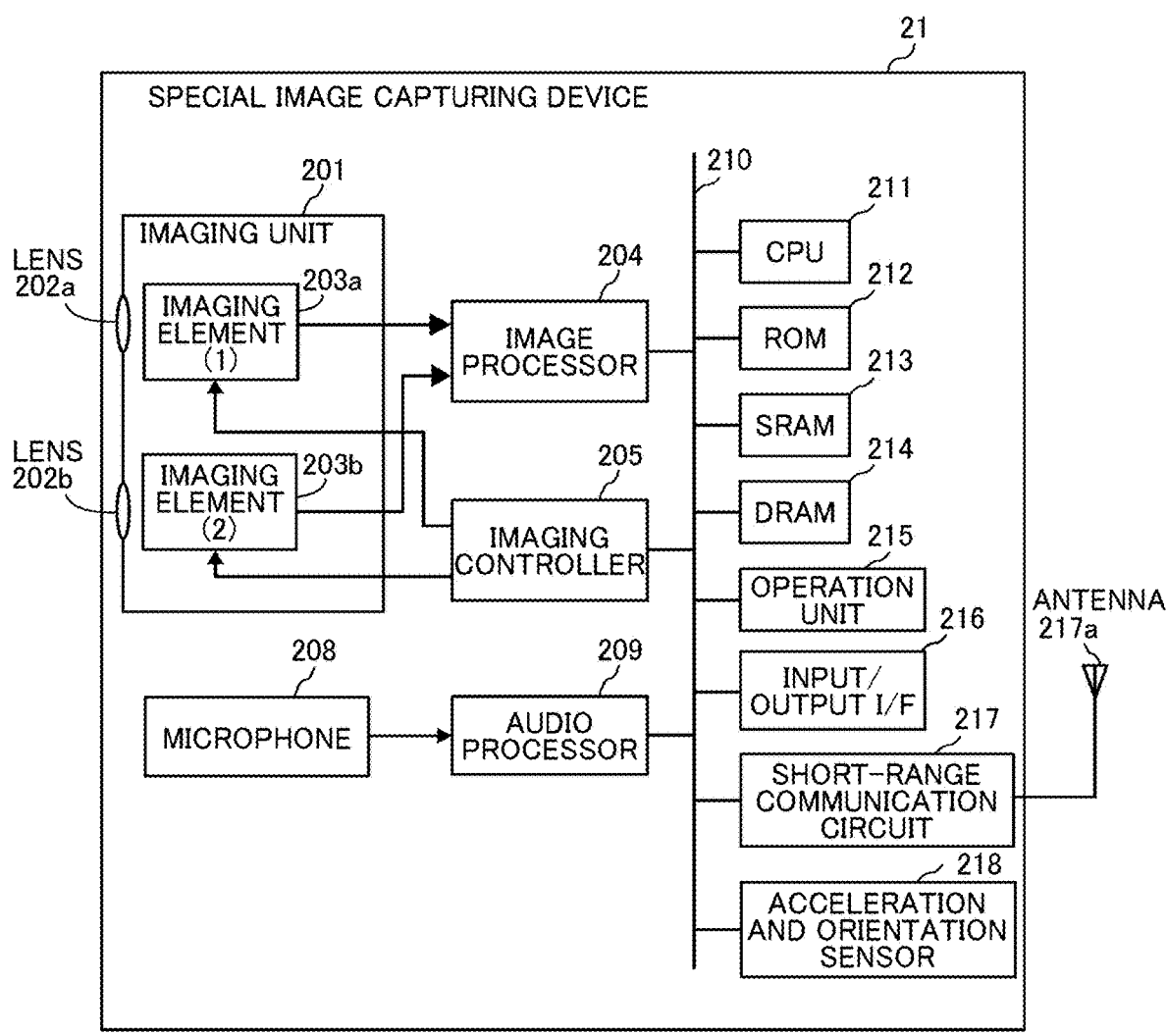
FIG. 14 is a block diagram illustrating an example of a hardware configuration of a special image capturing device, according to an embodiment of the present disclosure.

Hardware Configuration of Special Image Capturing Device:

A description is now given of a hardware configuration of the special image capturing device 21, with reference to FIG. 14. FIG. 14 is a block diagram illustrating an example of a hardware configuration of the special image capturing device 21, according to an embodiment. The following describes a case in which the special image capturing device 21 is a spherical (omnidirectional) image capturing device having two imaging elements. However, the special image capturing device 21 can include any suitable number of imaging elements, providing that it includes at least two imaging elements. In addition, the special image capturing device 21 is not necessarily an image capturing device dedicated to omnidirectional image capturing. In another example, an external omnidirectional imaging unit is attached to a general-purpose digital camera or a smartphone to implement an image capturing device having substantially the same function as that of the spherical image capturing device.

As illustrated in FIG. 14, the special image capturing device 21 includes an imaging unit 201, an image processor 204, an imaging controller 205, a microphone 208, an audio processor 209, a CPU 211, a ROM 212, and a static random access memory (SRAM) 213, a dynamic random access memory (DRAM) 214, an operation unit 215, an input/output I/F 216, a short-range communication circuit 217, an antenna 217a for the short-range communication circuit 217, and an acceleration and orientation sensor 218.

The imaging unit 201 includes two wide-angle lenses (so-called fisheye lenses) 202a and 202b, each having an angle of view of equal to or greater than 180 degrees to form a hemispherical image. The imaging unit 201 further includes two imaging elements 203a and 203b corresponding to the wide-angle lenses 202a and 202b respectively. Each of the imaging elements 203a and 203b includes an imaging sensor such as a CMOS sensor and a charge-coupled device (CCD) sensor, a timing generation circuit, and a group of registers. The imaging sensor converts an optical image formed by the fisheye lenses 202a and 202b into electric signals to output image data. The timing generation circuit generates horizontal or vertical synchronization signals, pixel clocks and the like for the imaging sensor. Various commands, parameters, and the like for operations of the imaging elements 203a and 203b are set in the group of registers.

Each of the imaging elements 203a and 203b of the imaging unit 201 is connected to the image processor 204 via a parallel I/F bus. In addition, each of the imaging elements 203a and 203b of the imaging unit 201 is connected to the imaging controller 205 via a serial I/F bus such as an I2C bus. The image processor 204, the imaging controller 205, and the audio processor 209 are each connected to the CPU 211 via a bus 210. Further, the ROM 212, the SRAM 213, the DRAM 214, the operation unit 215, the input/output I/F 216, the short-range communication circuit 217, the acceleration and orientation sensor 218 are also connected to the bus 210.

The image processor 204 acquires image data from each of the imaging elements 203a and 203b via the parallel I/F bus and performs predetermined processing on each image data. Thereafter, the image processor 204 combines these image data to generate data of an equirectangular projection image.

The imaging controller 205 usually functions as a master device while each of the imaging elements 203a and 203b usually functions as a slave device. The imaging controller 205 sets commands or the like in the group of registers of each of the imaging elements 203a and 203b via the I2C bus. The imaging controller 205 receives various commands from the CPU 211. Further, the imaging controller 205 obtains status data of the group of registers of each of the imaging elements 203a and 203b via the I2C bus, and sends the obtained status data to the CPU 211.

The imaging controller 205 instructs the imaging elements 203a and 203b to output the image data at a time when the shutter button of the operation unit 215 is pressed. In some cases, the special image capturing device 21 is configured to display a preview image on a display (e.g., a display of an external terminal such as a smartphone that performs short-range communication with the special image capturing device 21 through the short-range communication circuit 217) or display a moving image (movie). In case of displaying movie, image data are continuously output from the imaging elements 203a and 203b at a predetermined frame rate (frames per minute).

Furthermore, the imaging controller 205 functions as synchronization control means configured to operate in cooperation with the CPU 211, to synchronize the time when the imaging element 203a outputs image data and the time when the imaging element 203b outputs the image data. Although in the present embodiment, the special image capturing device 21 does not include a display, the special image capturing device 21 may include a display unit. The microphone 208 converts sound into audio data (signal). The audio processor 209 obtains audio data output from the microphone 208 via an I/F bus and performs predetermined processing on the audio data.

The CPU 211 controls overall operation of the special image capturing device 21 and performs necessary processing. The ROM 212 stores various programs for the CPU 211. Each of the SRAM 213 and the DRAM 214 operates as a work memory to store programs for execution by the CPU 211 or data in current processing. More specifically, in one example, the DRAM 214 stores image data currently processed by the image processor 204 and data of the equirectangular projection image on which processing has been performed.

The operation unit 215 collectively refers to various operation keys, such as a shutter button. The user operates the operation unit 215 to input various image capturing (photographing) modes or image capturing (photographing) conditions. The input/output I/F 216 collectively refers to an interface circuit such as a USB I/F with an external medium such as an SD card or an external personal computer. The input/output I/F 216 may be either wired or wireless. The data of the equirectangular projection image, which is stored in the DRAM 214, is stored in the external medium via the input/output I/F 216 or transmitted to an external terminal (apparatus) via the input/output I/F 216, as needed. The short-range communication circuit 217 communicates with an external terminal (apparatus) via the antenna 217a of the special image capturing device 21 through a short-range wireless communication network such as Wi-Fi, NFC, and Bluetooth (registered trademark). The short-range communication circuit 217 is configured to transmit the data of equirectangular projection image to an external device (apparatus).

The acceleration and orientation sensor 218 calculates an orientation of the special image capturing device 21 from the Earth's magnetism to output orientation and tilt information. This orientation and tilt information is an example of related information, which is metadata described in compliance with Exif. This information is used for image processing such as image correction of captured images. The related information also includes data of a time (date) when an image is captured by the special image capturing device 21, and data size of image data, for example. The acceleration and orientation sensor 218 detects the change in tilt (roll, pitch, yaw) with movement of the special image capturing device 21. The change in tilt is one example of related information (metadata) described in compliance with Exif. This information is used for image processing such as image correction of captured images. The acceleration and orientation sensor 218 further detects acceleration in three axial directions. The special image capturing device 21 calculates the position (an angle with respect to the direction of gravity) of the special image capturing device 21, based on the acceleration detected by the acceleration and orientation sensor 218. With the acceleration and orientation sensor 218, the special image capturing device 21 is able to correct images with high accuracy.

Figure 15A:
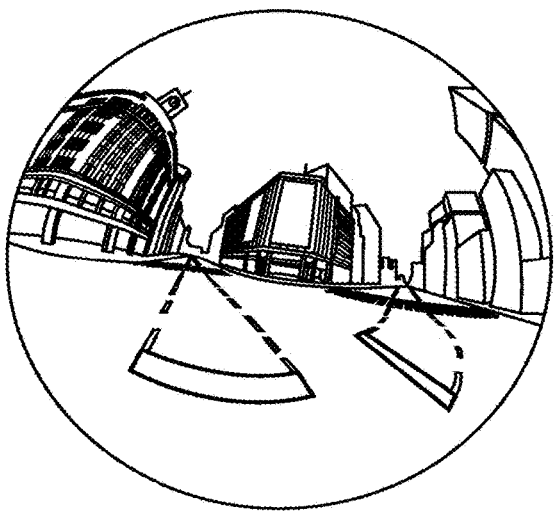
FIG. 15A is an illustration of a hemispherical image (front side) captured by the special image capturing device, according to an embodiment of the present disclosure.
Figure 15B:
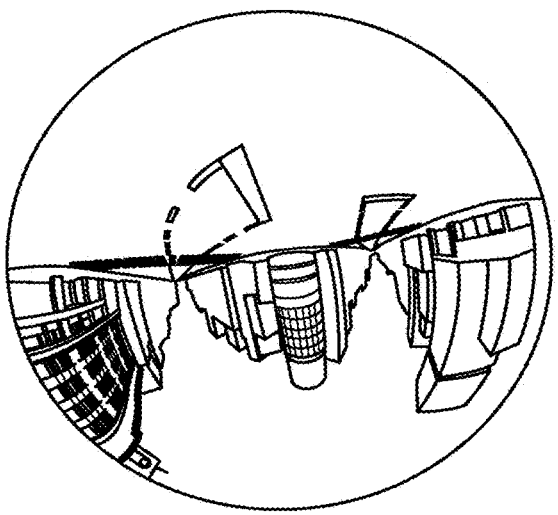
FIG. 15B is an illustration of a hemispherical image (back side) captured by the special image capturing device, according to an embodiment of the present disclosure.
Figure 15C:
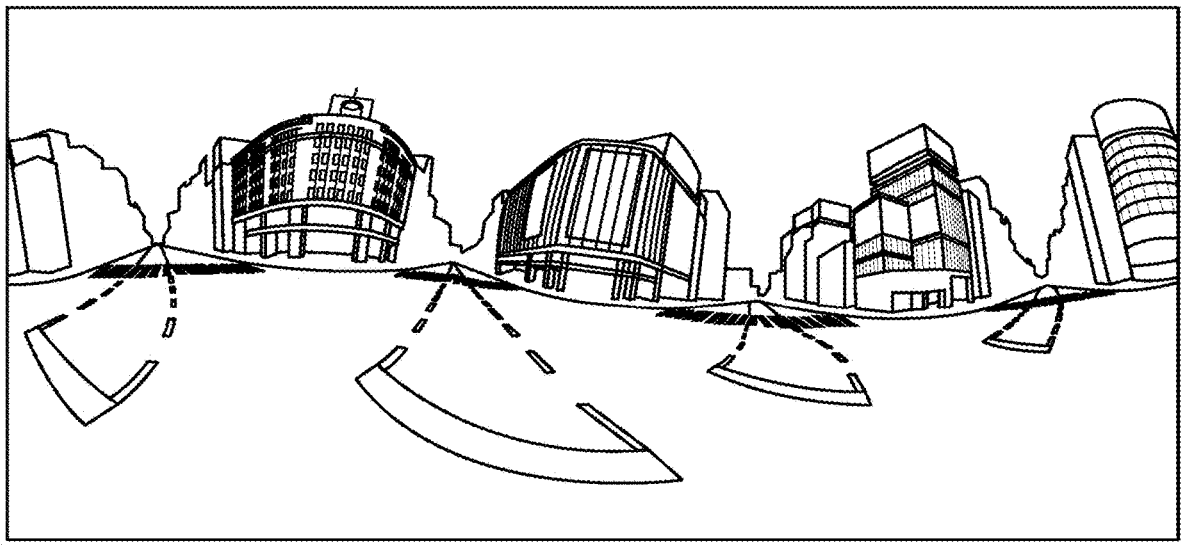
FIG. 15C is an illustration of an image represented by equirectangular projection, according to an embodiment of the present disclosure.

Spherical Image:

A description is now given of an example of a spherical image obtained by the special image capturing device 21, with reference to FIG. 15A to FIG. 15C to FIG. 19. First, referring to FIG. 15A to FIG. 15C, FIG. 16A, and FIG. 16B, a description is given of an overview of an operation of generating an equirectangular projection image EC and a spherical image CE from the images captured by the special image capturing device 21. FIG. 15A is an illustration of a hemispherical image (front side) captured by the special image capturing device 21. FIG. 15B is an illustration of a hemispherical image (back side) captured by the special image capturing device 21. FIG. 15C is an illustration of an image in equirectangular projection, which is referred to as an "equirectangular projection image" (or equidistant cylindrical projection image) EC. FIG. 16A is a conceptual diagram illustrating an example of how the equirectangular projection image maps to a surface of a sphere. FIG. 16B is an illustration of the spherical image.

As illustrated in FIG. 15A, an image captured by the imaging element 203a is a curved hemispherical image (front side) taken through the fisheye lens 202a. Also, as illustrated in FIG. 15B, an image captured by the imaging element 203b is a curved hemispherical image (back side) taken through the fisheye lens 202b. The special image capturing device 21 combines the hemispherical image (front side) and the hemispherical image (rear side), which is 180 degrees reversed, to generate an equirectangular projection image as illustrated in FIG. 15C.

The special image capturing device 21 uses Open Graphics Library for Embedded Systems (OpenGL ES) to map the equirectangular projection image on the sphere surface as illustrated in FIG. 16A, whereby generating the spherical image CE as illustrated in FIG. 16B. Thus, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image (movie).

Since the spherical image CE is an image attached to the sphere surface, a part of the image may look distorted when viewed from the user, providing a feeling of strangeness. To resolve this strange feeling, the special image capturing device 21 controls a particular display to display an image of a viewable area, which is a part of the spherical image CE, as a flat image having fewer curves. The viewable area is, for example, a part of the spherical image CE that is viewable by the user. In this disclosure, the image of the viewable area is referred to as a "viewable-area image". A description is now given of displaying the viewable-area image, with reference to FIG. 17, FIG. 18A, and FIG. 18B.

Figure 17:
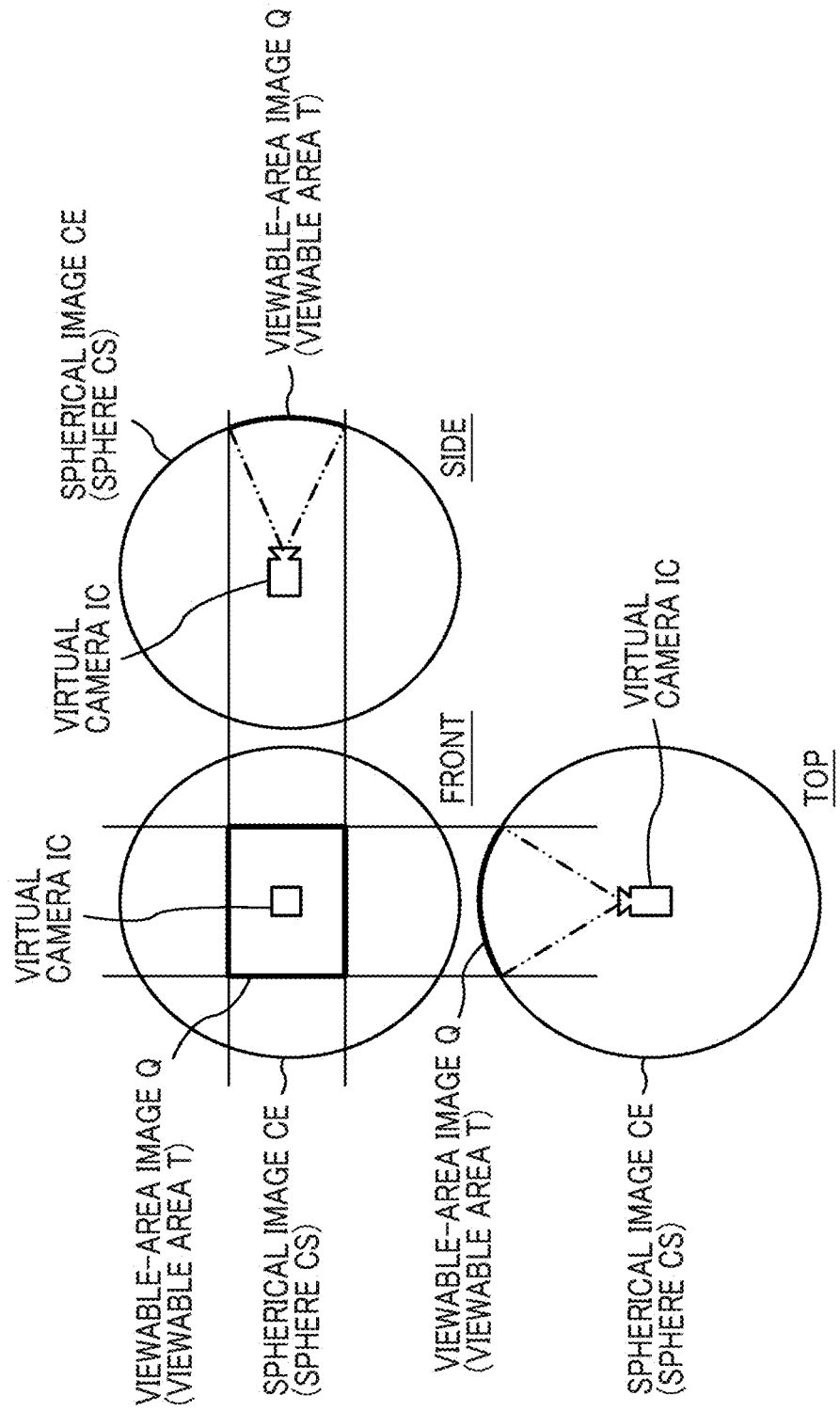
FIG. 17 is an illustration of relative positions of a virtual camera and a viewable area in a case where the spherical image is represented as a surface area of a three-dimensional solid sphere, according to an embodiment of the present disclosure.
Figure 18A:
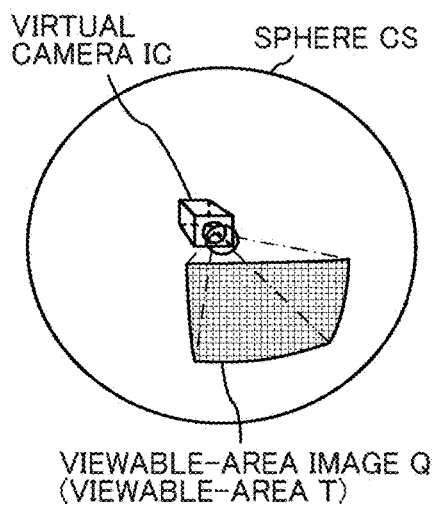
FIG. 18A is a perspective view of FIG. 17, according to an embodiment of the present disclosure.
Figure 18B:
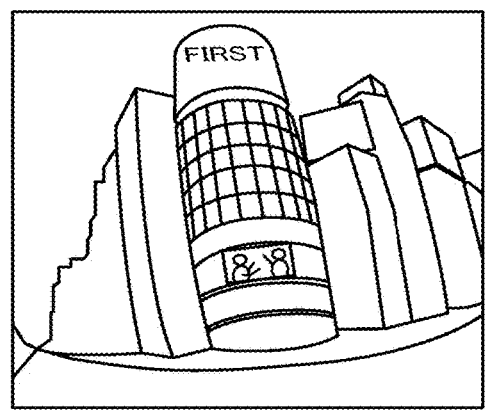
FIG. 18B is an illustration of an image of the viewable area displayed on a display of the display terminal, according to an embodiment of the present disclosure.

FIG. 17 is an illustration of relative positions of a virtual camera IC and a viewable area in a case where the spherical image CE is represented as a surface area of a three-dimensional solid sphere CS. The virtual camera IC corresponds to a position of a point of view (viewpoint) of a user who is viewing the spherical image CE represented as a surface area of the three-dimensional solid sphere. FIG. 18A is a perspective view of FIG. 17. FIG. 18B is a view illustrating the viewable-area image when displayed on a display. FIG. 18A illustrates the spherical image CE illustrated in FIG. 17 as a three-dimensional solid sphere CS. Assuming that the spherical image CE is a surface area of the solid sphere CS, the virtual camera IC is inside of the spherical image CE as illustrated in FIG. 17. The viewable area T in the spherical image CE is an imaging area of the virtual camera IC. Specifically, the viewable area T is specified by viewable-area information indicating an imaging direction and an angle of view of the virtual camera IC in a three-dimensional virtual space containing the spherical image CE. In addition, zooming in the viewable area T can also be determined by bringing the virtual camera IC closer to or away from the spherical image CE. A viewable-area image Q is an image of the viewable area T in the spherical image CE. The viewable area T is specified by the angle of view α and a distance f from the virtual camera IC to the spherical image CE (see FIG. 19).

The viewable-area image Q illustrated in FIG. 18A, is displayed on a display as an image of an imaging area of the virtual camera IC, as illustrated in FIG. 18B. FIG. 18B illustrates the viewable-area image Q represented by the viewable-area information that is set by default. In the following, the position of the virtual camera IC is described using an imaging direction (ea, aa) and an angle of view α of the virtual camera IC. In another example, the viewable area T is identified by an imaging area (X, Y, Z) of the virtual camera IC, i.e., the viewable area T, rather than the angle of view α and the distance f.

Figure 19:
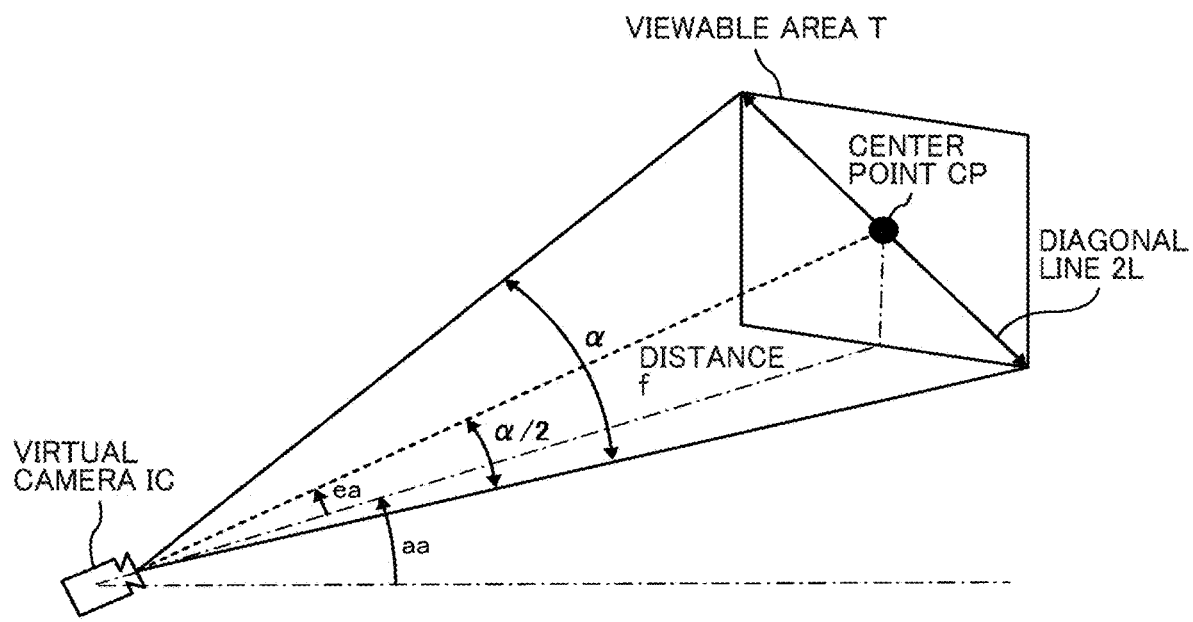
FIG. 19 is a view illustrating a relation between viewable-area information and the image of the viewable area, according to an embodiment of the present disclosure.

Referring to FIG. 19, a relation between the viewable-area information and the image of the viewable area T is described. FIG. 19 is a view illustrating a relation between the viewable-area information and the image of the viewable area T. As illustrated in FIG. 19, "ea" denotes an elevation angle, "aa" denotes an azimuth angle, and "α" denotes an angle of view. The position of the virtual camera IC is adjusted, such that the point of gaze of the virtual camera IC, indicated by the imaging direction (ea, aa), matches the center point CP of the viewable area T as the imaging area of the virtual camera IC. As illustrated in FIG. 19, when it is assumed that a diagonal angle of the viewable area T specified by the angle of view α of the virtual camera IC is α, the center point CP provides the parameters (x, y) of the viewable-area information. The viewable-area image Q is an image of the viewable area T in the spherical image CE. "f" denotes a distance from the virtual camera IC to the center point CP. "L" denotes a distance between the center point CP and a given vertex of the viewable area T (2L is a diagonal line). In FIG. 19, a trigonometric function equation generally expressed by the following equation 1 is satisfied.

$$L/f=\tan(\alpha/2) \quad \text{(Equation 1)}$$

Figure 20:
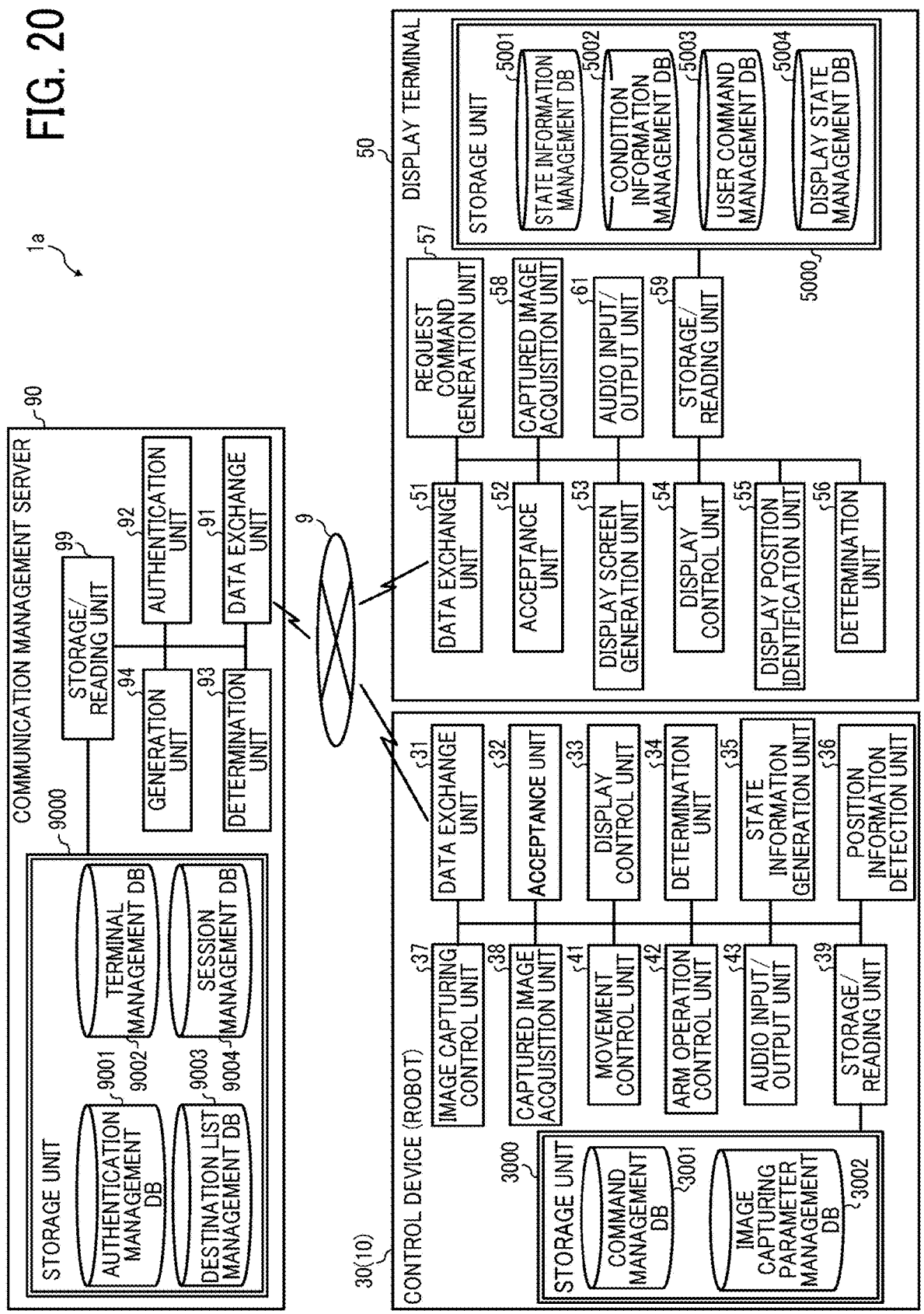
FIG. 20 is a block diagram illustrating an example of a functional configuration of the remote control system, according to an embodiment of the present disclosure.

Functional Configuration:

A description is now given of a functional configuration of the remote control system 1a, according to the present embodiment, with reference to FIG. 20 to FIG. 25A and FIG. 25B. FIG. 20 is a block diagram illustrating an example of a functional configuration of the remote control system 1a, according to an embodiment. FIG. 20 illustrates a terminal, an apparatus, and a server that relate to processes or operations to be described below among the terminals, apparatuses, and servers illustrated in FIG. 1.

Functional Configuration of Control Device:

First, referring to FIG. 20, the functional configuration of the control device 30 that controls processing or operation of the robot 10 is described. The control device 30 includes a data exchange unit 31, an acceptance unit 32, a display control unit 33, a determination unit 34, a state information generation unit 35, a position information detection unit 36, an image capturing control unit 37, a captured image acquisition unit 38, a movement control unit 41, an arm operation control unit 42, an audio input/output unit 43, and a storage/reading unit 39. These units are functions or means implemented by or that are caused to function by operating any of the hardware elements illustrated in FIG. 11 in cooperation with the instructions of the CPU 301 according to the control program expanded to the RAM 303. The control device 30 further includes a storage unit 3000, which is implemented by the ROM 302, the HD 304a or the storage medium 305a illustrated in FIG. 11.

The data exchange unit 31, which is implemented by instructions of the CPU 301 and by the network I/F 308 illustrated in FIG. 11, has a function of transmitting and receiving various types of data or information to and from other apparatuses through the communication network 9. The data exchange unit 31 transmits spherical image data or detailed image data acquired by the captured image acquisition unit 38 to the display terminal 50 via the communication network 9, for example.

The acceptance unit 32, which is implemented by instructions of the CPU 301 and the input/output I/F 306 illustrated in FIG. 11, has a function of receiving an operation input to an input device (input means) such as the display 150. The display control unit 33, which is implemented by instructions of the CPU 301 and input/output I/F 306 illustrated in FIG. 11, has a function of controlling the display 150 to display various screen. The determination unit 34, which is implemented by instructions of the CPU 301 illustrated in FIG. 11, has a function of making various determinations.

The state information generation unit 35, which is implemented by instructions of the CPU 301 and the external device connection I/F 311 illustrated in FIG. 11, has a function of generating state information 170 that indicates the movement state of the robot 10. The state information generation unit 35 generates and acquires the state information 170 indicating the movement state of the robot 10 based on the driving state of the movement mechanism 17 acquired from the movement control unit 41. A detailed description is given below of the state information 170 generated (acquired) by the state information generation unit 35.

The position information detection unit 36, which is implemented by instructions of the CPU 301 and the external device connection I/F 311 illustrated in FIG. 11, has a function of acquiring a detection result of directions of bearings (e.g., azimuth angle, magnetic north) detected by the acceleration and orientation sensor 103 or the GPS receiver 104. The detection result of the directions of bearings is position information indicating the position and the orientation of the robot 10 at a particular time.

The image capturing control unit 37, which is implemented by instructions of the CPU 301 and the external device connection I/F 311 illustrated in FIG. 11, has a function of instructing the special image capturing device 21 or the generic image capturing device 24 to perform image capturing processing. For example, the image capturing control unit 37 transmits instruction information for instructing image capturing by the special image capturing device 21 to the special image capturing device 21. Further, for example, the image capturing control unit 37 transmits instruction information for instructing image capturing by the generic image capturing device 24 to the generic image capturing device 24.

The captured image acquisition unit 38, which is implemented by instructions of the CPU 301 and the external device connection I/F 311 illustrated in FIG. 11, has a function of acquiring a spherical image acquired the special image capturing device 21 or a detailed image acquired by the generic image capturing device 24. For example, the captured image acquisition unit 38 acquires, from the special image capturing device 21, spherical image data, which is data of a spherical image obtained by photographing a subject by the special image capturing device 21. Further, for example, the captured image acquisition unit 38 acquires, from the generic image capturing device 24, detailed image data, which is data of a detailed image obtained by the generic image capturing device 24 by photographing a part of the subject photographed by the special image capturing device 21.

The movement control unit 41, which is implemented by instructions of the CPU 301 and the external device connection I/F 311 illustrated in FIG. 11, has a function of drive the movement mechanism 17 to control the movement of the robot 10. For example, the movement control unit 41 controls the driving of the movement mechanism 17 in response to a request command transmitted from the display terminal 50, to move the robot 10.

The arm operation control unit 42, which is implemented by instructions of the CPU 301 and the external device connection I/F 311 illustrated in FIG. 11, has a function of controlling operation of the movable arm 11. For example, the arm operation control unit 42 deforms the movable arm 11 in response to a request command transmitted from the display terminal 50, to change the direction or position of the movable arm 11.

The audio input/output unit 43, which is implemented by instructions of the CPU 301 and the audio input/output I/F 307 illustrated in FIG. 11, has a function of inputting and outputting audio data. For example, the audio input/output unit 43 converts a user's voice collected by the microphone 307a into an audio signal, and performs audio processing on audio data based on the audio signal. Further, for example, the audio input/output unit 43 sets audio data to be output from the speaker 307b, such that the speaker 307b outputs the audio signal based on the set audio data to reproduce sound.

The storage/reading unit 39, which is implemented by instructions of the CPU 301 illustrated in FIG. 11, has a function of storing various data in the storage unit 3000, and reads various data from the storage unit 3000. Further, every time image data and audio data are received in performing communication with the display terminal 50, the storage/reading unit 39 overwrites data stored in the storage unit 3000 with the received image data and audio data. The display 150 displays an image based on image data before being overwritten, and the speaker 307b outputs sound based on audio data before being overwritten. The storage unit 3000 further stores spherical image data and detailed image data acquired by the captured image acquisition unit 38. In one example, a spherical image data item and a detailed image data item stored in the storage unit 3000 are deleted when a predetermined time period has elapsed since the data items are acquired by the captured image acquisition unit 38. In another example, a spherical image data item and a detailed image data item stored in the storage unit 3000 are deleted after the data items are transmitted to the display terminal 50.

Command Management Table:

FIG. 21A is a conceptual diagram illustrating an example of a command management table, according to an embodiment. In the storage unit 3000, a command management database (DB) 3001 storing the command management table as illustrated in FIG. 21A is stored. The command management table illustrated in FIG. 21A is used for identifying processing or operation to be executed by the robot 10 based on a request command transmitted from the display terminal 50. The command management table stores, for each of plural commands, a variable and a processing content corresponding to the command in association with each other.

The determination unit 34 of the control device 30 identifies particular processing corresponding to the request command transmitted from the display terminal 50 using the command management table.

For example, the processing corresponding to a command "MOVE (variables L, R)" is processing of rotating the left wheel of the movement mechanism 17 by L degrees and rotating the right wheel by R degrees. Although in embodiment, a description is given of an example in which the robot 10 moves with two separate left and right wheels, the embodiments are not limited thereto. In another example in which the movement mechanism 17 of a foot type or a single wheel is used, the same processing is performed provided that it moves the robot 10 in a particular direction. Further, the processing corresponding to the command "AIM (variables H, V, Z)" is processing of moving the imaging direction of the generic image capturing device 24 so that the imaging direction is the horizontal angle H degrees and the vertical angle V degrees with respect to the front of the robot 10 and changing the zoom amount of the generic image capturing device 24 to Z %. Further, the command "LOOK (variables H, V, Z)" indicates the direction (H, V) in the spherical image viewed by the operator of the robot 10 and the zoom amount (Z %). The robot 10 deals with this command "LOOK (variables H, V, Z)" as information transmitted from the display terminal 50, and, for example, uses this command to generate a display screen 800 (see FIG. 43A) described below to be displayed on the display 150.

Image Capturing Parameter Management Table:

FIG. 21B is a conceptual diagram illustrating an example of an image capturing parameter management table, according to an embodiment. In the storage unit 3000, an image capturing parameter management DB 3002 storing the image capturing parameter management table as illustrated in FIG. 21B is stored. The image capturing parameter management table illustrated in FIG. 21B stores image capturing parameters such as the image quality of the spherical image captured by the special image capturing device 21. The image capturing parameter management table stores and manages, for each of the plural items, a parameter of the item. The items stored in the image capturing parameter management table include the frame rate (FPS, i.e., an update frequency per second) of the spherical image, the resolution of the spherical image, and the imaging position (AIM) of the generic image capturing device 24. Note that the items stored in the image capturing parameter management table are not limited to the above-described items. For example, other items regarding the image quality of the spherical image are included. The image capturing control unit 37 of the control device 30 updates (changes) each parameter each time the image quality of the spherical image acquired by the special image capturing device 21 is changed and/or each time the imaging position of the detailed image acquired by the generic image capturing device 24 is changed.

Functional Configuration of Display Terminal:

Referring again to FIG. 20, a description is now given of the functional configuration of the display terminal 50. The display terminal 50 includes a data exchange unit 51, an acceptance unit 52, a display screen generation unit 53, a display control unit 54, a display position identification unit 55, a determination unit 56, a request command generation unit 57, a captured image acquisition unit 58, an audio input/output unit 61 and a storage/reading unit 59. These units are functions or means implemented by or that are caused to function by operating any of the hardware elements illustrated in FIG. 12 in cooperation with the instructions of the CPU 501 according to the control program expanded to the RAM 503. The display terminal 50 further includes a storage unit 5000, which is implemented by the ROM 502 or the storage medium 506a illustrated in FIG. 12. Further, in the display terminal 50, a dedicated application program for remotely operating the robot 10 is installed. The display terminal 50 implements the functions by causing the CPU 501 to execute the installed application program, for example.

The data exchange unit 51, which is implemented by instructions of the CPU 501 and by the network I/F 507 illustrated in FIG. 12, has a function of transmitting and receiving various types of data or information to and from other apparatuses through the communication network 9. For example, the data exchange unit 51 receives spherical image data and detailed image data from the robot 10 (control device 30) through the communication network 9. Further, for example, the data exchange unit 51 receives (acquires) the state information 170 indicating the state of the robot 10 from the robot 10 (control device 30) through the communication network 9. Furthermore, for example, the data exchange unit 51 transmits the request command generated by the request command generation unit 57 to the robot 10 (control device 30) through the communication network 9.

The acceptance unit 52, which is implemented by instructions of the CPU 501, and an input device (input means) such as the keyboard 512 or the external device connection I/F 514 illustrated in FIG. 12, has a function of receiving various selections or operation inputs to the display terminal 50. For example, the acceptance unit 52 accepts an operation input on a display screen displayed on the display 511 by using the input device such as the keyboard 512. Further, for example, the acceptance unit 52 detects movement of a pointing device such as the mouse 500.

The display screen generation unit 53, which is implemented by instructions of the CPU 501 illustrated in FIG. 12, generates various display screens to be displayed on the display 511. For example, the display screen generation unit 53 generates a display screen to displayed on the display 511 using spherical image data and detailed image data transmitted from the robot 10.

The display control unit 54, which is implemented by instructions of the CPU 501 illustrated in FIG. 12, has a function of controlling the display 511 of the display terminal 50 to display various screen. For example, the display control unit 54 controls the display 511 to display a display screen generated by the display screen generation unit 53, to output the display screen.

The display position identification unit 55, which is implemented by instructions of the CPU 501 and the external device connection I/F 514 illustrated in FIG. 12, has a function of identifying a display position (display direction) of the spherical image displayed on the display 511. For example, the display position identification unit 55 calculates, for example, an amount of movement of the mouse 500 accepted by the acceptance unit 52. Further, for example, the display position identification unit 55 identifies the display position (display direction) of the spherical image based on the amount of movement of the mouse 500.

The determination unit 56, which is implemented by instructions of the CPU 501 illustrated in FIG. 12, has a function of making various determinations. The determination unit 56 determines a particular processing to be requested to the robot 10. For example, the determination unit 56 determines the particular processing to be requested to the robot 10 based on an operation input accepted by the acceptance unit 52. Further, for example, the determination unit 56 determines the particular processing to be requested to the robot 10 based on the state information 170 received (acquired) by the data exchange unit 51.

The request command generation unit 57, which is implemented by instructions of the CPU 501 illustrated in FIG. 12, has a function of generating a request command, which is an execution request for causing the robot 10 to execute a particular processing. For example, the request command generation unit 57 generates a request command that is a request for changing the imaging position of the generic image capturing device 24 of the robot 10.

The captured image acquisition unit 58, which is implemented by instructions of the CPU 501 and the imaging element I/F 505 illustrated in FIG. 12, has a function of acquiring a captured image captured by the CMOS sensor 505a. For example, the captured image acquisition unit 58 acquires captured-image data, which is data of a captured image acquired by capturing an image of a subject by the CMOS sensor 505a, for example. The audio input/output unit 61, which is implemented by instructions of the CPU 501 and the audio input/output I/F 508 illustrated in FIG. 12, has a function of inputting and outputting audio data. For example, the audio input/output unit 61 converts a user's voice collected by the microphone 508a into an audio signal, and performs audio processing on audio data based on the audio signal. Further, for example, the audio input/output unit 61 sets audio data to be output from the speaker 508b, such that the speaker 508b outputs the audio signal based on the set audio data to reproduce sound.

The storage/reading unit 59, which is implemented by instructions of the CPU 501 illustrated in FIG. 12, has a function of storing various data in the storage unit 5000, and reads various data from the storage unit 5000. Further, every time image data and audio data are received in performing communication with robot 10 (the control device 30), the storage/reading unit 59 overwrites data stored in the storage unit 5000 with the received image data and audio data. The display 511 displays an image based on image data before being overwritten, and the speaker 508b outputs sound based on audio data before being overwritten.

State Information Management Table:

FIG. 22A is a conceptual diagram illustrating an example of a state information management table, according to an embodiment. In the storage unit 5000, a state information management DB 5001 storing the state information management table as illustrated in FIG. 22A is stored. The state information management table illustrated in FIG. 22A stores the current state of the robot 10. This state information management table stores, for each of a drive direction of the robot 10 and a drive speed of the robot 10, values (parameters) indicating the current movement state of the robot 10. The drive direction of the robot 10 is indicated by a horizontal angle (DRIVE_H_ANGLE) and a vertical angle (DRIVE_V_ANGLE). The state information management table further stores values (parameters) indicating the current imaging position of the generic image capturing device 24. The imaging position of the generic image capturing device 24 is indicated by a horizontal angle (CAMERA_H_ANGLE), a vertical angle (CAMERA_V_ANGLE), and a zoom amount (CAMERA_ZOOM). Each time the robot 10 moves or each time the imaging position of the generic image capturing device 24 is changed, the display terminal 50 updates (changes) the value of the corresponding item.

Condition Information Management Table:

FIG. 22B is a conceptual diagram illustrating an example of a condition information management table, according to an embodiment. In the storage unit 5000, a condition information management DB 5002 storing the condition information management table as illustrated in FIG. 22B is stored. The condition information management table illustrated in FIG. 22B is used to identify a content of processing or operation to be requested to the robot 10 based on the state information 170 received by the data exchange unit 51. The condition information management table stores, for each of conditions relating to the state of the robot 10, a content of processing in association with the request command to be transmitted to the robot 10. For example, when the drive speed of the robot 10 is equal to or more than 5.0 km/h ("SPEED>5 km/h"), the display terminal 50 identifies a processing of "reducing the frame rate to 3" as the content of the processing, and extracts "FPS(3)" as the request command to be transmitted to the robot 10. "RESOLUTION" is a command relating to a resolution of the spherical image. "ZOOM" is a command relating to a display range (output range) of the spherical image.

The conditions indicated in the condition information management table are not limited to the conditions relating to the drive speed of the robot 10, and, in one example, a condition regarding other information of the moving state acquired by the robot 10 is indicated. For example, the condition information management table indicates a conditions relating to the drive direction of the robot 10. Further, an operator who operates the robot 10 using the display terminal 50 is allowed to modify or change the conditions and/or the contents of the processing indicated in the condition information management table as appropriate.

Further, as indicated in the condition information management table, when the display position of the spherical image and the imaging position of the generic image capturing device 24 are close to each other, the display terminal 50 switches the display screen from the spherical image to the detailed image. This means that when by changing the imaging position of the generic image capturing device 24, the imaging direction and zoom amount of the generic image capturing device 24 catches up to the display position (display direction and zoom amount) of the spherical image, the display on the display 511 is switched from the spherical image to the detailed image. In the embodiment, "the display position of the spherical image and the imaging position of the generic image capturing device 24 are close to each other" is not limited to that the positions are completely the same. It suffices that the positions are within a predetermined range. This predetermined range is set by a designer or a user, for example. In another example, the predetermined range is determined according to a parameter such as the degree of matching or the degree of similarity between the displayed spherical image and the detailed image photographed according to the imaging position of the generic image capturing device 24. In this case, for example, when the parameter such as the degree of matching or the degree of similarity between the spherical image and the detailed image is equal to or more than a set value, the display terminal 50 determines that the imaging position of the generic image capturing device 24 is close to the display position of the spherical image.

User Command Management Table:

FIG. 23A is a conceptual diagram illustrating an example of a user command management table, according to an embodiment. In the storage unit 5000, a user command management DB 5003 storing the user command management table as illustrated in FIG. 23A is stored. The user command management table illustrated in FIG. 23A is used to identify a content of processing or operation to be requested to the robot 10 based on an operation input accepted by the acceptance unit 52. The user command management table stores, for each of input commands, a content of processing in association with a type of the processing. For example, in response to detecting an input command "movement of the mouse 500", the display terminal 50 transmits a request command of LOOK (H, V, Z) to the robot 10 and changes the display position of the spherical image. Further, for example, in response to detecting an input command "the mouse 500 stops after moving", the display terminal 50 transmits a request command of AIM (H, V, Z) to the robot 10. This means that if an instruction is given to the generic image capturing device 24 every time the mouse 500 moves, the instructions are given too frequently, and therefore the request command is transmitted when the mouse 500 is not moved for a predetermined time period after the mouse 500 was moved last.

Display State Management Table:

FIG. 23B is a conceptual diagram illustrating an example of a display state management table, according to an embodiment. In the storage unit 5000, a display state management DB 5004 storing the display state management table as illustrated in FIG. 23B is stored. The display state management table illustrated in FIG. 23B stores and manages parameters of a display position of the spherical image displayed on the display terminal 50 and the imaging position of the detailed image displayed on the display terminal 50. For example, the table of FIG. 23B indicates that the display direction of the spherical image is the horizontal angle "22.0°" and the vertical angle "15.0°", and the zoom amount of the spherical image is 50%. Further, the imaging direction of the detailed image (the generic image capturing device 24) are horizontal angle "−22.2°", and vertical angle "10.0°", and the zoom amount of the detailed image (the generic image capturing device 24) is 22.3%. The display terminal 50 switches an image to be displayed on the display 511 by using the parameters of the display state parameter of each image stored in the display state management table.

Functional Configuration of Communication Management Server:

Referring again to FIG. 20, a description is now given of the functional configuration of the communication management server 90. The communication management server 90 includes a data exchange unit 91, an authentication unit 92, a determination unit 93, a generation unit 94, and a storage/reading unit 99. These units are functions or means implemented by or that are caused to function by operating any of the hardware elements illustrated in FIG. 13 in cooperation with the instructions of the CPU 901 according to the control program expanded to the RAM 903. The communication management server 90 further includes a storage unit 9000, which is implemented by the ROM 902, the HD 904, or the storage medium 906 illustrated in FIG. 13.

The data exchange unit 91, which is implemented by instructions of the CPU 901 and by the network I/F 908 illustrated in FIG. 13, has a function of transmitting and receiving various types of data or information to and from other apparatuses through the communication network 9.

The authentication unit 92, which is implemented by instructions of the CPU 901 illustrated in FIG. 13, has a function of authenticating a login request source based on login request information received by the data exchange unit 91. For example, the authentication unit 92 searches an authentication management DB 9001 in the storage unit 9000 using a terminal identification (ID) and a password included in the login request information received by the data exchange unit 91 as search keys. The authentication unit 92 determines whether the authentication management DB 9001 stores a combination of a terminal ID and a password identical to the terminal ID and the password included in the login request information, to perform a terminal authentication.

The determination unit 93, which is implemented by instructions of the CPU 901 illustrated in FIG. 13, has a function of determining whether a terminal ID of the display terminal 50 is stored in a session management table described below. The generation unit 94, which is implemented by instructions of the CPU 901 illustrated in FIG. 13, generates a session ID used for communication.

Figure 27:
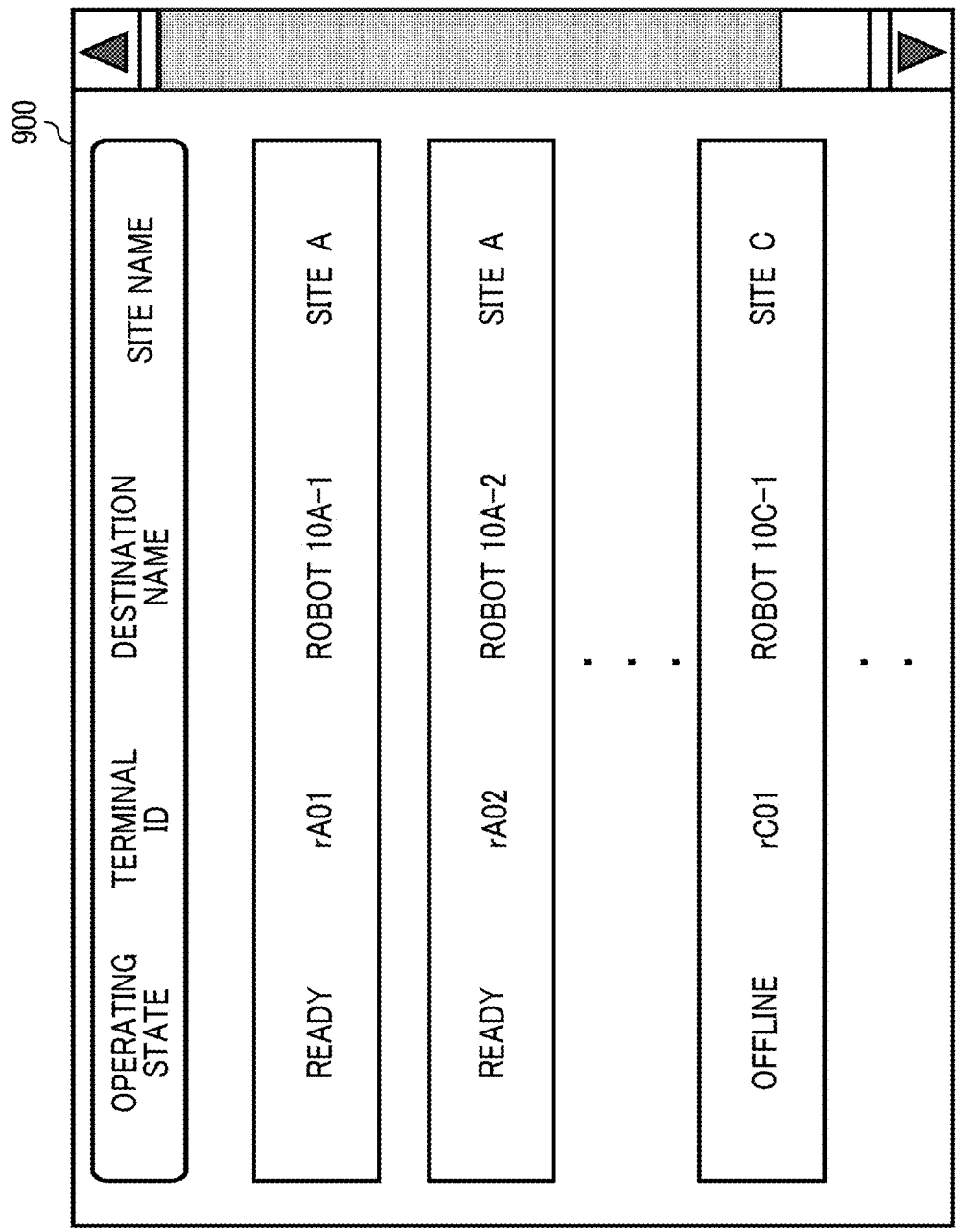
FIG. 27 is a diagram illustrating an example of a destination list screen displayed on the display terminal, according to an embodiment of the present disclosure.

The storage/reading unit 99, which is implemented by instructions of the CPU 901 illustrated in FIG. 13, has a function of storing various data in the storage unit 9000, and reads various data from the storage unit 9000. Further, the storage unit 9000 includes destination list frame data (icons and destination list content information such as "rA01", "robot 10A-1" illustrated in FIG. 27 are not included) in a destination list screen 900 (see FIG. 27) described below.

Authentication Management Table:

FIG. 24A is a conceptual diagram illustrating an example of an authentication management table, according to an embodiment. In the storage unit 9000, an authentication management DB 9001 storing the authentication management table as illustrated in FIG. 24A is stored. The authentication management table stores, for each of terminal IDs of all the display terminals 50 managed by the communication management server 90, the terminal ID in association with a password. For example, the authentication management table illustrated in FIG. 24A indicates that the terminal ID of the display terminal 50A is "o01" and its password is "aaaa".

Terminal Management Table:

FIG. 24B is a conceptual diagram illustrating an example of a terminal management table, according to an embodiment. In the storage unit 9000, a terminal management DB 9002 storing the terminal management table as illustrated in FIG. 24B is stored. The terminal management table stores, for each of the terminal IDs of the terminals (the robots 10 and the display terminals 50), a terminal name of the terminal, an IP address of the terminal, operating state information indicating a current operating state of the terminal, and a site name indicating a site where the robot 10 is located in a case where the terminal is the robot 10, in association with one another. For example, the terminal management table illustrated in FIG. 24B indicates that the display terminal 50 whose terminal ID is "o01" has the terminal name "display terminal 50A", the IP address of the display terminal 50 is "1.2.1.3", and the operating state is "Online (Ready)". Further, this terminal management table indicates that the robot 10 whose terminal ID is "rA01" has the terminal name "robot 10A-1", the IP address of the robot 10 is "1.3.2.3", the operating state is "Online (Ready), and the site name is "Site A".

Destination List Management Table:

FIG. 25A is a conceptual diagram illustrating an example of a destination list management table, according to an embodiment. In the storage unit 9000, a destination list management DB 9003 storing the destination list management table as illustrated in FIG. 25A is stored. The destination list management table stores, for each of the display terminals 50 as source terminals each requesting the start of communication with the robot 10, the terminal ID of the display terminal 50 in association with the terminal ID of the destination candidate robots 10 registered as candidates of robots 10 as destination terminal of the communication. For example, the destination list management table illustrated in FIG. 25A indicates that destination terminal candidates to which the source terminal (display terminal 50A) whose terminal ID is "o01a" can send a communication start request are the robot 10A-1 whose terminal ID is "rA01", the robot 10A-2 whose terminal ID is "rA02", and the robot 10C-1 whose terminal ID is "rC01". The terminal IDs of the robots 10 as the destination terminal candidates are updated by addition or deletion in response to an addition or deletion request transmitted from any source terminal (display terminal 50) to the communication management server 90.

Session Management Table:

FIG. 25B is a conceptual diagram illustrating an example of a session management table, according to an embodiment. In the storage unit 9000, a session management DB 9004 storing the session management table as illustrated in FIG. 25B is stored. The session management table stores, for each of session IDs each identifying a session used when the robot 10 and the display terminal 50 communicate with each other, the session ID in association with the terminal IDs of the robot(s) 10 and the display terminal(s) 50 using the session identified by the associated session ID. For example, in the session management table illustrated in FIG. 25B indicates that terminals using the session executed using the session ID "se1" are the display terminal 50A whose terminal ID is "o01", the robot 10A-2 whose terminal ID is "rA02", and the robot 10C-1 whose terminal ID is "rC01".

Processes or Operation of Embodiment

A description is now given of processes or operation performed by the remote control system 1a, according to an embodiment, with reference to FIG. 26 to FIG. 43A and FIG. 43B. In the following description, processes performed by the control device 30 of the robot 10 are described as processes performed by the robot 10.

Figure 26:
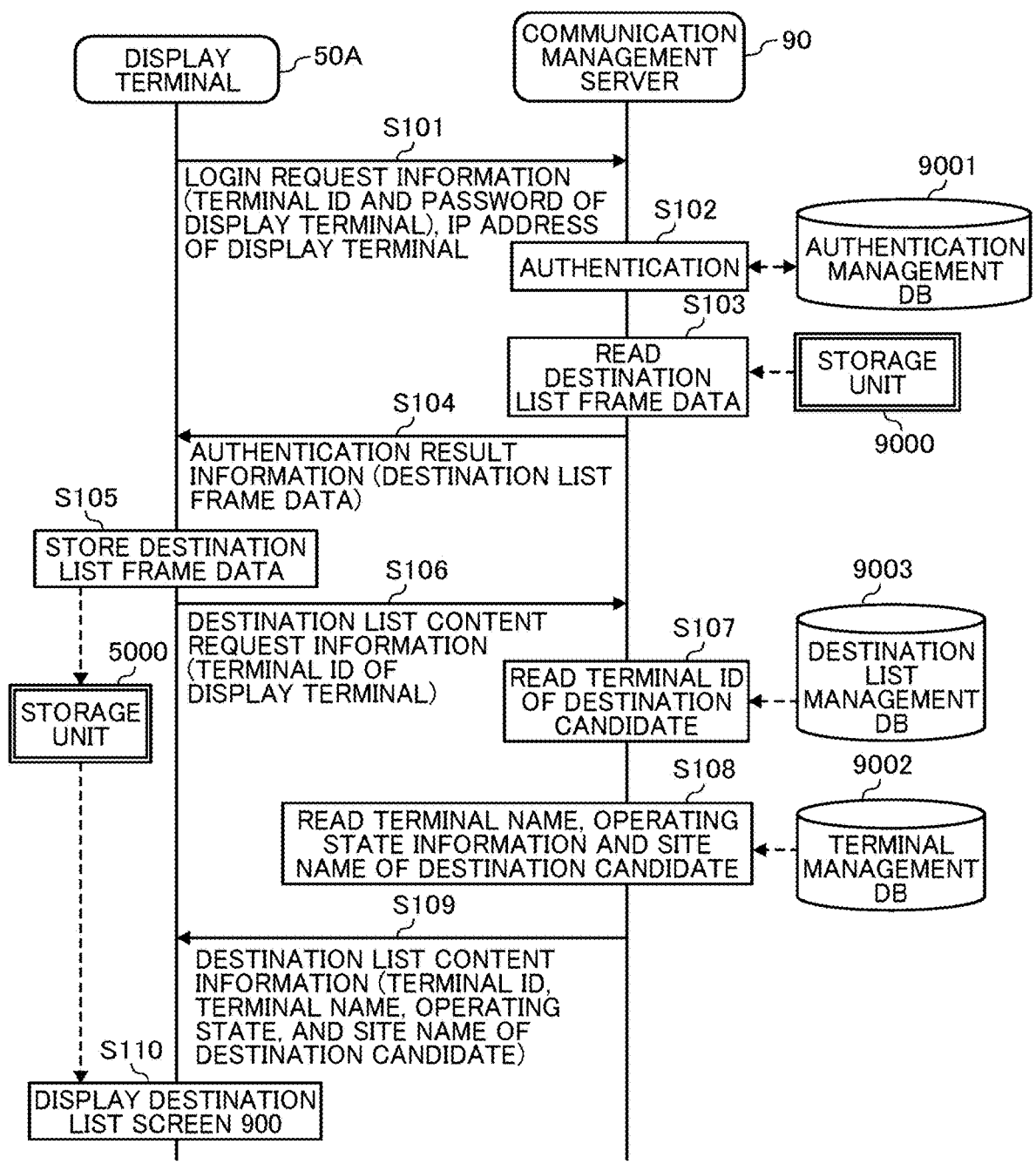
FIG. 26 is a sequence diagram illustrating an example of operation performed at preparatory stage for starting data exchange between the robot and the display terminal in the remote control system, according to an embodiment of the present disclosure.
Figure 28:
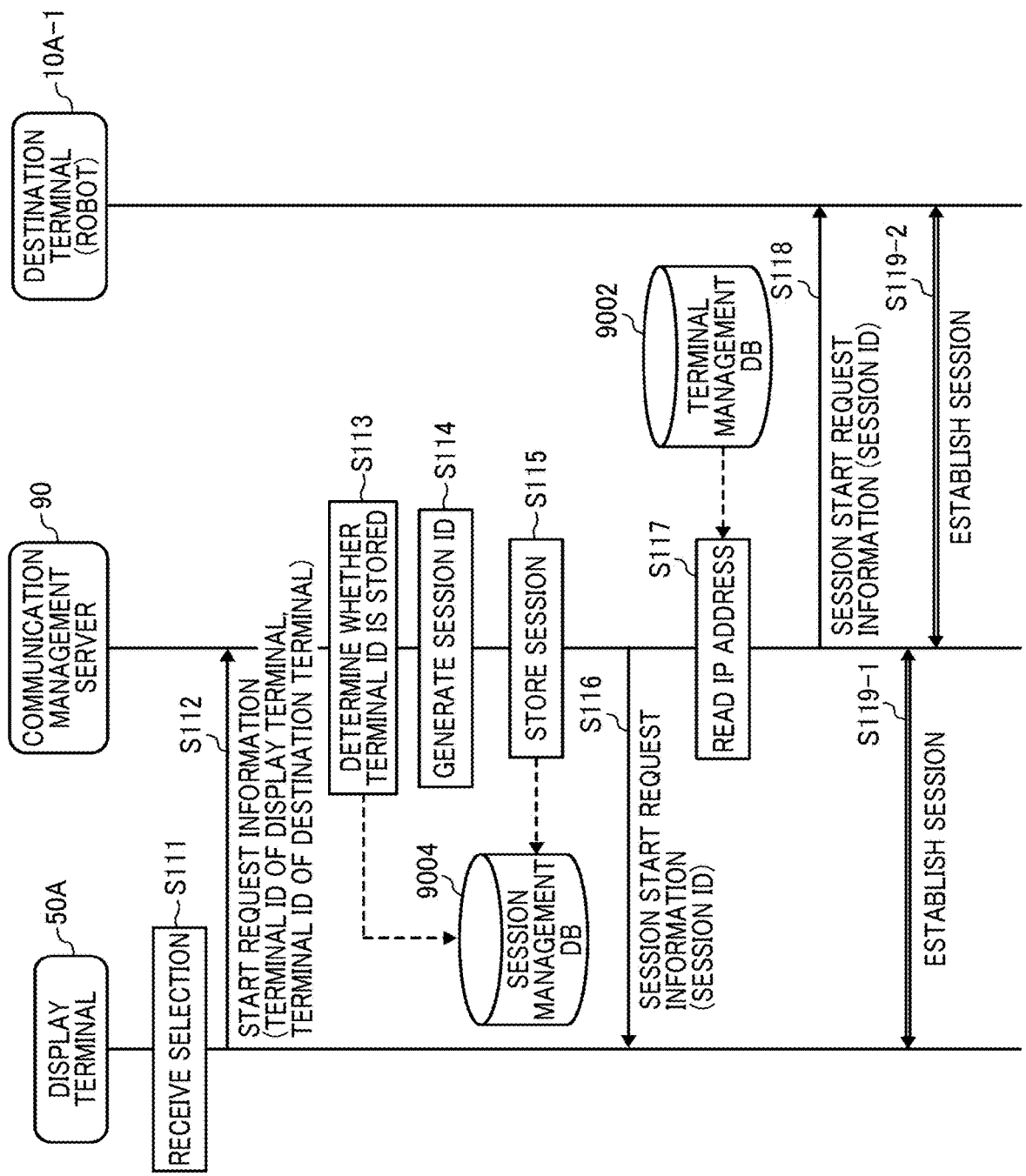
FIG. 28 is a sequence diagram illustrating an example of operation from a selection of a destination candidate to a start of data transmission/reception, performed by the remote control system, according to an embodiment of the present disclosure.

Establishing Communication Session:

First, a description is given of operation of establishing a communication session between the robot 10 and the display terminal 50, with reference to FIG. 26 to FIG. 28. FIG. 26 is a sequence diagram illustrating an example of operation performed at preparatory stage for starting data exchange between the robot 10 and the display terminal 50 in the remote control system 1a, according to an embodiment. In the embodiment, a description is given of operation of exchanging management information items at the preparation stage performed before starting data exchange between the display terminal 50A as a source terminal and the robot 10A-1 as a destination terminal.

First, the data exchange unit 51 of the display terminal 50A transmits login request information indicating a login authentication request to the communication management server 90 through the communication network 9 (step S101). Specifically, when the user of the display terminal 50A turns on the power switch of the display terminal 50A, the power is turned on. In response the power being turned on, the data exchange unit 51 of the display terminal 50A transmits the login request information from the data exchange unit 51 to the communication management server 90 through the communication network 9. Thereby, the data exchange unit 91 of the communication management server 90 receives the login request information transmitted from the display terminal 50A.

The login request information includes a terminal ID identifying the source terminal as the display terminal 50A, and a password. The terminal ID and the password are data that have been read by the storage/reading unit 59 from the storage unit 5000 and sent to the data exchange unit 51. The terminal ID and password are sent in any other suitable manner than the above. In another example, a terminal ID and/or a password input by the user using the an input device (input means) such as the keyboard 512 is transmitted. In still another example, a terminal ID and/or a password read from a storage medium such as a subscriber identity module (SIM) card or an SD card connected to the display terminal 50A is transmitted.

When the login request information is transmitted from the display terminal 50A to the communication management server 90, the communication management server 90 on the receiving side acquires the IP address of the display terminal 50A on the transmitting side. The start of the login request does not necessarily have to be triggered by turning on the power switch. In another example, the login request is transmitted in response to an input to an input device (input means) such as the display 511.

Next, the authentication unit 92 of the communication management server 90 searches the authentication management table (see FIG. 24A) stored in the storage unit 9000 using the terminal ID and the password included in the login request information received by the data exchange unit 91 as search keys, to perform authentication by determining whether the same terminal ID and the same password are stored in the authentication management DB 9001 (step S102). In the following, a description is given of a case where the authentication unit 92 determines that the display terminal 50A is a terminal that has a valid usage authorization.

When the authentication unit 92 determines that the same terminal ID and the same password are stored and therefore the login request is transmitted from a source terminal having a valid usage authorization, the storage/reading unit 99 reads out the destination list frame data from the storage unit 9000 (step S103).

The data exchange unit 91 transmits an authentication result information indicating an authentication result obtained by the authentication unit 92 to the display terminal 50A, which is the login request sender, through the communication network 9 (step S104). The authentication result information includes the destination list frame data that is read out in step S103. Thereby, the data exchange unit 51 of the display terminal 50A receives the authentication result information. Then, the storage/reading unit 59 of the display terminal 50A stores the destination list frame data received in step S104 in the storage unit 5000 (step S105).

Next, in response to receiving the authentication result information indicating the authentication result obtained by determination that the terminal has a valid usage authorization, the data exchange unit 51 transmits destination list content request information requesting a content of a destination list to the communication management server 90 via the communication network 9 (step S106). This destination list content request information includes the terminal ID of the display terminal 50A. Thereby, the data exchange unit 91 of the communication management server 90 receives the destination list content request information.

Next, the storage/reading unit 99 of the communication management server 90 searches the destination list management DB 9003 (FIG. 25A) using the terminal ID "o01" of the display terminal 50 received in step S106 as a search key, to read terminal IDs of all the destination candidates associated with the terminal ID (step S107). Further, the storage/reading unit 99 searches the terminal management DB 9002 (FIG. 24B) using each of the terminal IDs read in step S107 as a search key, to read the terminal name, operating state information, and site name of the associated destination candidate (step S108).

Next, the data exchange unit 91 transmits destination list content information to the display terminal 50A through the communication network 9 (step S109). The destination list content information includes the terminal IDs of the destination candidates read in step S107 and the terminal names, operating state information, and site names of the destination candidates read in step S108. Thereby, the data exchange unit 51 of the display terminal 50A receives the destination list content information.

Next, the display control unit 54 of the display terminal 50A controls the display 511 to display the destination list screen 900, which is generated using the destination list frame data stored in the storage unit 5000 in step S105 and the destination list content information received in step S109 (step S110). FIG. 27 is a diagram illustrating an example of a destination list screen 900 displayed on the display terminal, according to an embodiment. The destination list screen 900 illustrated in FIG. 27, displays, for each of the destination candidates, an icon indicating the operating state of the destination candidate terminal (robot 10), the terminal ID of the destination candidate terminal, the destination name of the destination candidate, and the base name of the destination candidate terminal. Note that the "terminal name" received in step S109 is displayed as the "destination name" on the destination list screen 900 illustrated in FIG. 27.

A description is now given of operation from a selection of a destination candidate at the display terminal 50 to a start of transmission/reception of image data, with reference to FIG. 28. FIG. 28 is a sequence diagram illustrating an example of operation from a selection of a destination candidate to a start of data transmission/reception, performed by the remote control system 1a, according to an embodiment.

First, the acceptance unit 52 of the display terminal 50A receives selection of a destination candidate (in this example, the robot 10A-1) on the destination list screen 900 illustrated in FIG. 27 from the user (step S111). Then, the data exchange unit 51 transmits start request information indicating a request for a start of transmission/reception of image data, etc. to the communication management server 90 (step S112). This start request information includes the terminal ID of the display terminal 50A and the terminal ID of the destination candidate terminal. Thereby, the data exchange unit 91 of the communication management server 90 receives the start request information.

Next, the determination unit 93 of the communication management server 90 determines whether the terminal ID of the display terminal 50A received in step S112 is stored in the session management table (see FIG. 25B) (S113). In this example, the following describes a case in which the terminal ID of the destination candidate terminal (robot 10A-1) is not stored.

When the terminal ID of the destination candidate terminal is not stored, the generation unit 94 generates a new session ID (step S114). Then, the storage/reading unit 99 adds, in the session management table (FIG. 25B), a record associating the session ID generated in step S114, and the terminal ID of the display terminal 50A and the terminal ID of the destination candidate terminal received in step S112 (step S115). In this example, as illustrated in FIG. 25B, a new record associating the session ID "se3" with the terminal IDs "o01" and "rA01" are stored.

Next, the data exchange unit 91 transmits session start request information requesting a start of a session to the display terminal 50A (step S116). This session start request information includes the session ID generated in step S114. Thereby, the data exchange unit 51 of the display terminal 50A receives the session start request information.

The storage/reading unit 99 of the communication management server 90 searches the terminal management DB 9002 (see FIG. 24B) using the terminal ID of the destination candidate terminal (robot 10A-1) received in step S112 as a search key, to read the associated IP address (step S117). Then, the data exchange unit 91 transmits session start request information requesting a start of a session to the destination candidate terminal (robot 10A-1) indicated by the IP address read in step S117 (step S118). This session start request information includes the session ID generated in step S114. Thereby, the data exchange unit 31 of the destination terminal (robot 10A-1) receives a session start instruction.

Thus, the source terminal (display terminal 50A) and the destination terminal (robot 10A-1) each establish a communication session with the communication management server 90 (steps S119-1 and S119-2). In the following description, it is assumed that the display terminal 50 uses the communication session established with the communication management server 90 to perform streaming communication with the robot 10.

Figure 29:
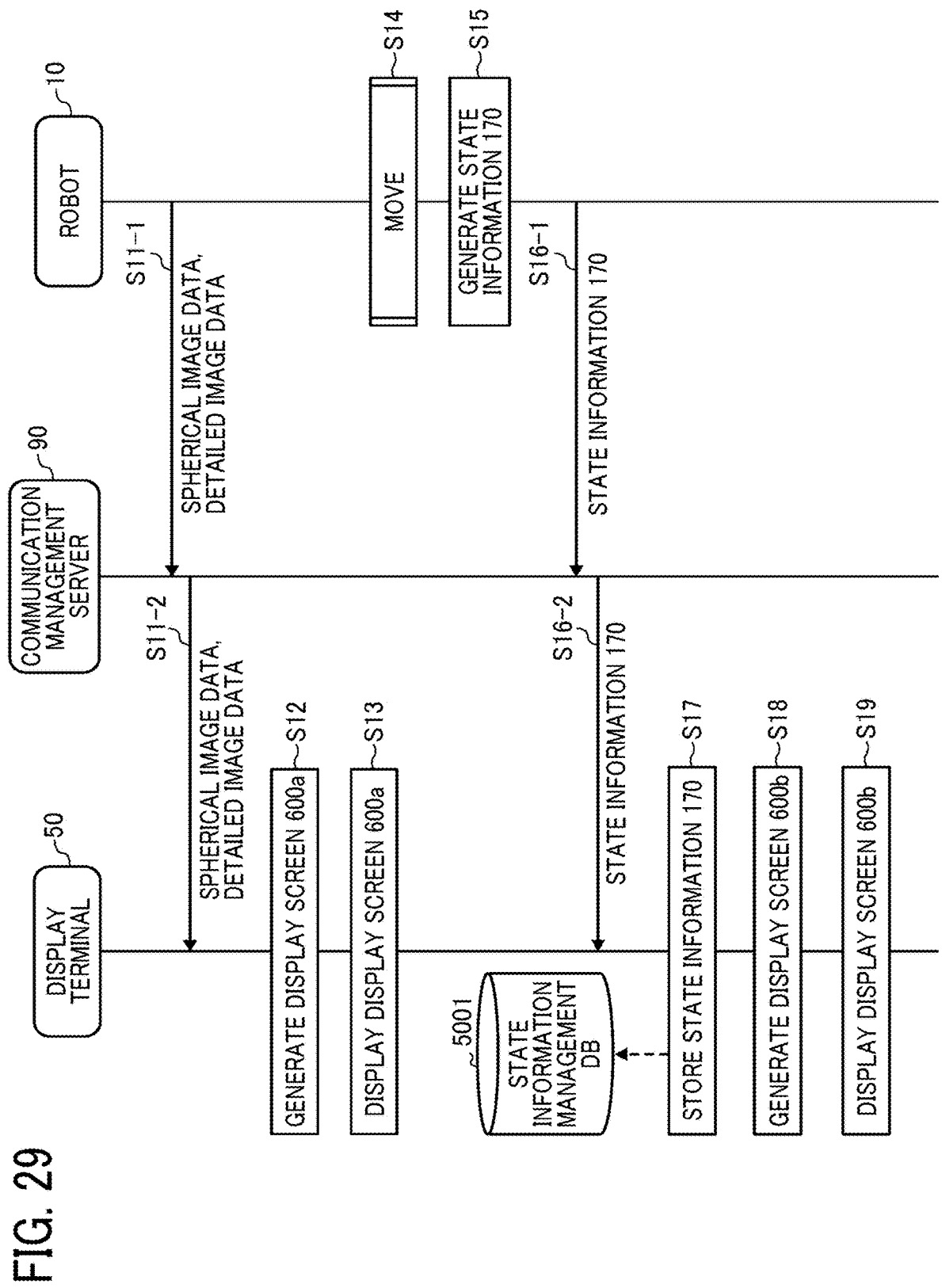
FIG. 29 is a sequence diagram illustrating an example of operation of transmitting various data from the robot to the display terminal in the remote control system, according to an embodiment of the present disclosure.

Operation Using Remote Communication:
Transmission of Screen Data and Display:

A description is now given of data transmitted from the robot 10 to the display terminal 50 using the session established with the communication management server 90, and operation of controlling processing or operation of the robot 10 by the display terminal 50. FIG. 29 is a sequence diagram illustrating an example of operation of transmitting various data from the robot 10 to the display terminal 50 in the remote control system 1a, according to an embodiment.

First, the data exchange unit 31 of the robot 10 transmits, to the display terminal 50, spherical image data acquired by the special image capturing device 21 and detailed image acquired by the generic image capturing device 24, using the communication session established with the communication management server 90 (steps S11-1, S11-2). Thereby, the data exchange unit 51 of the display terminal 50 receives the spherical image data and the detailed image data transmitted from the robot 10.

The robot 10 starts image capturing by the special image capturing device 21 and the generic image capturing device 24, triggered by an image capturing instruction from the image capturing control unit 37 to the special image capturing device 21 and the generic image capturing device 24. The captured image acquisition unit 38 of the robot 10 acquires spherical image data, which is data of a spherical image obtained by the special image capturing device 21, and detailed image data, which is data of a detailed image obtained by the generic image capturing device 24, respectively from the special image capturing device 21 and the generic image capturing device 24. The data exchange unit 31 of the robot 10 transmits the spherical image data and the detailed image data acquired by the captured image acquisition unit 38 to the display terminal 50.

Figure 30:
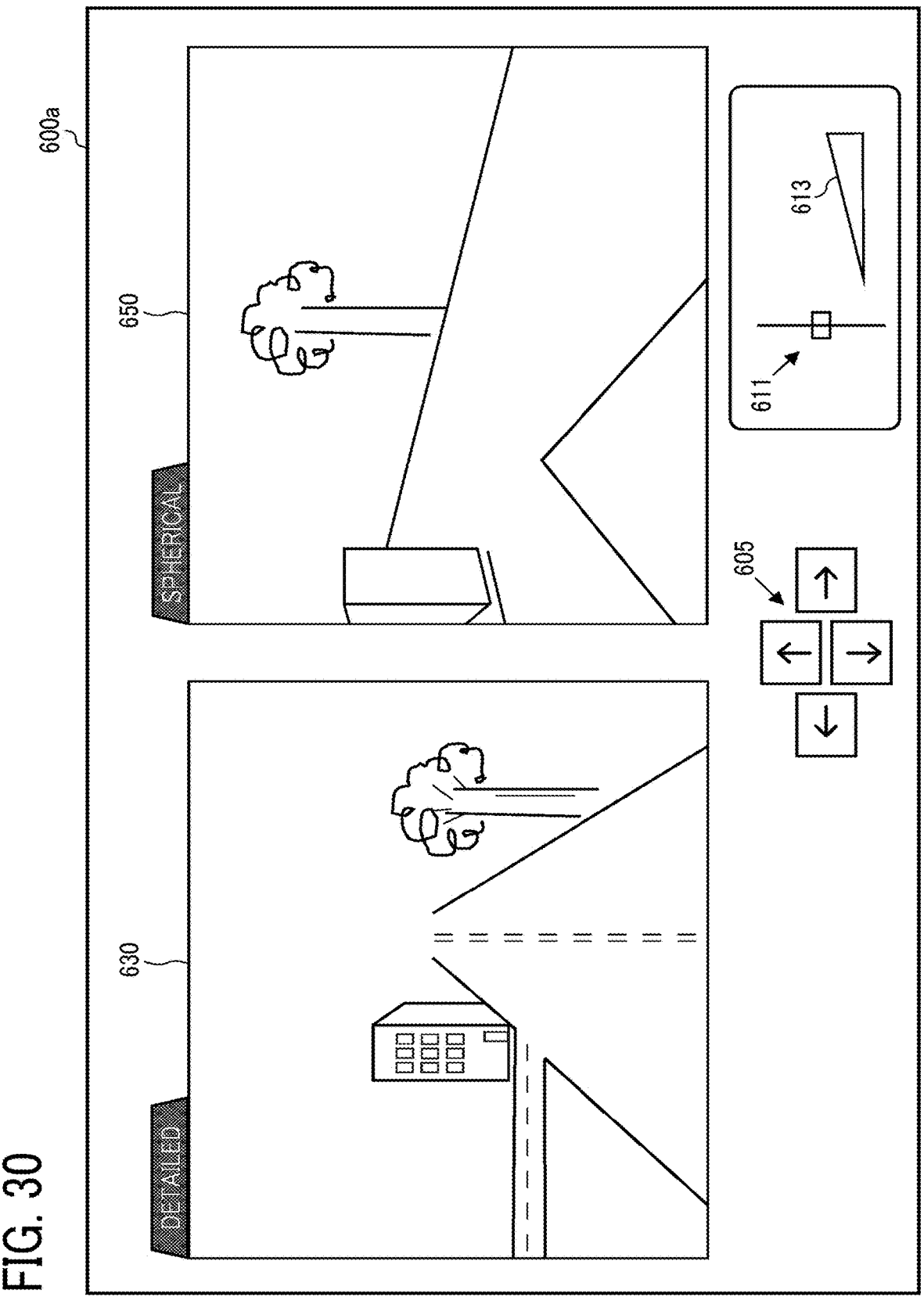
FIG. 30 is a diagram illustrating an example of a display screen displayed on the display terminal, according to an embodiment of the present disclosure.

Next, the display screen generation unit 53 of the display terminal 50 generates a display screen 600a to be displayed on the display 511 using the spherical image data and the detailed image data received by the data exchange unit 51 (step S12). Then, the display control unit 54 controls the display 511 to display the display screen 600a generated by the display screen generation unit 53 (step S13). Referring to FIG. 30, the display screen 600a displayed on the display 511 in step S13 is described. The display screen 600a illustrated in FIG. 30 includes a display area 630 and a display area 650. In the display area 630, the detailed image represented by the detailed image data transmitted from the robot 10 is displayed. In the display area 650, the spherical image represented by the spherical image data transmitted from the robot 10 is displayed. The display screen 600a further includes a movement instruction keypad 605, a zoom bar 611, and a speed bar 613. The movement instruction keypad 605 is pressed to request movement of the robot 10 in the horizontal direction (forward, backward, right rotation, left rotation). The zoom bar 611 indicates a zoom state of the spherical image displayed in the display area 610. The speed bar 613 displays a movement speed indicating a state of the movement speed of the robot 10.

In the display area 650, a part (e.g., the viewable-area image Q illustrated in FIG. 17, FIG. 18A and FIG. 18B) of a spherical image represented by the spherical image data transmitted from the robot 10 is displayed. The operator moves the mouse 500 to the display area 610 in which the spherical image is displayed and performs a predetermined input operation, to change the display direction of the spherical image or the degree of zoom.

This enables the operator, who remotely operates the robot 10 using the display terminal 50, to check a situation of the site where the robot 10 is located while viewing the display screen 600a on which the spherical image and the detailed image are displayed.

Since the operator of the robot 10 remotely operates the robot 10 while viewing the spherical image and the detailed image displayed on the display terminal 50, an image displayed on the display terminal 50 is required to be in real time. Therefore, the data exchange unit 31 of the robot 10 continuously transmits the spherical image data acquired by the special image capturing device 21 to the display terminal 50. Due to such characteristics, it is preferable that the spherical image data obtained by the special image capturing device 21 is moving image data. In this case, the operator who operates the robot 10 using the display terminal 50 operates the robot 10 remotely, while checking moving image data of the spherical image which is transmitted from the robot 10 and thereby streamed on the display terminal 50. This allows the operator to check a wide area around the robot 10 without changing the direction of the special image capturing device 21 or the robot 10.

Although the description given referring to FIG. 30 is of an example in which in which the movement of the robot 10 is remotely controlled by receiving the operation input to the movement instruction keypad 605 displayed on the display screen 600a of FIG, the movement operation is not limited to this. In another example, the movement operation of the robot 10 is performed by a keyboard, a dedicated controller such as a game pad having a joystick, or the like. In still another example, the display terminal 50 displays a list of names of a destination to which the robot 10 is requested to be moved or a list of persons to meet on the display screen 600a, to allow the user to select a desired name or input an address. In this case, the display terminal 50 transmits a request command for moving the robot 10 to the input specific location to the robot 10, and the robot 10 autonomously moves to the destination specified by the request command.

Referring again to FIG. 29, the robot 10 moves within the site based on a request command or the like described below transmitted from the display terminal 50 (step S14). In this case, the movement control unit 41 of the robot 10 controls the drive of the movement mechanism 17 based on the request command or the like described below transmitted from the display terminal 50.

Next, the state information generation unit 35 generates the state information 170 indicating the state of the robot 10 based on the drive state of the movement mechanism 17 acquired from the movement control unit 41 (step S15). FIG. 31 is a diagram illustrating an example of the state information 170 indicating the state of the robot 10, according to an embodiment. The state information 170 illustrated in FIG. 31 includes information corresponding to items of the drive direction (horizontal angle and vertical angle) and drive speed of the robot 10. The state information 170 illustrated in FIG. 31 further includes information corresponding to items of the imaging direction (horizontal angle and vertical angle) of the generic image capturing device 24 and the zoom amount. The state information 170 indicates, a variable name corresponding to each of the items and a numerical value corresponding to the variable name. For example, in the case of the state information 170 illustrated in FIG. 31, the robot 10 is moving in the drive speed of "3.0 km/h" and the drive direction of the horizontal angle "30°" and vertical angle "45°". Further, the imaging direction of the generic image capturing device 24 is the horizontal angle "−22.2°" and vertical angle "10.00°", and the zoom amount is "22.3%". The items of the state of the robot 10 included in the state information 170 is not limited to the above described items. In another example, the items include information such as a moving distance of the robot 10.

The data exchange unit 31 of the robot 10 transmits the state information 170 generated by the state information generation unit 35 to the display terminal 50 using the communication session established with the communication management server 90 (step S16-1, step S16-2). Thereby, the data exchange unit 51 of the display terminal 50 receives the state information 170 transmitted from the robot 10.

Then, the storage/reading unit 59 of the display terminal 50 stores the state information 170 received by the data exchange unit 51 in the state information management DB 5001 (see FIG. 22A) stored in the storage unit 5000 (step S17). Specifically, the storage/reading unit 59 stores each of the numerical values included in the received state information 170 in a field associated with the corresponding variable name of the state information management table, thereby updating the value of each item included in the state information management table.

Next, the display screen generation unit 53 generates a display screen 600b to be displayed on the display 511 using the state information 170 received in step S16-2 to (step S18). The display screen 600b generated by the display screen generation unit 53 is screen data in which the characteristics of the received state information 170 is included together with the spherical image data and the detailed image data transmitted from the robot 10. Then, the display control unit 54 controls the display 511 to display the display screen 600b generated by the display screen generation unit 53 (step S19).

Figure 32:
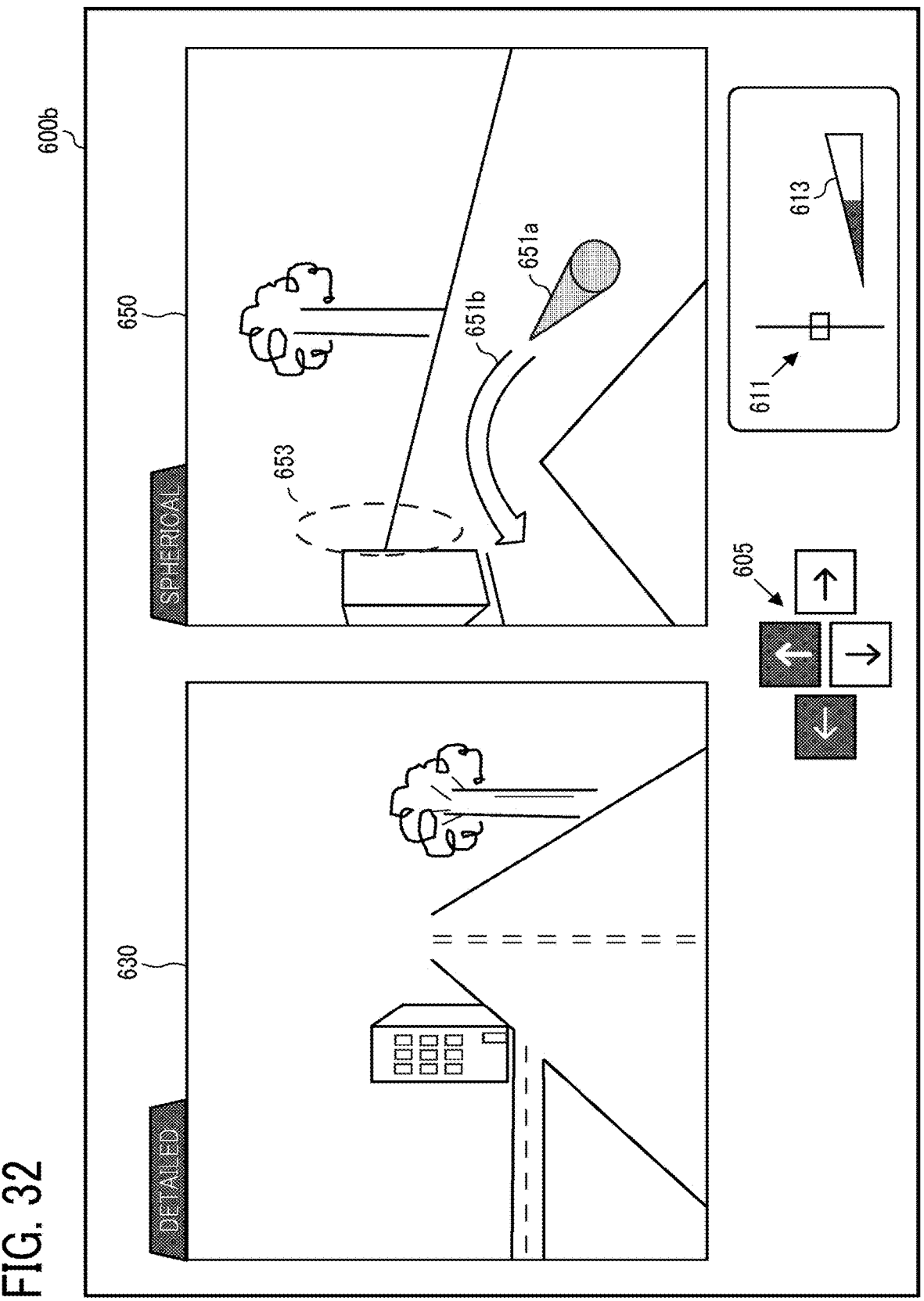
FIG. 32 is an illustration of an example of a display screen displayed on the display terminal when the robot is moving forward in the remote control system, according to an embodiment of the present disclosure.

A description is now given of the display screen 600b displayed in step S19, with reference to FIG. 32. FIG. 32 is an illustration of an example of a display screen displayed on the display terminal 50 when the robot 10 is moving forward in the remote control system 1a, according to an embodiment. The display screen 600b illustrated in FIG. 32 includes indications of the movement state of the robot 10 in addition to the display screen 600a. The display screen 600b includes an object 651a having a cylindrical shape, a drive direction icon 651b, and an imaging position icon 653 in the display area 650 in which the spherical image is displayed. The object 651a indicates the position of the robot 10. The drive direction icon 651b has a shape of arrow indicating a direction in which the robot 10 is moving. The imaging position icon 653 indicates an imaging position of the generic image capturing device 24. The object 651a is an example of an object image, and the drive direction icon 651b is an example of a drive direction image. Further, the imaging position icon 653 is an example of an imaging position image.

Further, on the display screen 600b, the colors of the "forward" and "left rotation" keys of the movement instruction keypad 605 are changed, thereby indicating that the robot 10 is moving forward to the left. The display screen generation unit 53 updates the indication of the movement instruction keypad 605 based on the numerical values corresponding to the variable names "DRIVE_H_ANGLE" and "DRIVE_V_ANGLE" included in the state information 170. In another example, the display screen generation unit 53 updates the indication of the movement instruction keypad 605 in response to receiving an operation input on the movement instruction keypad 605. Further, on the display screen 600b, the drive speed of the robot 10 is indicated by the ratio of the black portion of the speed bar 613. The display screen generation unit 53 updates the display of the speed bar 607 based on the numerical value corresponding to the variable name "DRIVE_SPEED" included in the state information 170.

Figure 33:
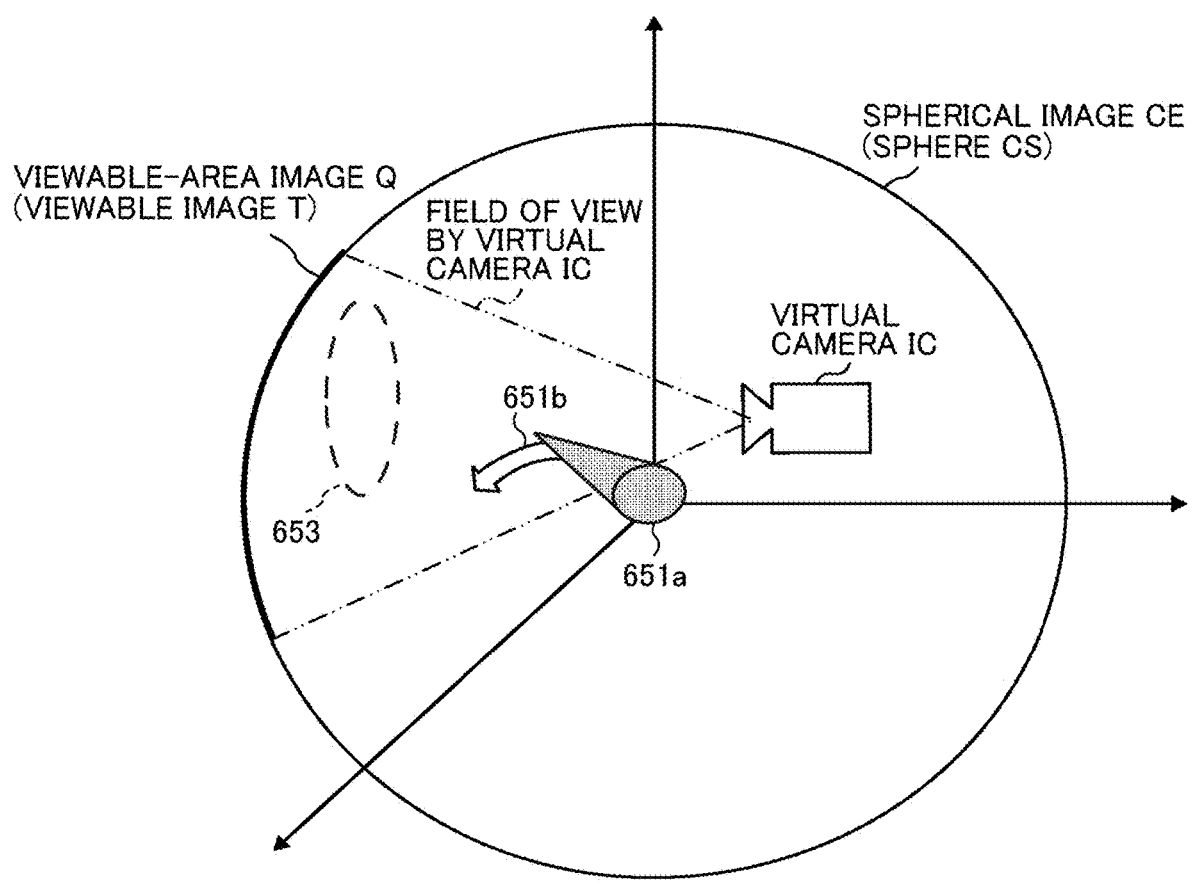
FIG. 33 is a diagram for describing an example of the spherical image displayed on the display terminal, according to an embodiment of the present disclosure.

A description is now given of a spherical image displayed on the display terminal 50, with reference to FIG. 33. FIG. 33 is a diagram for describing an example of a spherical image displayed on the display terminal 50, according to an embodiment. As illustrated in FIG. 16A and FIG. 16B to FIG. 19, the spherical image CE is projected on the inner wall of the three-dimensional virtual space (the solid sphere CS) having a spherical shape, and the virtual camera IC is arranged at the center position of the three-dimensional virtual space. An image viewed from the virtual camera IC is an image displayed on the display 511 of the display terminal 50.

As illustrated in FIG. 33, in the present embodiment, the virtual camera IC arranged inside the solid sphere CS is arranged as being shifted upward and rearward from the center position of the sphere CS. Further, the object 651a indicating the robot 10 is arranged at the center position of the three-dimensional virtual space (solid sphere CS) having a spherical shape. The display screen generation unit 53 superimposes an image indicating the presence of the robot 10, i.e., the object 651a, on the spherical image CE viewed from the virtual camera IC, i.e. the viewable-area image Q, to generate the display screen 600b.

Thus, the display terminal 50 arranges the virtual camera IC at a position apart from the center position of the three-dimensional virtual space (solid sphere CS) having a spherical shape, and sets the position where the virtual camera IC is arranged as the origin of the field of view, thereby bringing the existence of the robot 10 (the object 651a) within the field of view of the virtual camera IC. This enables the user of the display terminal 50 to check both the existence of the robot 10 (the object 651a) and the spherical image CE (the viewable-area image Q) at the same time from a so-called pseudo third-person view (TPV).

Further, when changing the display position (the viewable area T) of the spherical image CE, the display terminal 50 changes the position of the virtual camera IC, which is the origin of the field of view. In this case, when changing the position of the virtual camera IC, the display terminal 50 moves the position of the virtual camera IC so that the existence of the robot (the object 651a) is always within the view of the virtual camera IC. For example, when changing the display position (the viewable area T) of the spherical image CE in the vertical direction (upper side of the solid sphere CS illustrated in FIG. 33), the display terminal 50 not only changes the direction of the virtual camera IC (changes the field of view upward), but also moves the position of the virtual camera IC in the direction opposite with respect to the field of view of the virtual camera IC, i.e., moves the position of the virtual camera IC to the lower side of the sheet on which FIG. 33 is drawn. Further, for example, when changing the display position (the viewable area T) of the spherical image CE from left to right (right side of the solid sphere CS illustrated in FIG. 33), the display terminal 50 not only changes the direction of the virtual camera IC (changes the field of view to the right), but also moves the position of the virtual camera IC in the direction opposite with respect to the field of view of the virtual camera IC, i.e., moves the position of the virtual camera IC to the left side of the sheet on which FIG. 33 is drawn. As a result, the virtual camera IC brings the presence of the robot (the object 651a) into view even when the display position (the viewable area T) of the spherical image is changed.

Thus, by checking the spherical image CE displayed on the display 511, the user of the display terminal 50 smoothly recognizes the situation of the site as well as the relative position of the robot 10 by the object 651a. Accordingly, the operability of the robot 10 is improved.

Further, as illustrated in FIG. 33, the drive direction icon 651b indicating the drive direction of the robot 10 is arranged inside the solid sphere CS. The display screen generation unit 53 generates the display screen 600b in which the drive direction icon 651b is superimposed on the spherical image CE (the viewable-area image Q), based on the numerical values corresponding to the variable names "DRIVE_H_ANGLE" and "DRIVE_V_ANGLE" included in the state information 170. Thereby, even when the user of the display terminal 50 changes the display position (the viewable area T) of the spherical image CE by, for example, an operation of changing the display direction of the spherical image or enlarging or reducing the spherical image, the drive direction icon 651b is displayed on the display screen 600b. This enables the user to recognize the state (direction or drive direction) of the robot 10, thereby improving the operability of the robot 10.

Further, as illustrated in FIG. 33, the imaging position icon 653 indicating the imaging position of the generic image capturing device 24 is arranged inside the solid sphere CS. The display screen generation unit 53 generates the display screen 600b in which the imaging position icon 653 is superimposed on the spherical image CE (the viewable-area image Q), based on the numerical values corresponding to the variable names "CAMERA_H_ANGLE" and "CAMERA_V_ANGLE" included in the state information 170. This enables the user of the display terminal 50 to recognize which position in the spherical image CE (the viewable-area image Q) is imaged to obtain the detailed image displayed on the display screen 600b.

Thus, the display terminal 50 generates the pseudo TPV by using the spherical image CE, and displays not only the situation of the site indicated by the spherical image CE, but also the position and movement state of the robot 10 and the imaging position by the generic image capturing device 24, each being superimposed on the spherical image, thereby improving operability while allowing the user to recognize the situation of the site.

As described heretofore, the remote control system 1a controls the display terminal 50 to display the spherical image and the detailed image based on the spherical image data and detailed image data transmitted from the robot 10 (control device 30), thereby enabling the operator who remotely operates the robot 10 using the display terminal 50 to more accurately recognize information around the robot 10. Further, the display terminal 50 displays information indicating the movement state of the robot 10 together with the spherical image represented by the spherical image data, thereby notifying the operator who remotely operates the robot 10 using the display terminal 50 of the movement state of the robot 10 in addition to information around the robot 10.

In one example, the state information generation unit 35 of the robot 10 is configured to generate the state information 170 when the drive state of the movement mechanism 17 acquired from the movement control unit 41 changes. In another example, the state information generation unit 35 is configured to generate the state information 170 at intervals determined in advance. In still another example, the data exchange unit 31 of the robot 10 is configured to hold the state information 170 generated by the state information generation unit 35 and transmit the state information 170 at intervals determined in advance. In this case, the remote control system 1a can reduce uncomfortable feelings of the user viewing the display screen caused by the frequent change of the state of the robot 10 displayed on the display terminal 50.

Figure 34:
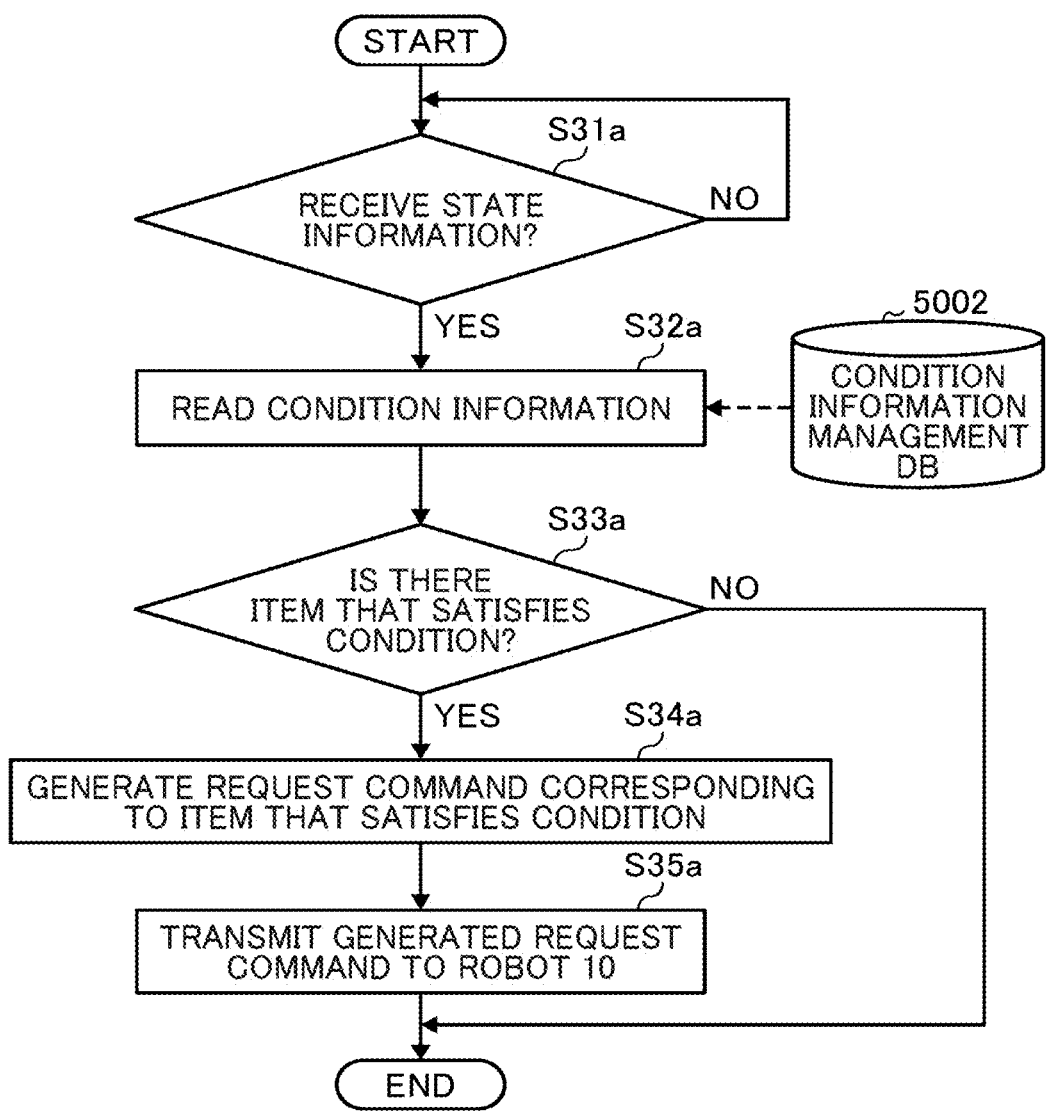
FIG. 34 is a flowchart illustrating an example of operation of controlling the robot based on a movement state of the robot performed by the display terminal, according to an embodiment of the present disclosure.

Remote Control of Robot:

A description is now given of remote control of the robot 10 performed using the display screen displayed on the display terminal 50. First, referring to FIG. 34, an example of remote control of the robot 10 based on the state information 170 transmitted from the robot 10 is described. FIG. 34 is a flowchart illustrating an example of operation of controlling the robot 10 based on the movement state of the robot 10 performed by the display terminal 50, according to an embodiment.

When the data exchange unit 51 receives the state information 170 transmitted from the robot 10 (YES in step S31a), the operation proceeds to step S32a. By contrast, when the data exchange unit 51 receive no state information 170 (NO in step S31a), the process of step S31a is repeated.

The storage/reading unit 59 reads the condition information stored in the condition information management DB 5002 (see FIG. 22B) (step S32a). Next, the determination unit 56 searches the condition information read by the storage/reading unit 59, to determine whether there is any item satisfying the conditions indicated in the condition information among the variables indicated in the state information 170 received in step S31a (step S33a). Then, when the determination unit 56 determines that there is any item satisfying the condition indicated in the condition information among the variables indicated in the state information 170 (YES in step S33a), the operation proceeds to step S34a. For example, when the value associated with the variable name "DRIVE_SPEED" included in the state information 170 is "3.0 km/h", the determination unit 56 determines that among the items indicated in the condition information of FIG. 22B, "SPEED≤5.0 km/h", "SPEED>1.0 km/h" and "SPEED>2.0 km/h" satisfy the conditions. By contrast, when the determination unit 56 determines that there is no item satisfying the condition indicated in the condition information among the variables indicated in the state information 170 (NO in step S33*a*), the operation ends.

Next, the request command generation unit 57 identifies the processing associated with the item identified as satisfying the condition in step S33*a*, to generate a request command (step S34*a*). For example, the request command generation unit 57 identifies the processing corresponding to each of "SPEED≤5.0 km/h", "SPEED>1.0 km/h", and "SPEED>2.0 km/h" satisfying the conditions indicated in the condition information. Then, the request command generation unit 57 generates a request command using the commands each corresponding the identified processing indicated in the condition information. In this case, the commands included in the request command are "FPS (30)", "RESOLUTION (50%)", and "ZOOM=10". In one example, the request command includes all the commands corresponding to the items satisfying the conditions. In another example, the request command includes only the command corresponding to an item selected (extracted) from the items satisfying the condition.

Then, the data exchange unit 51 transmits the request command generated by the request command generation unit 57 to the robot 10 using the communication session established with the communication management server 90 (step S35*a*). Thus, the data exchange unit 31 of the robot 10 receives the request command corresponding to the current movement state of the robot 10 from the display terminal 50. In response to receiving the request command, the robot 10 executes command processing described below with reference to FIG. 36.

As described heretofore, the display terminal 50 requests a change in the image quality of the spherical image acquired by the special image capturing device 21 based on the movement state of the robot 10, to change the image quality of the spherical image to be displayed on the display terminal 50. For example, when the robot 10 is moving, the display terminal 50 may send a request to the robot 10 to reduce the image quality of the spherical image. Specifically, the display terminal 50 transmits a request to the robot 10 to reduce the resolution of the spherical image or reduce the frame rate. Thus, the remote control system 1*a* reduces the resolution or the update frequency (frame rate) of the spherical image displayed on the display terminal 50. This reduces uncomfortable feeling such as motion sickness that the operator who operates the robot 10 using the display terminal 50 feels when operating the robot 10 while viewing the spherical image.

Further, when performing the remote control of the robot 10 using the display terminal 50, the operator performs an operation input while viewing the spherical image displayed on the display terminal 50, and thus the spherical image transmitted from the robot 10 is required to be in real time. When a communication delay occurs due to congestion of the communication network 9, etc., a time lag occurs between the spherical image displayed on the display terminal 50 and an actual situation around the robot 10, thereby reducing operability for the operator who remotely operates the robot 10. To address such issue, the remote control system 1*a* changes the image quality of the spherical image transmitted from the robot 10 according to the movement state of the robot 10, thereby preventing deterioration in operability caused by the time lag on the display screen due to communication delay or the like.

Figure 35:
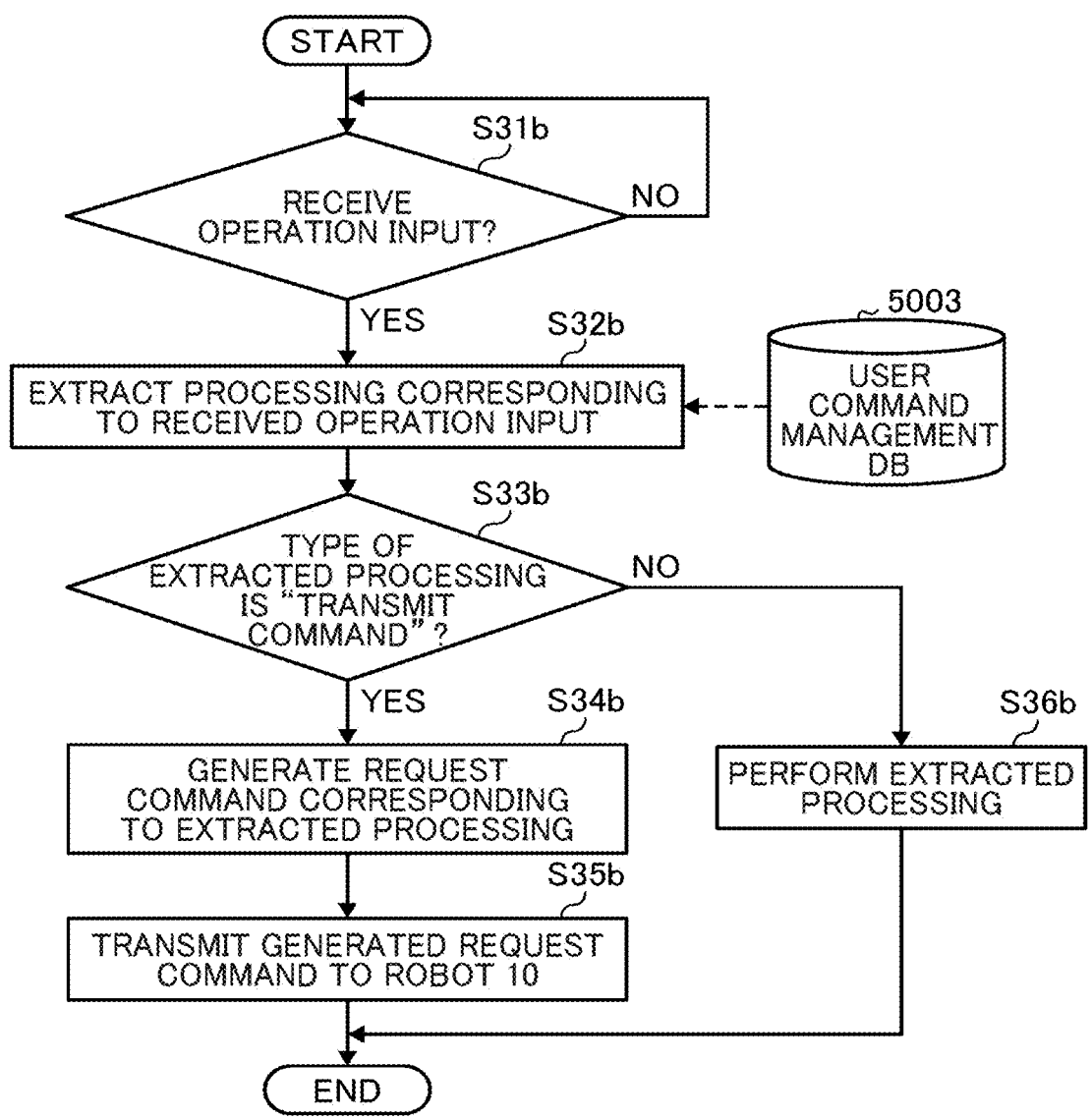
FIG. 35 is a flowchart illustrating an example of operation of controlling the robot based on an input command, performed by the display terminal, according to an embodiment of the present disclosure.

A description is now given of an example of remote control of the robot 10 based on an input command input by an operator who operates the robot 10 using the display terminal 50, with reference to FIG. 35. FIG. 35 is a flowchart illustrating an example of operation of controlling the robot 10 based on an input command, performed by the display terminal 50, according to an embodiment. In the following, an example case is described in which the display screen 600*a* (see FIG. 30) is displayed on the display 511 of the display terminal 50, with reference to FIG. 35. Note that the display screen 600*b* (see FIG. 32) may be displayed on the display 511 of the display terminal 50.

When the acceptance unit 52 receives a particular operation input on the display screen 600*a* displayed on the display 511 (YES in step S31*b*), the operation proceeds to step S32*b*. In the embodiment, the particular operation input is an operation input to any one of the movement instruction keypad 605 displayed on the display screen 600*a*. By contrast, when the acceptance unit 52 receives no particular operation input to the display screen 600*a* (NO in step S31*b*), the process of step S31*b* is repeated.

The storage/reading unit 59 searches the user command management DB 5003 (see FIG. 23A) using a content of the particular operation input received in step S31*b* as a search key, to extract the associated processing (step S32*b*). Specifically, the storage/reading unit 59 searches the user command management DB 5003 to identify an input command corresponding to the operation input received by the acceptance unit 52. Then, the storage/reading unit 59 extracts processing associated with the identified input command. For example, when the acceptance unit 52 receives an input to the "↑ (forward)" key of the movement instruction keypad 605, the storage/reading unit 59 identifies "PRESS "↑ (FORWARD)" KEY" as the input command. Then, the storage/reading unit 59 extracts "MOVE (10.0, 10.0)" as the processing associated with the identified input command.

The determination unit 56 further determines whether the type of processing associated with the processing extracted in step S32*b* is "TRANSMIT REQUEST COMMAND" (step S33*b*). When the determination unit 56 determines that the type of processing associated with the extracted processing is "TRANSMIT REQUEST COMMAND" (YES in step S33*b*), the operation proceeds to step S34*b*. Then, the request command generation unit 57 generates the request command corresponding to the processing extracted by the determination unit 56 (step S34*b*). For example, when the extracted processing is "MOVE (10.0, 10.0)", the request command generation unit 57 generates a request command including "MOVE (10.0, 10.0)". Then, the data exchange unit 51 transmits the request command generated by the request command generation unit 57 to the robot 10 using the communication session established with the communication management server 90 (step S35*b*). Thus, the data exchange unit 31 of the robot 10 receives the request command corresponding to the input operation by the operator from the display terminal 50. In response to receiving the request command, the robot 10 executes command processing described below with reference to FIG. 36.

By contrast, when the determination unit 56 determines that the type of processing associated with the extracted processing is not "TRANSMIT REQUEST COMMAND" in step S33*b*, the operation proceeds to step S36*b*. The display terminal 50 performs the processing extracted in step S32*b* (step S36*b*). For example, when the extracted processing is "LOOK (H, V, Z)" based on "MOUSE MOVEMENT", the display terminal 50 changes the display position of the spherical image displayed in the display area 650 by the display control unit 54.

The description given above is of an example in which the processing to be executed is extracted by using the user command stored in the user command management DB 5003 in step S32a. In another example, the display terminal 50 is configured to extract or execute predetermined processing based on, for example, an event given to the movement instruction keypad 605.

As described heretofore, the display terminal 50 requests a change in the image quality of the spherical image acquired by the special image capturing device 21 based on the movement state of the robot 10, to change the image quality of the spherical image to be displayed on the display terminal 50. For example, when the robot 10 is moving, the display terminal 50 may send a request to the robot 10 to reduce the image quality of the spherical image. Specifically, the display terminal 50 transmits a request to the robot 10 to reduce the resolution of the spherical image or reduce the frame rate. Thus, the remote control system 1a reduces the resolution or the update frequency (frame rate) of the spherical image displayed on the display terminal 50. This reduces uncomfortable feeling such as motion sickness that the operator who operates the robot 10 using the display terminal 50 feels when operating the robot 10 while viewing the spherical image.

Figure 36:
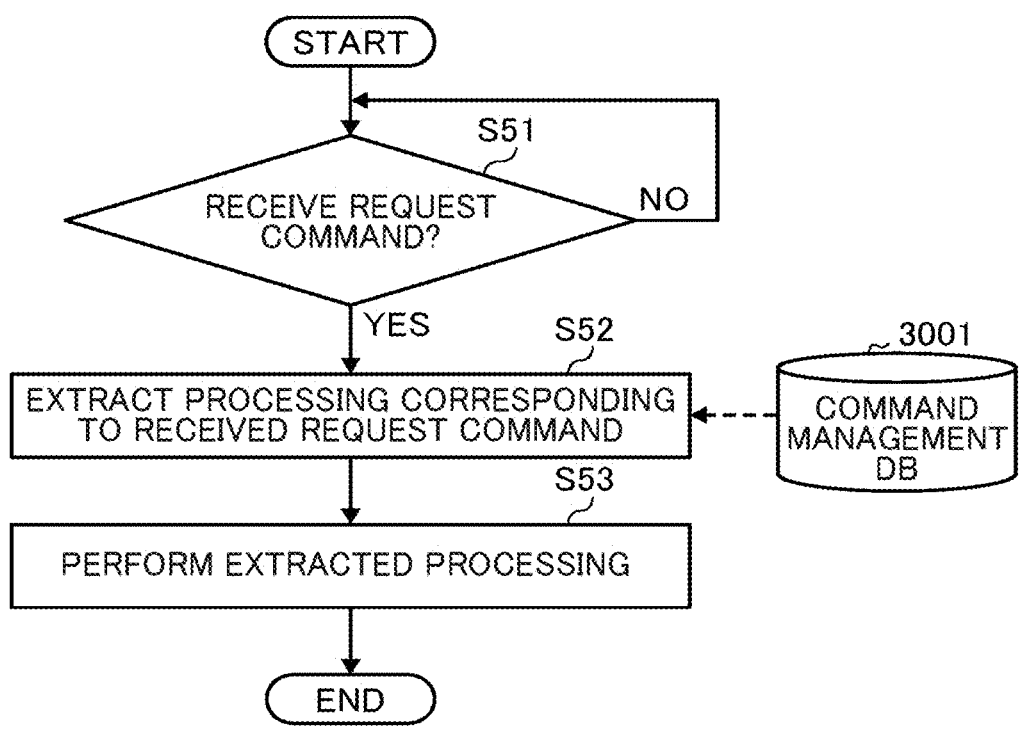
FIG. 36 is a flowchart illustrating an example of operation of controlling robot based on a request command from the display terminal, performed by the robot, according to an embodiment.

Referring to FIG. 36, a description is now given of operation performed by the robot 10 using the request command transmitted from the display terminal 50 by the operation illustrated in FIG. 34 or FIG. 35. FIG. 36 is a flowchart illustrating an example of operation of controlling the robot 10 based on the request command from the display terminal 50, performed by the robot 10, according to an embodiment.

When the data exchange unit 31 receives the request command transmitted from the display terminal 50 (YES in step S51), the operation proceeds to step S52. By contrast, when the data exchange unit 31 receives no request command (NO in step S51), the process of step S51 is repeated.

The storage/reading unit 39 searches the command management DB 3001 (see FIG. 21A) using the command indicated in the request command received by the data exchange unit 31 as a search key, to extract corresponding processing (step S52). Then, the robot 10 performs the processing extracted in step S52 (step S53).

For example, when the request command received by data exchange unit 31 is "MOVE (10.0, 10.0)", the determination unit 34 searches for the read command to extract processing corresponding to the command name "MOVE". In this case, the extracted processing is "Rotate left wheel by 10.0°, Rotate right wheel by 10.0°". The determination unit 34 send a notification indicating an execution request of the extracted processing to the movement control unit 41. Then, the movement control unit 41 rotates the left wheel of the movement mechanism 17 of the robot 10 by 10.0° and rotates the right wheel by 10.0° based on the processing extracted by the determination unit 34. Note that a destination to which the notification indicating the execution request is sent varies depending on the processing extracted by the determination unit 34. For example, when the request command received by the data exchange unit 31 is "AIM", "FPS", or "RESOLUTION", the notification destination of the execution request is the image capturing control unit 37.

As described heretofore, the robot 10 performs processing or an operation based on the request command transmitted from the display terminal 50 by the operation illustrated in FIG. 34 or FIG. 35, and also transmits an image (the spherical image data or the detailed image data) captured and acquired based on the request command to the display terminal 50. Thereby, the remote control system 1a implements remote operation the robot 10 using the display terminal 50, and also controls the display terminal 50 used by the operator of the robot 10 to display information (e.g., the spherical image data of the detailed image data) that the robot 10 acquires as a result of the remote operation.

Figure 37:
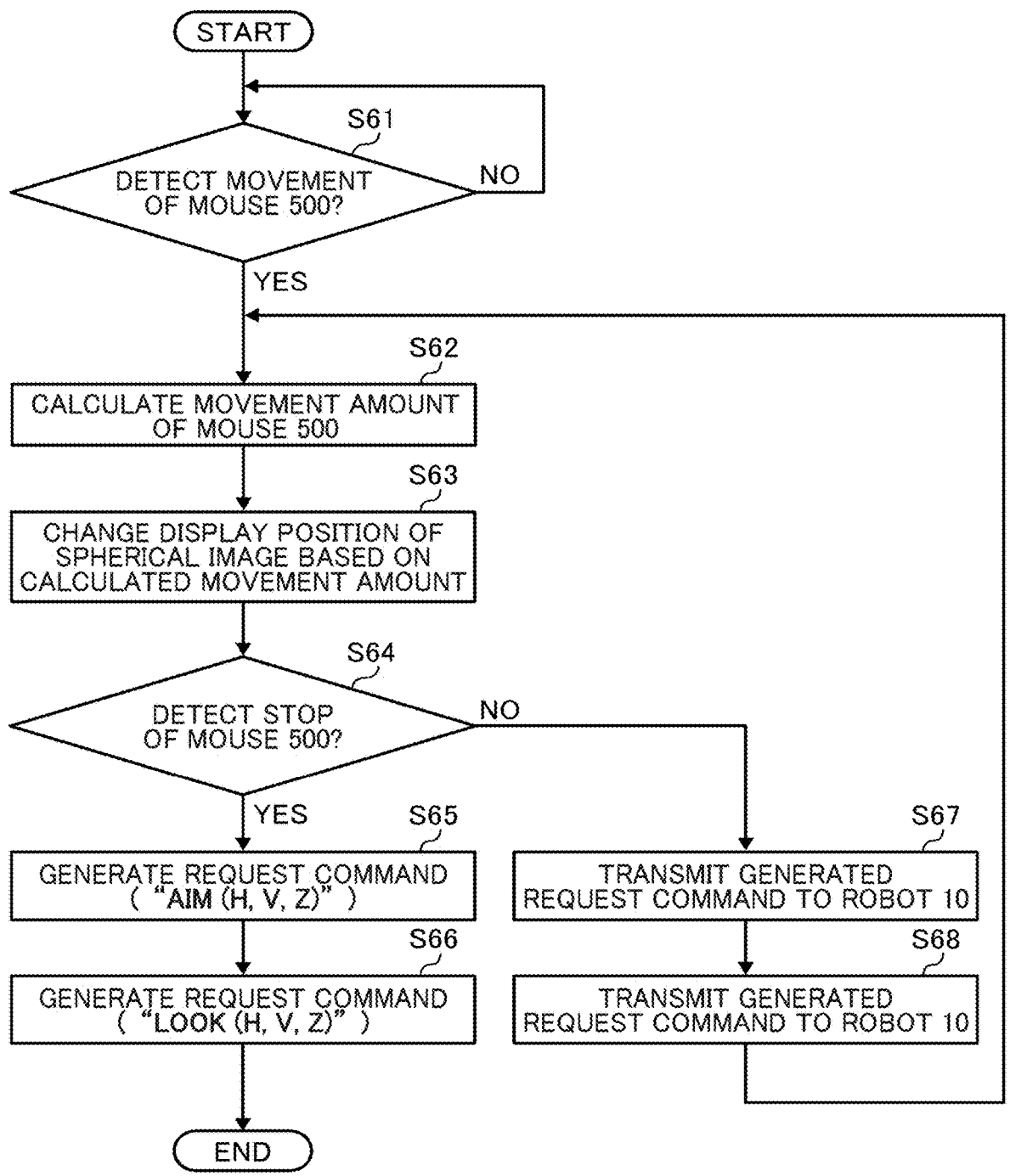
FIG. 37 is a flowchart illustrating an example of operation of changing a display position of the spherical image on the display terminal, according to an embodiment of the present disclosure.

Display Control at Display Terminal:
Change of Display Position of Spherical Image:

A description is now given of display of the spherical image and the detailed image to the display terminal 50, with reference to FIG. 37 to FIG. 41. First, an operation of changing a display position of the spherical image displayed on the display terminal 50 is described with reference to FIG. 37. FIG. 37 is a flowchart illustrating an example of operation of changing the display position of the spherical image on the display terminal 50, according to an embodiment. With reference to FIG. 37, an example case is described in which a display screen 600c illustrated in FIG. 39A is displayed on the display 511 of the display terminal 50. Unlike the display screen 600b illustrated in FIG. 32, the display screen 600c illustrated in FIG. 39A includes only the display area 650 displaying the spherical image. The display terminal 50 can switch the display of the spherical image and the detailed image by a display screen switching operation (see FIG. 38 and FIG. 39B) described below.

A user who uses the display terminal 50 moves the mouse 500 connected to the display terminal 50 via the external device connection I/F 513 to change the display position of the spherical image displayed on the display 511. First, when the acceptance unit 52 of the display terminal 50 detects a movement of the mouse 500 (YES in step S61), the operation proceeds to step S62. By contrast, when the acceptance unit 52 detects no movement of the mouse 500 (NO in step S61), the process of step S61 is repeated.

Next, the display position identification unit 55 calculates an amount of the movement of the mouse 500 (step S62). Then, the display control unit 54 changes the display position of the spherical image displayed in the display area 650 based on the movement amount calculated by the display position identification unit 55 (step S63). Specifically, the display control unit 54 displays, in the display area 650, a position (area) that is distant from the center of the display position (e.g., the viewable area T (e.g., a first area) illustrated in FIG. 33) of the spherical image by a distance corresponding to the movement amount calculated by the display position identification unit 55, as a viewable area T (e.g., a second area).

Conventionally, when changing the display position of the display screen with the mouse, the position of the mouse cursor displayed on the display is detected and the display position is changed according to the movement amount of the mouse cursor. However, with this method, when the mouse cursor reaches the edge of the display screen, the cursor cannot be moved any further. Therefore, a user is required to release the movement once, return the moue cursor to the center of the display screen, and move the mouse cursor again. For the user, the operability was poor, and the operation was time consuming. To address such issue, the display terminal 50 changes the display position of the spherical image according to the movement amount of the mouse 500 instead of the movement amount of the mouse cursor, thereby smoothly displaying an image of the position that the user wants to view independent of the screen size or the like of the display 511. Thus, the display terminal 50 improves the user's operability for the displayed spherical image.

The determination unit 56 determines whether the movement of the mouse 500 detected in step S61 has stopped (step S64). For example, when a time period from when the movement of the mouse 500 is detected by the acceptance unit 52 to when the movement of the mouse 500 is no longer detected exceeds a predetermined time period, the determination unit 56 determines that the movement of the mouse 500 has stopped. When the determination unit 56 determines that the acceptance unit 52 detects the stop of the mouse 500 (YES in step S64), the operation proceeds to step S65. Then, when the stop of the mouse is detected, the request command generation unit 57 generates a request command including "AIM (H, V, Z)" (step S65). Then, the data exchange unit 51 transmits the request command generated in step S65 to the robot 10 using the communication session established with the communication management server 90 (step S66). Although the request command may be sent to the robot 10 every time the mouse 500 moves, in such case, the request command is sent too frequently. Therefore, in the embodiment, the request command is transmitted when the mouse 500 does not move for the predetermined time after the detection of the movement.

By contrast, in step S64, when the determination unit 56 determines that the acceptance unit 52 does not detect the stop of the mouse 500 (NO in step S64), the operation proceeds to step S67. When the stop of the mouse is not detected, the request command generation unit 57 generates a request command including "LOOK (H, V, Z)" (step S67). Then, the data exchange unit 51 transmits the request command generated in step S67 to the robot 10 using the communication session established with the communication management server 90 (step S68). Further, the display terminal 50 repeats the processes from step S62 until the movement of the mouse 500 is stopped (YES in step S64).

Thus, the display terminal 50 changes an area (the viewable area T), which is a part of the spherical image, to be displayed on the display 511 according to the movement of the mouse 500, thereby displaying an image indicating a different area on the display 511. This improves the operability when the user checks the situation of the remote site while viewing the spherical image.

Figure 38:
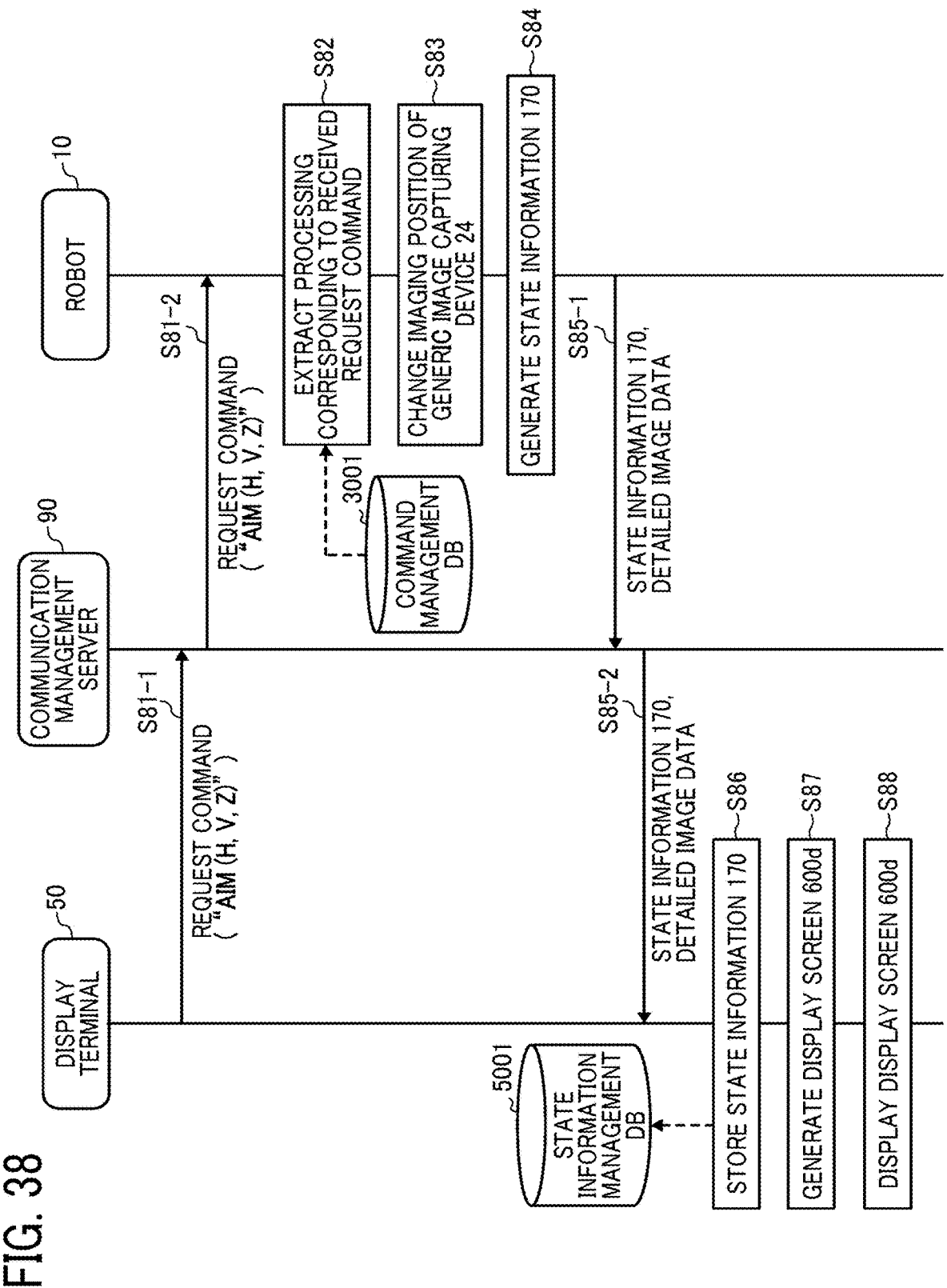
FIG. 38 is a sequence diagram illustrating an example of an operation of changing an imaging position, performed by a generic image capturing device, according to an embodiment of the present disclosure.

Switching of Display Image:

Next, with reference to FIG. 38, a description is given of an operation performed when the request command generated by the operation illustrated in FIG. 37 is transmitted to the robot 10. FIG. 38 is a sequence diagram illustrating an example of an operation of changing an imaging position, performed by the generic image capturing device 24, according to an embodiment. FIG. 38 illustrates an operation of transmitting the "AIM" command illustrated in step S66 of FIG. 37 from the display terminal 50 to the robot 10.

First, the data exchange unit 51 of the display terminal 50 transmits a request command including "AIM" generated by the request command generation unit 57 to the robot 10 (steps S81-1, S81-2). Thereby, the data exchange unit 31 of the robot 10 receives the request command transmitted from the display terminal 50.

Next, the storage/reading unit 39 of the robot 10 searches the command management DB 3001 (see FIG. 21A) using the command indicated in the request command received by the data exchange unit 31 as a search key, to read corresponding processing (step S82). In this case, the storage/reading unit 39 reads the processing associated with the command "AIM". Then, the image capturing control unit 37 changes the imaging position of the generic image capturing device 24 based on the processing read in step S82 (step S83). Specifically, the image capturing control unit 37 transmits, to the generic image capturing device 24, instruction information indicating that the imaging direction is to be moved so that the horizontal angle is H degrees and the vertical angle is V degrees with respect to the front of the robot 10 and the zoom amount is changed to Z %. The generic image capturing device 24 performs photographing with the parameters (H, V, Z) indicated in the instruction information transmitted from the image capturing control unit 37, to acquire a detailed image. When the generic image capturing device 24 is the movable camera 23 (see FIG. 3 and FIG. 4A to FIG. 4C), the generic image capturing device 24 rotates by using the built-in movement mechanism to change the imaging position toward the parameters (H, V, Z) indicated in the instruction information. When the generic image capturing device 24 is the normal camera 25 (see FIG. 5A and FIG. 5B to FIG. 9A and FIG. 9B), the imaging position by the generic image capturing device 24 is changed toward the parameters (H, V, Z) indicated by the instruction information by rotation and/or deformation of the movable arm 11.

Next, the state information generation unit 35 generates the state information 170 indicating the state of the robot 10 based on the instruction information transmitted by the image capturing control unit 37 (step S84). In this case, the state information generation unit 35 generates the state information 170 indicating the parameters regarding the imaging position of the detailed image acquired by the generic image capturing device 24.

Then, the data exchange unit 31 transmits the state information 170 generated in step S84 and the detailed image data captured by the generic image capturing device 24 to the display terminal 50 using the communication session established with the communication management server 90 (step S85-1, step S85-2). Thereby, the data exchange unit 51 of the display terminal 50 receives the state information 170 and the detailed image data transmitted from the robot 10.

Then, the storage/reading unit 59 of the display terminal 50 stores the state information 170 received by the data exchange unit 51 in the state information management DB 5001 (see FIG. 22A) stored in the storage unit 5000 (step S86). Specifically, the storage/reading unit 59 stores each of the numerical values included in the received state information 170 in a field associated with the corresponding variable name of the state information management table, thereby updating the value of each item included in the state information management table.

Next, the display screen generation unit 53 generates a display screen 600d to be displayed on the display 511 using the state information 170 received in step S16-2 to (step S87). Specifically, first, the storage/reading unit 59 reads out the condition information stored in the condition information management DB 5002 (see FIG. 22B). Next, the determination unit 56 searches the condition information read by the storage/reading unit 59. When the imaging position of the generic image capturing device 24 indicated by the numerical values (parameters) of the variable names "CAMERA_H_ANGLE", "CAMERA_V_ANGLE" and "CAMERA_ZOOM" included in the state information 170 received in step S85-2 is close to the display position of the spherical image, the determination unit 56 determines that the corresponding condition is satisfied. Then, the display screen generation unit 53 generates the display screen 600d displaying the detailed image represented by the detailed image data received in step S85-2.

Figure 39A:
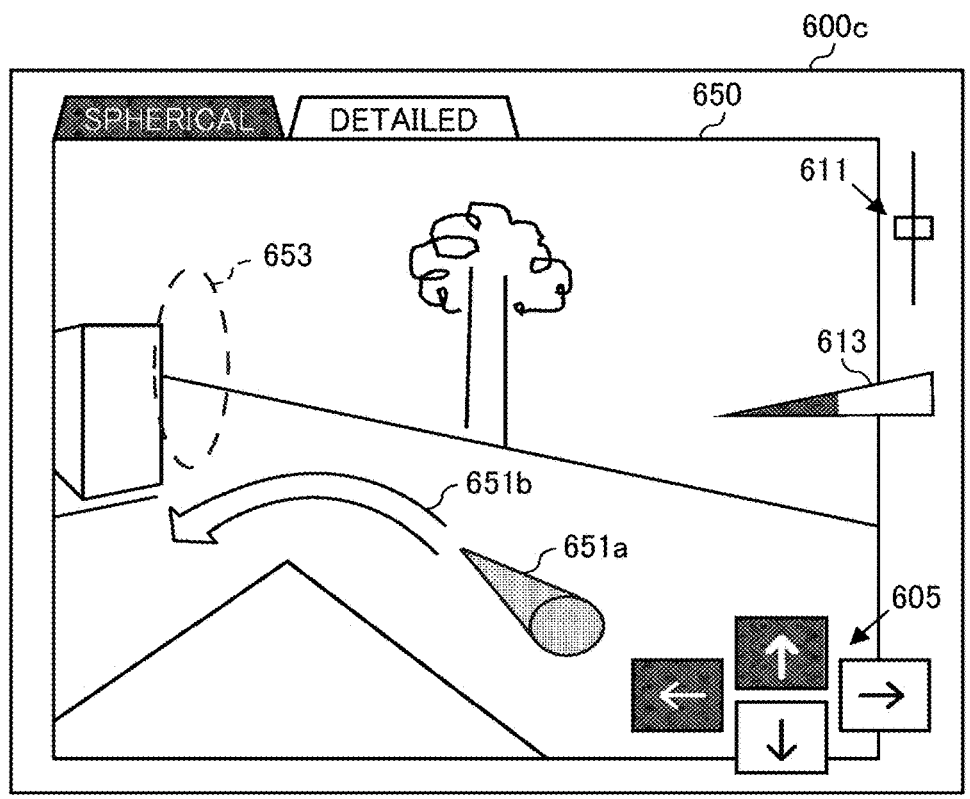
FIG. 39A is a diagram illustrating an example of the spherical image displayed on the display terminal, according to an embodiment of the present disclosure.

Although in the following, a description is given of the display screen 600d, when the determination unit 56 determines that there is no item corresponding to the searched condition information, that is, when the determination unit 56 determines that the imaging position of the generic image capturing device 24 is not close to the display position of the spherical image, the display screen generation unit 53 generates the display screen 600c displaying the spherical image as illustrated in FIG. 39A. In the embodiment, "the imaging position of the generic image capturing device 24 is close to the display position of the spherical image" is not limited to that the imaging position of the generic image capturing device 24 and the display position of the spherical image are the same. It suffices that the positions are within a predetermined range. This predetermined range is set by a designer or a user, for example. In another example, the predetermined range is determined according to a parameter such as the degree of matching or the degree of similarity between the displayed spherical image and the detailed image photographed according to the imaging position of the generic image capturing device 24. In this case, for example, when the parameter such as the degree of matching or the degree of similarity between the spherical image and the detailed image is equal to or more than a set value, the display terminal 50 determines that the imaging position of the generic image capturing device 24 is close to the display position of the spherical image. In addition, instead of the variables indicated in the state information 170, the variables indicated in the request command ("AIM") transmitted in step S81 may be used as a prediction value of the imaging position of the generic image capturing device 24.

Then, the display control unit 54 controls the display 511 to display the display screen 600d generated by the display screen generation unit 53 (step S88). The display screen 600d illustrated in FIG. 39B includes the display area 630 displaying the detailed image, instead of the spherical image displayed on the display screen 600c illustrated in FIG. 39A. As described heretofore, the display terminal 50 automatically switches the display from the spherical image to the detailed image when the imaging position of the generic image capturing device 24 catches up to the display position of the spherical image.

Thus, the remote control system 1a changes the imaging position of the generic image capturing device 24 so that the imaging position follows the display position of the spherical image, based on the request command that is transmitted from the display terminal 50 with the change of the display position of the spherical image as a trigger. Further, the display terminal 50 displays, in place of the spherical image, the detailed image acquired by the generic image capturing device 24 whose imaging position is changed so that the imaging position follows the display position of the spherical image. This enables the user to view the spherical image to recognize the situation of the remote site until the imaging position of the detailed image catches up to the display position of the spherical image, and view the detailed image to recognize more detailed information of the remote site when the imaging position of the detailed image catches up to the display position of the spherical image. Further, the user of the display terminal 50 recognizes the imaging position of the generic image capturing device 24 by viewing the imaging position icon 653 displayed on the display screen 600c until the imaging position of the generic image capturing device 24 catches up to the display position of the spherical image. This enables the user to predict the timing when the spherical image is switched to the detailed image. Thus, the display terminal 50 switches the display between the spherical image and the detailed image according to the condition, thereby allowing the user to check the state of the remote site efficiently and with high accuracy. This improves the operability for the user.

Further, when the robot 10 includes plural generic image capturing devices 24 (movable cameras 23) as illustrated in FIG. 4B, the image capturing control unit 37 of the robot 10 can select the generic image capturing device 24 to which an image capturing instruction is to given in accordance with the variables included in the request command. For example, when the display position of the spherical image is in the upward direction of the solid sphere CS, the image capturing control unit 37 instructs the movable camera 23a to perform image capturing. On the other hand, when the display position of the spherical image is in the downward direction of the solid sphere CS, the movable camera 23b is instructed to perform image capturing. The display terminal 50 displays the detailed image acquired by either the movable camera 23a or the movable camera 23b. This enables the remote control system 1a to reduce blind spots such as the ceiling or the floor in the image capturing by the generic image capturing device 24. In another example, the image capturing control unit 37 instructs both the movable camera 23a and the movable camera 23b to perform image capturing, and the display terminal 50 displays plural detailed images.

Conventionally, the special image capturing device 21 and the generic image capturing device 24 are controlled independently. This requires a user to first view a desired direction of the spherical image acquired by the special image capturing device 21 and thereafter to give an image capturing instruction to the generic image capturing device 24. To address such issue, the remote control system 1a controls the display position of the spherical image and the imaging position of the generic image capturing device 24 to link with each other, thereby enabling the user to seamlessly recognize the entire remote site and an area where the user has interest to details. This improves the operability while also improving the resolution of the display image.

Figure 39B:
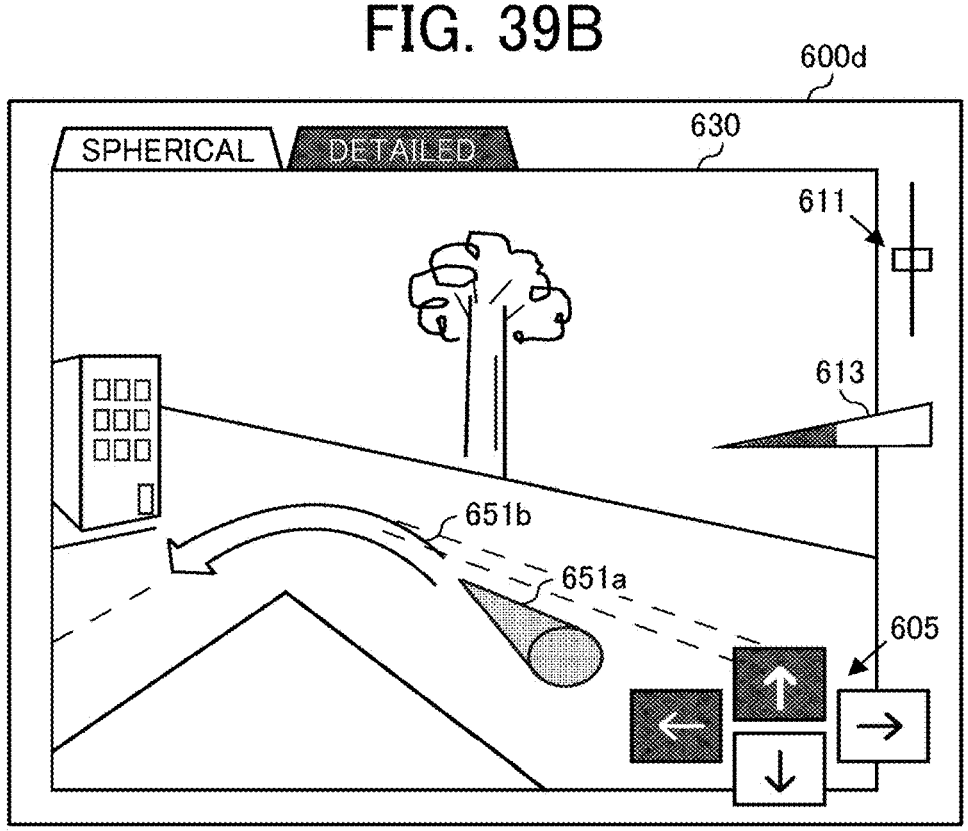
FIG. 39B is a diagram illustrating an example of a detailed image displayed on the display terminal, according to an embodiment of the present disclosure.

The display screen 600d may display the object 651a indicating the position of the robot 10 and/or the drive direction icon 651b indicating the drive direction of the robot 10, in substantially the same manner as the display screen 600c, etc. In addition, although the description given above with reference to FIG. 39A and FIG. 39B is of an example case in which the display on a single screen is switched between the spherical image and the detailed image, no limitation is intended thereby. In another example, the display terminal 50 displays both the spherical image and the detailed image like the display screen 600a illustrated in FIG. 30 and the display screen 600b illustrated in FIG. 32. In this case, although the display terminal 50 does not switch the display between the spherical image and the detailed image, the display terminal 50 displays the detailed image acquired by the generic image capturing device 24 that changes the imaging position so that the imaging position follows the display position of the spherical image. Further, the description given above with reference to FIG. 38 is of an example case in which the display is automatically switched between the spherical image and the detailed image, no limitation is intended thereby. In another example, the display is switched between the spherical image and the detailed image in response to selection of either one of tabs ("SPHERICAL" or "DETAILED") in the upper right of the display area 630 or the display area 650.

Figure 40:
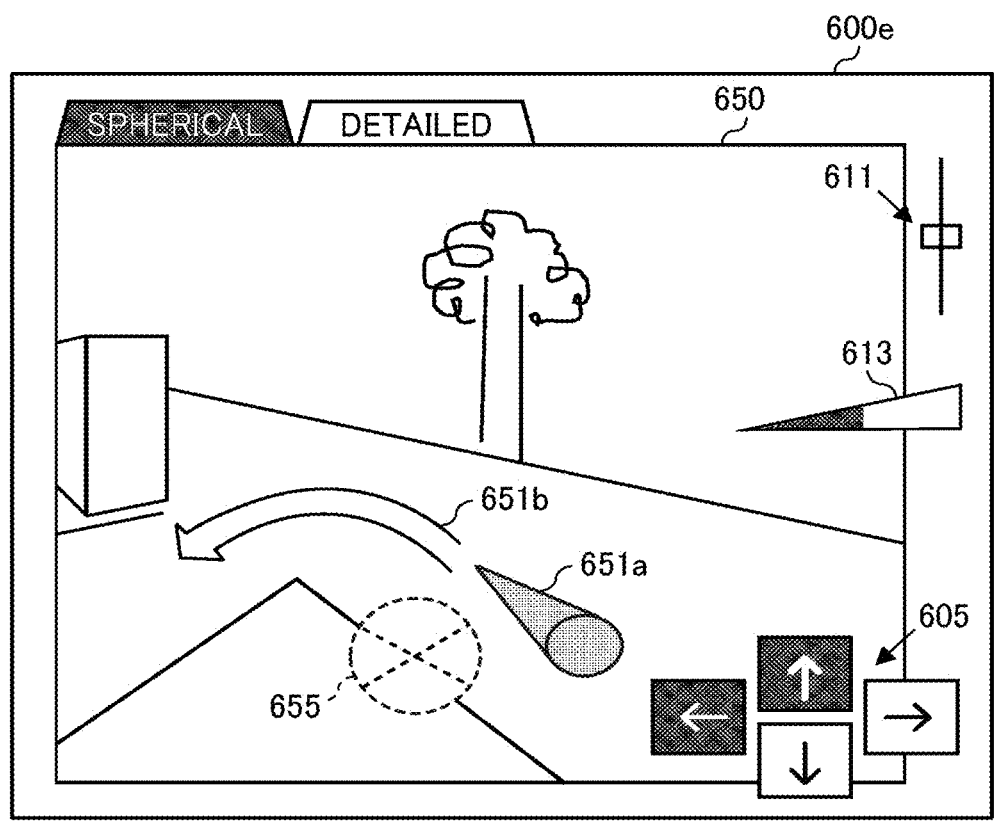
FIG. 40 is a diagram illustrating an example of the spherical image displayed on the display terminal, according to an embodiment of the present disclosure.

A description is now given of another example of a display screen displayed on the display terminal 50, with reference to FIG. 40. A display screen 600e illustrated in FIG. 40 is an example of a screen displayed when the display position of the spherical image is a position that cannot be imaged by the generic image capturing device 24. The generic image capturing device 24, either the movable camera 23 or the normal camera 25, has a direction or range in which the generic image capturing device cannot move due to its structure. For example, the generic image capturing device 24 cannot photograph the direction of directly behind, directly below such as a floor, or directly above such as a ceiling. Therefore, the display screen 600e includes an image 655 indicating an area (immovable area) that cannot be photographed by the generic image capturing device 24 in the display area 650 displaying the spherical image. The display screen 600e is an example in which the display position of the spherical image is in the downward direction of the robot 10. The image 655 is an example of an unacquirable image, which indicates that the detailed image cannot be acquired.

Thus, when the display position of the spherical image is changed to a position that cannot be imaged by the generic image capturing device 24, the display terminal 50 allows the user to intuitively recognize a situation where the spherical image cannot be switched to the detailed image. Further, when the user of the display terminal 50 notices the image 655 displayed on the display terminal 50, which indicates an area (immovable area) that cannot be captured by the generic image capturing device 24, the user smoothly consider an alternative operation to be taken, such as operation of moving the robot 10.

Figure 41:
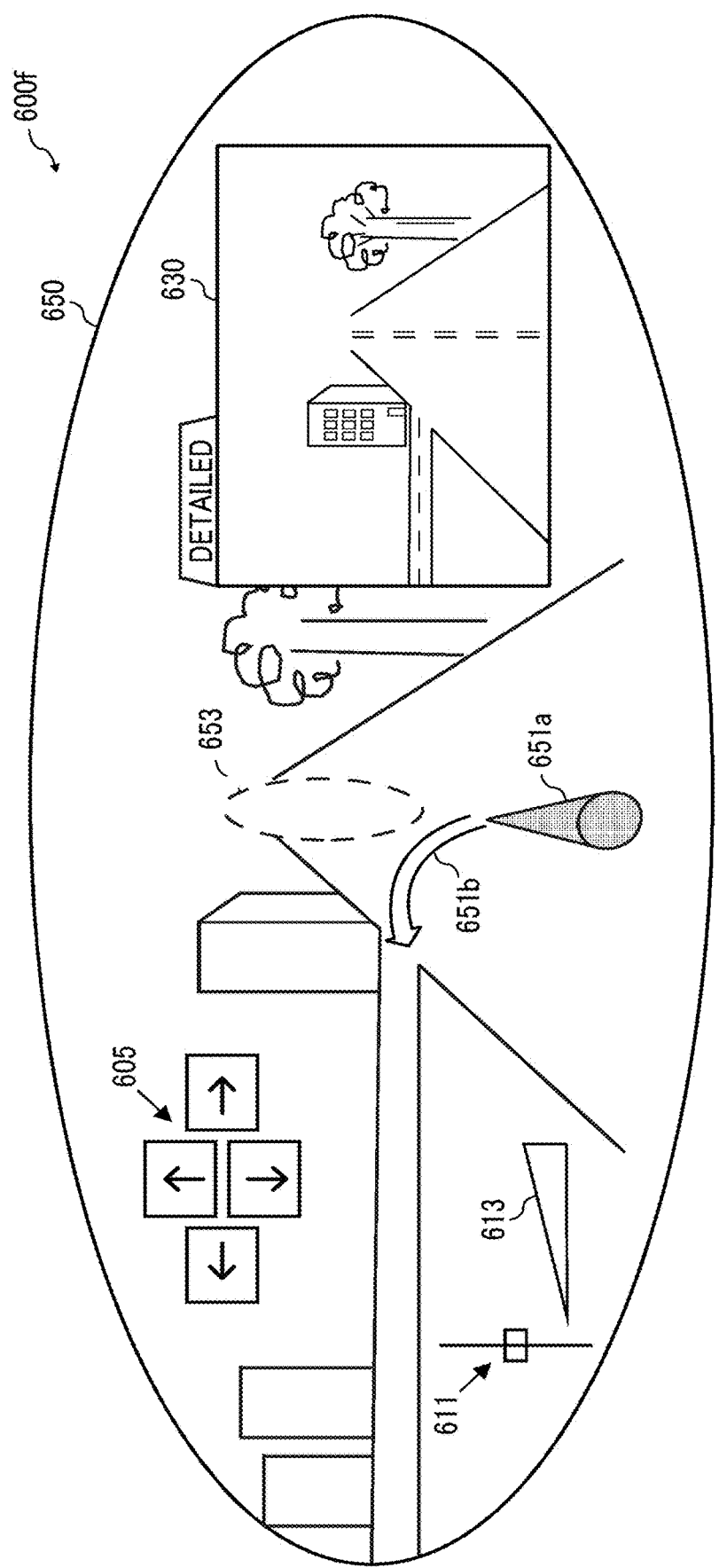
FIG. 41 is a diagram illustrating an example of a display screen displayed on a head-mounted display as an example of the display terminal, according to an embodiment of the present disclosure.

Another Example of Screen of Display Screen:

A description is now given of another example of the display screen displayed on the display terminal 50. The display terminal 50 is configured to display different display screens according to the type of the display 511 that the display terminal 50 includes. FIG. 41 is a diagram illustrating an example of a display screen displayed on a head-mounted display as an example of the display terminal 50, according to an embodiment. A display screen 600f illustrated in FIG. 41 is an example of a screen in which the spherical image data and the detailed image data, each transmitted from the robot 10, are displayed on a head-mounted display (HMD) as an example of a virtual reality (VR) terminal.

On the display screen 600f illustrated in FIG. 41, the entire screen is displayed as the display area 650 for the spherical image, and the display area 630 for the detailed image is superimposed thereon. An operator wearing a head-mounted display displaying the display screen 600f is able to always recognize the entire remote site by the peripheral vision, and to view a desired direction of the spherical image by moving his or her head. Further, since various buttons or icons displayed on the display screen 600f move following the orientation of the operator's head, the various buttons or icons are displayed at predetermined positions even when the display position of the spherical image changes. Furthermore, when the head-mounted display is used, the direction in which the operator is looking is acquired with a gyroscopic sensor, etc. This enables the display terminal 50 to feed back to the robot 10 the direction viewed by the operator as the display position of the spherical image, in substantially the same manner as described above. The display terminal 50 may display the display screen 600f as illustrated in FIG. 41 using a wide-angle screen or an omnidirectional display, in addition the head-mounted display.

Figure 42:
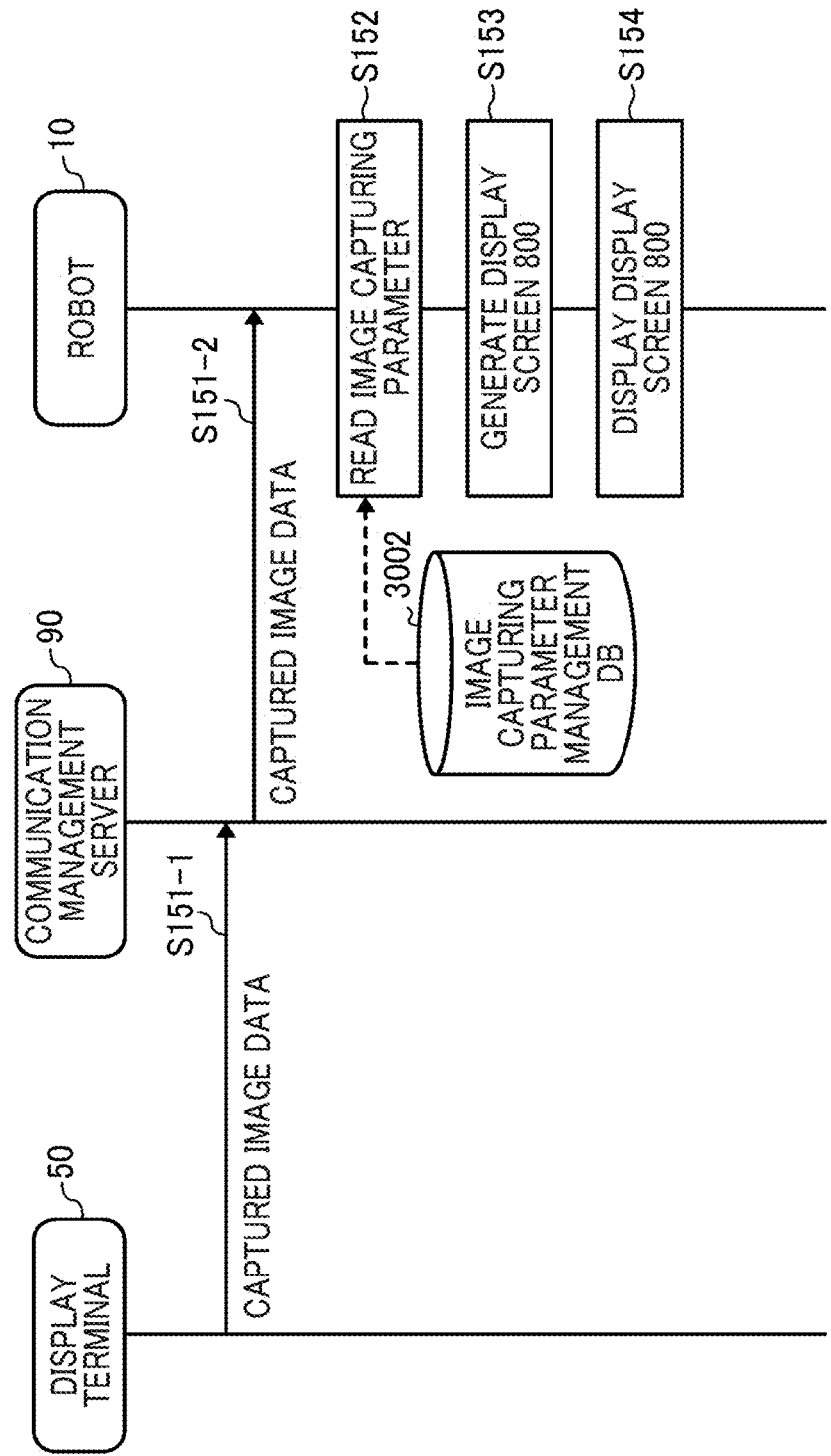
FIG. 42 is a sequence diagram illustrating an example of operation of causing the robot to display a captured image acquired by the display terminal, performed by the remote control system, according to an embodiment of the present disclosure.
Figure 43A:
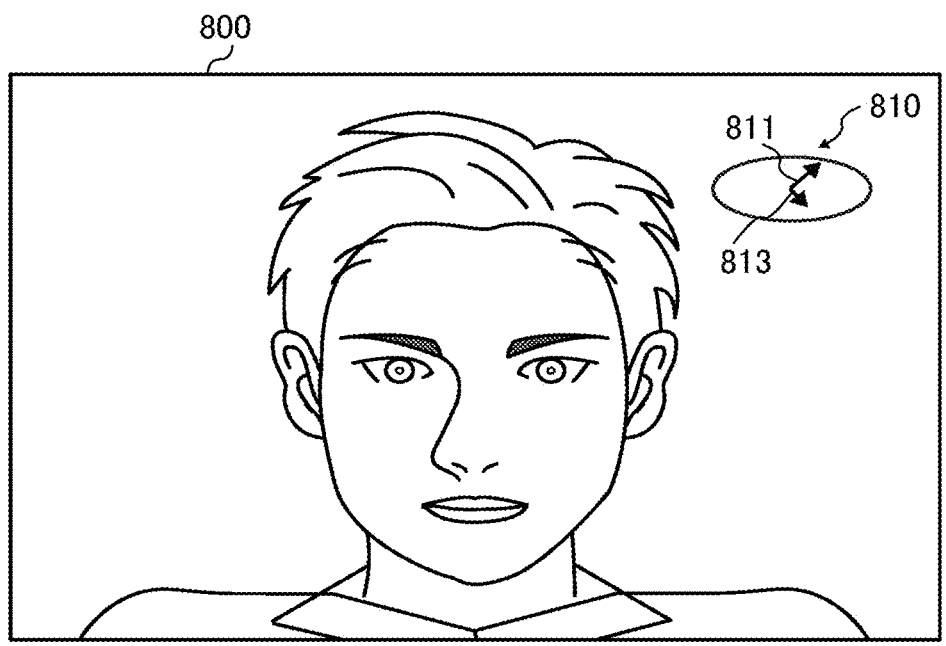
FIG. 43A and FIG. 43B are diagrams each illustrating an example of a display screen displayed on the robot, according to an embodiment of the present disclosure.
Figure 43B:
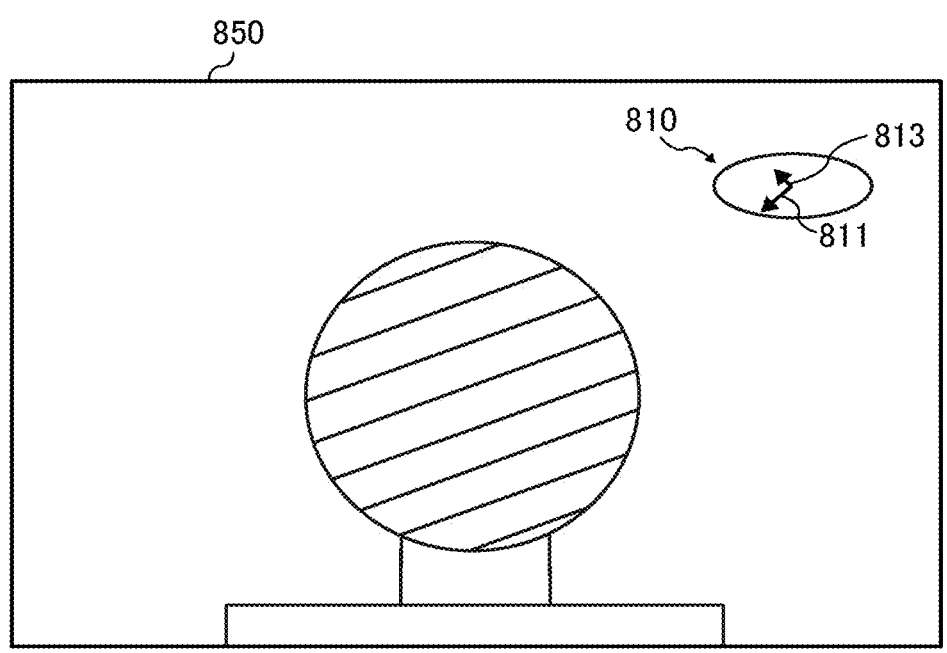

Display Screen Displayed at Robot:

A description is now given of a display screen displayed at the robot 10, with reference to FIG. 42, FIG. 43A, and FIG. 43B. In the following description, it is assumed that the robot 10 includes the display 150 like the robot 10c (10c1 to 10c3) illustrated in FIG. 10A to FIG. 10C. FIG. 42 is a sequence diagram illustrating an example of operation of causing the robot 10 to display a captured image acquired by the display terminal 50, performed by the remote control system 1a, according to an embodiment.

First, the data exchange unit 51 of the display terminal 50 transmits captured-image data acquired by the CMOS sensor 505a to the robot 10 using a communication session established with the communication management server 90 (step S151-1, step S151-2). In the embodiment, the CMOS sensor 505a of the display terminal 50 captures an image of the operator who is remotely operating the robot 10 using the display terminal 50. Thereby, the data exchange unit 31 of the robot 10 receives the captured-image data transmitted from the display terminal 50.

Next, the storage/reading unit 39 of the robot 10 reads out the image capturing parameters stored in the image capturing parameter management DB 3002 (step S152). The display control unit 54 generates the display screen 800 to be displayed on the display 150 by using the captured-image data received in step S151-2 and the image capturing parameter read in step S152 (step S153). Then, the display control unit 54 controls the display 150 to display the display screen 800 generated in step S153 (step S154).

A description is now given of the display screen 800 displayed on the display 150 of the robot 10, with reference to FIG. 43A and FIG. 43B. The display screen 800 illustrated in FIG. 43A includes an image of the face of the operator who is remotely operating the robot 10 using the display terminal 50. The user at the site where the robot 10 is located recognizes who is operating the robot 10 by viewing the display screen 800.

Further, the display screen 800 includes an image 810 indicating the direction in which the operator is looking, such as the display position of the spherical image displayed on the display terminal 50 or the imaging position of the generic image capturing device 24. For example, the image 810 includes a long arrow 811 indicating the display direction of the spherical image, and a short arrow 813 indicating the imaging direction of the generic image capturing device 24. This enables the user at the site where the robot 10 is located to recognize which direction the operator is looking on the screen displayed on the display terminal 50. For example, even when the operator is facing the front on the display screen 800, there is a case in which the operator is looking behind or beside the robot 10 on the spherical image displayed on the display terminal 50. Therefore, the user at the site where the robot 10 is located can recognizes the direction in which the operator is looking by viewing the image 810 displayed on the display screen 800.

A display screen 850 illustrated in FIG. 43B displays an image simulating the back of the operator's head instead of the image of the operator's face. The display screen 850 is displayed on the display 150b provided at the rear side of the robot 10b2 as illustrated in FIG. 10B, for example. In this case, the display screen 800 described above is displayed on display 150a provided at the front side of the robot 10b2. Further, the display screen 850 also includes the image 810 indicating the direction in which the operator is looking, in substantially the same manner as the display screen 800. This enables the user who is around the robot 10 to recognize which direction the operator is looking even from behind the robot 10. The image simulating the back of the operator's head is just one example of an image displayed on the display screen 850. In another example, an image obtained by actually photographing the back of the operator's head is displayed on the display terminal 50.

In the embodiment, the display direction of the spherical image (the arrow 811) corresponds to the "eyes" of the operator, and the imaging direction of the generic image capturing device 24 (the arrow 813) corresponds to the "neck or head" of the operator. The "eyes" of the operator represent the direction in which the operator is glancing. The "neck or head" of the operator represents the direction in which the operator is looking closely. Around the robot 10, there are a direction in which the operator is looking closely and a direction in which the operator is glancing. By displaying the arrow 811 and the arrow 813 on the display screen 800a and the display screen 800b, the robot 10 enables the user around the robot 10 to accurately recognize the direction in which the operator is looking and to feel the intention of the operator.

In another example, the image 810 includes, instead of the arrow 811 and the arrow 813, points whose positions indicate the directions. In still another example, the image 810 includes, instead of the arrow 811 and the arrow 813, an icon(s) of an eye and/or a neck, so that the user can intuitively recognize the directions. In still another example, the robot 10 informs the user around the robot 10 of the direction in which the operator is looking by using a notification device such as the indicator lamps 160, as the robot 10c3 illustrated in FIG. 10C.

Variations of Embodiment

A description is now given of a remote control system 1b, according to a variation of the embodiment. In the variation, the same reference numbers are allocated to elements (members or components) having the same function as those of the above-described embodiment, and redundant description thereof is omitted below. In the remote control system 1b according to the variation of the embodiment, an information processing server 70 generates a display image to be displayed on the display terminal 50.

System Configuration:

FIG. 44 is a diagram illustrating an example of a system configuration of the remote control system 1b, according to a variation of the embodiment. As illustrated in FIG. 44, the remote control system 1b according to the variation of the embodiment includes the information processing server 70 in addition to the configuration illustrated in FIG. 1. The information processing server 70 is communicably connected to the robots 10, the display terminal 50, and the communication management server 90 through a communication network 9. The information processing server 70 exchanges image data with the robot 10 or the display terminal 50 using a communication session established by the communication management server 90. The information processing server 70 performs image processing on spherical image data and detailed image data transmitted from the robot 10 according to a state of the robot 10, and transmits the processed data to the display terminal 50. The information processing server 70 is an example of an output control apparatus. In one example, the information processing server 70 is configured as a single computer. In another example, the information processing server 70 is configured as a plurality of computers to which divided units (functions, means, or storages) are arbitrarily allocated.

In this variation, the information processing server 70 and the communication management server 90 constitute a server system 7. In another example, the server system 7 is configured as a single computer including the units (functions or means) of the information processing server 70 and the communication management server 90. In addition, the robot 10 and the server system 7 constitute a site control system 3. Further, the display terminal 50 and the server system 7 constitute a display control system 5.

Since the hardware configuration of the information processing server 70 is the same or substantially the same as the hardware configuration of the communication management server 90 as illustrated in FIG. 13, a redundant description thereof is omitted below. In the following description, it is assumed that the information processing server 70 has the hardware configuration as illustrated in FIG. 13.

Figure 45:
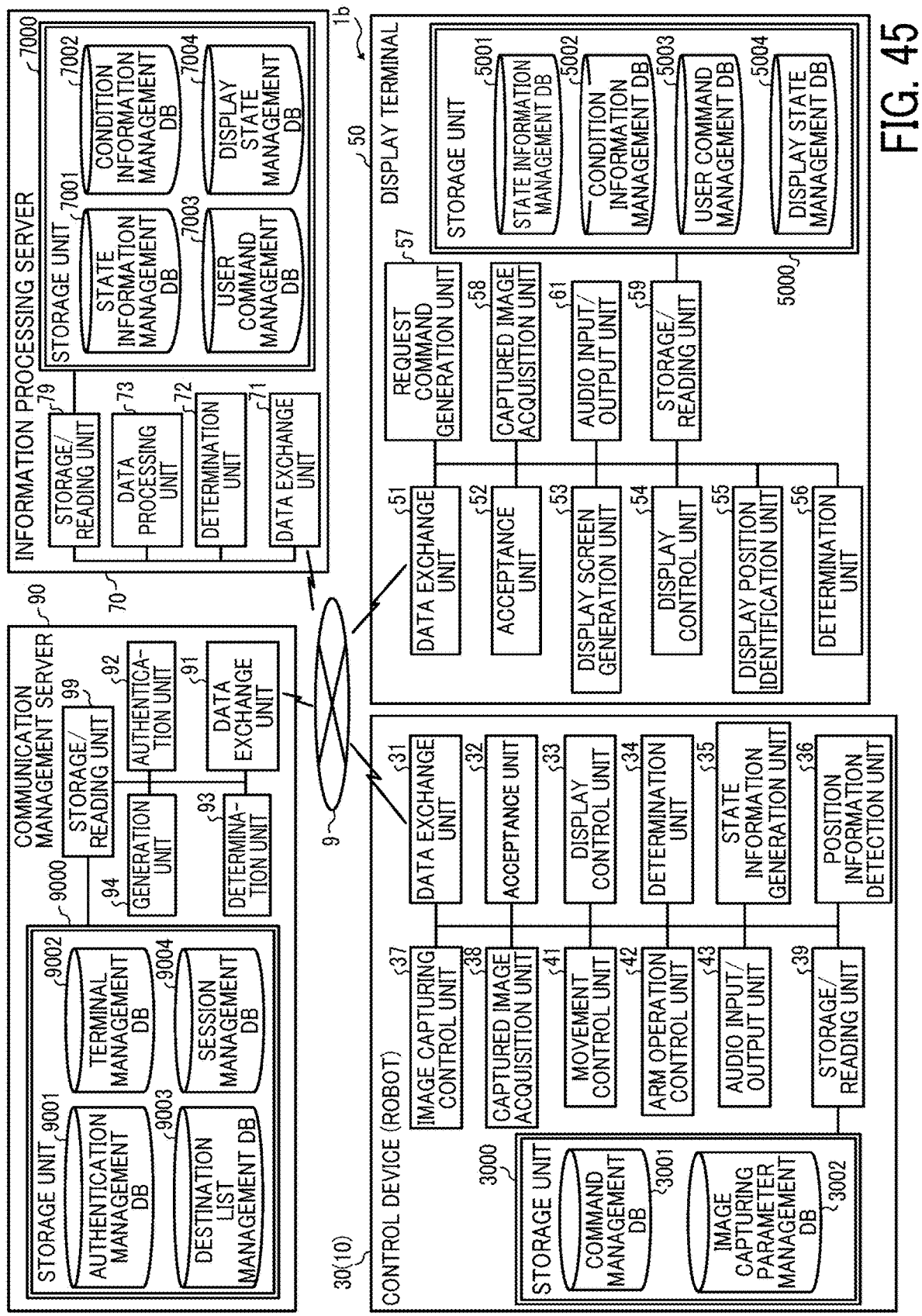
FIG. 45 is a diagram illustrating an example of a functional configuration of the remote control system, according to a variation of an embodiment of the present disclosure.

Functional Configuration:

FIG. 45 is a diagram illustrating an example of a functional configuration of the remote control system 1b, according to a variation of the embodiment. Since the functions of apparatuses, terminals, and servers other than the information processing server 70 are the same or substantially the same as the functions as illustrated in FIG. 20, redundant descriptions thereof are omitted below.

The information processing server 70 includes a data exchange unit 71, a determination unit 72, a data processing unit 73, and storage/reading unit 79. These units are functions that are implemented by or that are caused to function by operating any of the elements illustrated in FIG. 13 in cooperation with instructions of the CPU 901 according to the control program expanded to the RAM 903. The information processing server 70 further includes a storage unit 7000, which is implemented by the ROM 902, the HD 904, or the storage medium 906 illustrated in FIG. 13.

The data exchange unit 71, which is implemented by instructions of the CPU 901 and by the network I/F 908 illustrated in FIG. 13, has a function of transmitting and receiving various types of data or information to and from other apparatuses through the communication network 9. For example, the data exchange unit 71 receives spherical image data and detailed image data from the robot 10 (control device 30) through the communication network 9. Further, for example, the data exchange unit 71 receives the state information 170 indicating the state of the robot 10 from the robot 10 (control device 30) through the communication network 9. Further, for example, the data exchange unit 71 transmits display screen data generated by the data processing unit 73 to the display terminal 50 through the communication network 9 to output the display screen data.

The determination unit 72, which is implemented by instructions of the CPU 901 illustrated in FIG. 13, has a function of making various determinations. The data processing unit 73 is implemented by instructions of the CPU 901 illustrated in FIG. 13. The data processing unit 73 has a function of generating display screen data to be displayed by the display terminal 50, based on various image data received by the data exchange unit 71. Further, the data processing unit 73 has a function of generating a request command, which is an execution request for causing the robot 10 to execute a particular processing.

The storage/reading unit 79, which is implemented by instructions of the CPU 901 illustrated in FIG. 13, has a function of storing various data in the storage unit 7000, and reads various data from the storage unit 7000. In the storage unit 7000, a state information management DB 7001, a condition information management DB 7002, a user command management DB 7003, and a display state management DB 7004 are stored. Since the state information management DB 7001, the condition information management DB 7002, the user command management DB 7003, and the display state management DB 7004 have the same or substantially the same configurations as the state information management DB 5001, the condition information management DB 5002, the user command management DB 5003, and the display state management DB 5004 of the display terminal 50, respectively, redundant descriptions thereof are omitted below. The storage unit 7000 further stores spherical image data and detailed image data received by the data exchange unit 71. In one example, a spherical image data item and a detailed image data item stored in the storage unit 7000 are deleted when a predetermined time period has elapsed since the data items are received by the data exchange unit 71. In another example, a spherical image data item and a detailed image data item stored in the storage unit 7000 are deleted when a predetermined time period has elapsed since the data items are transmitted (output) to the display terminal 50 by the data exchange unit 71.

Processes or Operation of Variation of Embodiment

Figure 46:
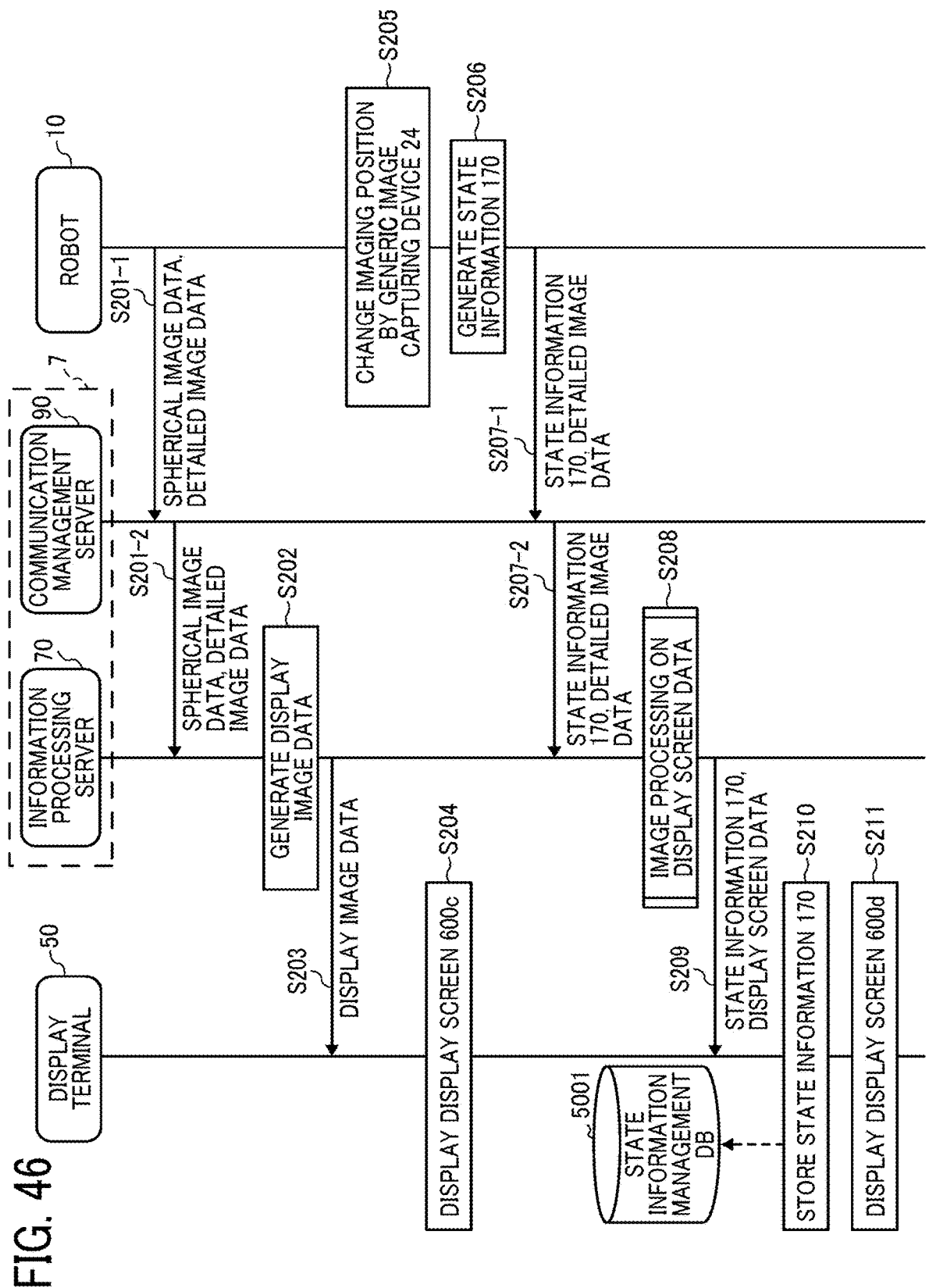
FIG. 46 is a sequence diagram illustrating an example of operation of transmitting various data from the robot to the display terminal in the remote control system, according to a variation of an embodiment of the present disclosure.
Figure 47:
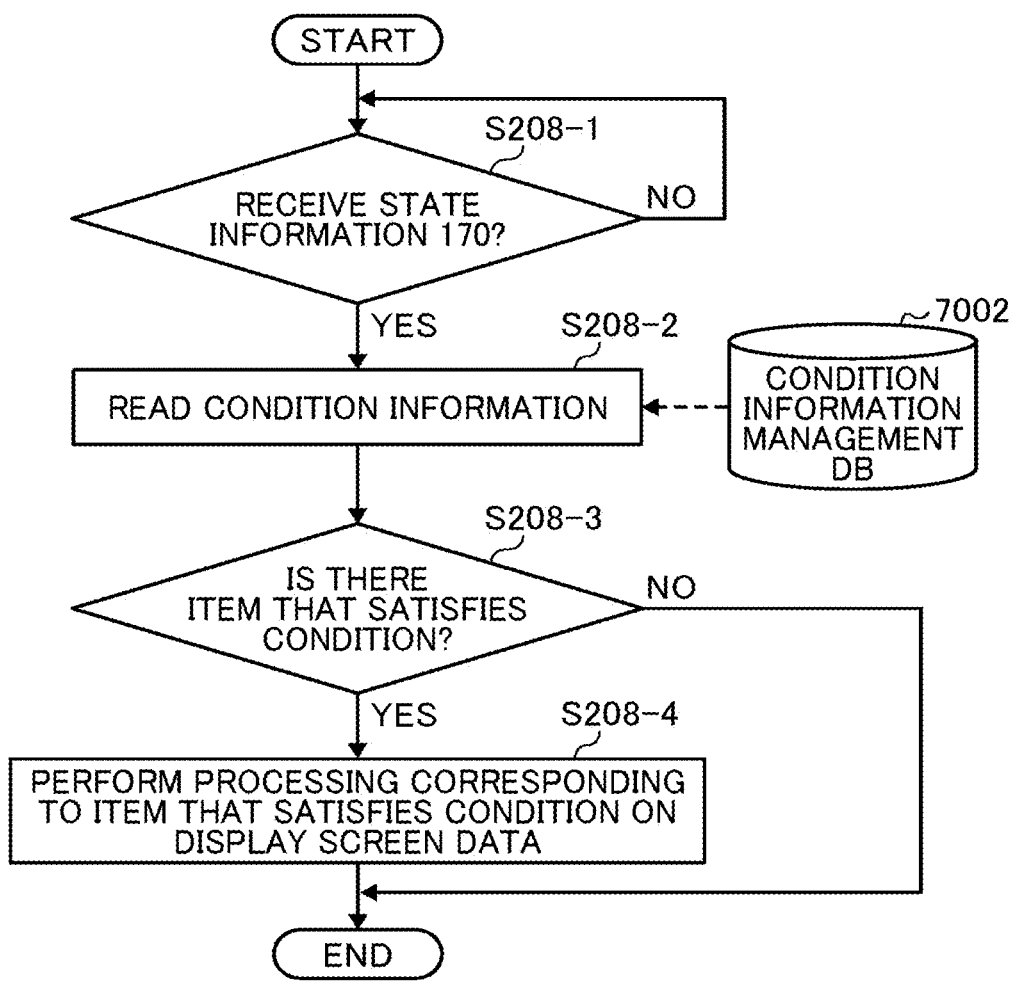
FIG. 47 is a flowchart illustrating an example of an operation of performing image processing on the display screen data, performed by an information processing server, according to a variation of an embodiment of the present disclosure.

A description is now given of processes or operation performed by the remote control system 1*b*, according to a variation of the embodiment, with reference to FIG. 46 and FIG. 47. In the following description provided with reference to FIG. 46 and FIG. 47, processes performed by the control device 30 of the robot 10 are described as processes performed by the robot 10. FIG. 46 is a sequence diagram illustrating an example of operation of transmitting various data from the robot 10 to the display terminal 50 in the remote control system 1*b*, according to the variation of the embodiment.

First, the data exchange unit 31 of the robot 10 transmits, to the information processing server 70, spherical image data acquired by the special image capturing device 21 and detailed image data acquired by the generic image capturing device 24 (step S201-1, step S201-2). Thereby, the data exchange unit 71 of the information processing server 70 receives the spherical image data and the detailed image data transmitted from the robot 10.

Next, the data processing unit 73 of the information processing server 70 generates display screen data representing a display screen to be displayed by the display terminal 50, by using the spherical image data and the detailed image data received by the data exchange unit 71 (step S202). The display screen represented by the display screen data generated by the data processing unit 73 is, for example, the display screen 600*c* as illustrated in FIG. 39A. In another example, the display screen represented by the display screen data generated by the data processing unit 73 is the display screen 600*a* illustrated in FIG. 30 or the display screen 600*b* illustrated in FIG. 32. Then, the data exchange unit 71 of the information processing server 70 transmits the display screen data generated by the data processing unit 73 to the display terminal 50 (step S203). Thereby, the data exchange unit 51 of the display terminal 50 receives the display screen data transmitted from the information processing server 70.

Then, the display control unit 54 controls the display 511 to display the display screen 600*c* represented by the display screen data received in step S203 (step S204). This enables the operator, who operates the robot 10 using the display terminal 50, to check a situation of the site where the robot 10 is located while viewing the display screen 600*c* on which the spherical image is displayed.

Next, the robot 10 changes the imaging position of the generic image capturing device 24 based on a request command or the like transmitted from the display terminal 50 (step S205). The state information generation unit 35 generates the state information 170 indicating the state of the robot 10 based on the drive state of the movement mechanism 17 acquired from the movement control unit 41 (step S206). The processes of step S205 and step S206 are performed in the same or substantially the same manner as step S83 and step S84 described above with reference to FIG. 38, and therefore redundant descriptions thereof are omitted below.

Then, the data exchange unit 31 transmits the state information 170 generated by the state information generation unit 35 and the detailed image data acquired by the captured image acquisition unit 38 to the information processing server 70 (step S207-1, step S207-2). Thereby, the data exchange unit 71 of the information processing server 70 receives the state information 170 and the detailed image data. The data processing unit 73 of the information processing server 70 performs image processing on the display screen data generated in step S202 based on the state information 170 and the detailed image data received by the data exchange unit 71 (step S208). A description is now given of contents of the image processing performed by the information processing server 70. FIG. 47 is a flowchart illustrating an example of an operation of performing image processing on the display screen data, performed by the information processing server 70, according to the variation of the embodiment.

When the data exchange unit 71 receives the state information 170 transmitted from the robot 10 (YES in step S208-1), the operation proceeds to step S208-2. By contrast, when the data exchange unit 71 receive no state information 170 (NO in step S208-1), the process of step S208-1 is repeated.

The storage/reading unit 79 reads the condition information stored in the condition information management DB 7002 (step S208-2). Next, the determination unit 72 searches the condition information read by the storage/reading unit 79, to determine whether there is any item satisfying the conditions indicated in the condition information among the variables indicated in the state information 170 received in step S207-2 (step S208-3*a*). Then, when the determination unit 72 determines that there is any item satisfying the condition indicated in the condition information among the variables indicated in the state information 170 (YES in step S208-3), the operation proceeds to step S208-4. For example, when the imaging position of the generic image capturing device 24 indicated by the numerical values (parameters) of the variable names "CAMERA_H_ANGLE", "CAMERA_V_ANGLE" and "CAMERA_ZOOM" included in the state information 170 is close to the display position of the spherical image, the determination unit 72 determines that the corresponding condition is satisfied. By contrast, when the determination unit 72 determines that there is no item satisfying the condition indicated in the condition information among the variables indicated in the state information 170 (NO in step S208-3), the operation ends.

Next, the data processing unit 73 performs processing corresponding to the item identified as satisfying the condition in step S208-3 on the display screen data generated in step S202 (step S208-4). For example, when the imaging position of the generic image capturing device 24 is close to the display position of the spherical image, the data processing unit 73 generates display screen data representing the display screen (600*d*) displaying a detailed image represented by the detailed image data received in step S207-2.

Referring again to FIG. 46, the data exchange unit 71 of the information processing server 70 transmits the state information 170 received by the data exchange unit 71 and the display screen data generated by the data processing unit 73 to the display terminal 50 (step S209). Thereby, the data exchange unit 51 of the display terminal 50 receives the state information 170 and the display screen data, both being transmitted from the information processing server 70.

The storage/reading unit 59 of the display terminal 50 stores the state information 170 received by the data exchange unit 51 in the state information management DB 5001 (see FIG. 22A) stored in the storage unit 5000 (step S210). Specifically, the storage/reading unit 59 stores each of the numerical values included in the received state information 170 in a field associated with the corresponding variable name of the state information management table, thereby updating the value of each item included in the state information management table. Then, the display control unit 54 controls the display 511 to display the display screen 600*d* represented by the display screen data received in step S209 (step S211).

As described heretofore, even when the information processing server 70 is used, the remote control system 1*b* according to the variation of the embodiment controls the display terminal 50 to switch the display between the spherical image and the detailed image according to the condition. This allows the user to check the state of the remote site efficiently and with high accuracy, thereby improving operability for the user.

As described heretofore, an output control apparatus (e.g., the display terminal 50 or the information processing server 70) according to an embodiment of the present disclosure is communicable with the control device 30 (an example of a communication apparatus) through the communication network 9, the control device 30 including the special image capturing device 21 (an example of first image capturing means) configured to capture an image of a subject at a remote site to acquire a spherical image (an example of a first image) and the generic image capturing device 24 (an example of second image capturing means) configured to capture a part of the subject to acquire a detailed image (an example of a second image). The output control apparatus receives the spherical image transmitted from the control device 30, outputs the received spherical image so as to be displayed on the display 511 (an example of a display unit), and receives the detailed image, which is obtained by capturing an image of a part of the subject corresponding to the display position of the spherical image displayed on the display 511, from the control device 30. Further, the output control apparatus outputs the received detailed image so as to be displayed on the display 511, and controls the display 511 to display the output spherical image and detailed image. Thus, the output control apparatus according to an embodiment of the present disclosure controls the display position of the spherical image and the imaging position of the generic image capturing device 24 to link with each other, thereby enabling the user to seamlessly recognize the entire remote site and an area where the user has interest to details. Therefore, the output control apparatus improves both the operability and the resolution of the display image, while displaying images acquired by different types of imaging means in a suitable manner for viewing by a user.

Further, when the display position of the spherical image (an example of the first image) displayed on the display 511 (an example of the display unit) is changed, the output control apparatus (e.g., the display terminal 50 or the information processing server 70) according to an embodiment of the present disclosure receives, from the control device 30 (an example of the communication apparatus), the detailed image (an example of the second image), which is obtained by capturing an image of a part of the subject corresponding to the changed display position. Thus, the output control apparatus according to an embodiment of the present disclosure switch the display between the spherical image and the detailed image according to the condition, thereby allowing a user to check the state of the remote site efficiently and with high accuracy. This improves the operability for the user.

Furthermore, the output control apparatus (e.g., the display terminal 50 or the information processing server 70) according to an embodiment of the present disclosure outputs the received detailed image (an example of the second image) when the display position of the spherical image (an example of the first image) and the imaging position of the generic image capturing device 24 (an example of the second image capturing means) are within a predetermined range, and outputs the received spherical image when the display position of the spherical image and the imaging position of the generic image capturing device 24 are outside the predetermined range. Thus, the output control apparatus according to an embodiment of the present disclosure enables the user to view the spherical image to recognize the remote site until the imaging position of the detailed image catches up to the display position of the spherical image, and to view the detailed image to recognize more detailed information of the remote site when the imaging position of the detailed image catches up to the display position of the spherical image. This improves operability for the user.

Still further, when the display position of the spherical image (an example of the first image) is changed to a position that cannot be imaged by the generic image capturing device 24 (an example of the second image capturing means), the output control apparatus (e.g., the display terminal 50 or the information processing server 70) according to an embodiment of the present disclosure generates the display screen 600*e* in which the image 655 (an example of an unacquirable image) indicating that the detailed image (an example of the second image) cannot be acquired is superimposed on the spherical image, and outputs the generated display screen 600*e* so as to be displayed on the display 511 (an example of the display unit). Thus, when the display position of the spherical image is changed to a position that cannot be imaged by the generic image capturing device 24, the output control apparatus according to an embodiment of the present disclosure allows the user to intuitively recognize a situation where the spherical image cannot be switched to the detailed image.

Still further, the output control apparatus (e.g., the display terminal 50 or the information processing server 70) according to an embodiment of the present disclosure displays a display screen (e.g., the display screen 600*b*, the display screen 600*c*, or the display screen 600*f*) in which the imaging position icon 653 (an example of an imaging position image) indicating the imaging position by the generic image capturing device 24 (an example of the second image capturing means) is superimposed on the spherical image (an example of the first image). Thus, the user recognizes the imaging position of the generic image capturing device 24 by viewing the imaging position icon 653 displayed on the display screen until the imaging position by the generic image capturing device 24 catches up to the display position of the spherical image. This enables the user to predict the timing when the spherical image is switched to the detailed image.

Still further, the output control apparatus (e.g., the display terminal 50 or the information processing server 70) according to an embodiment of the present disclosure, generates a display screen (e.g., the display screen 600b, the display screen 600c, the display screen 600e, or the display screen 600f) in which the drive direction icon 651b (an example of a drive direction image) indicating the drive direction of the robot 10 (an example of a mobile object) located at a remote site is superimposed on the spherical image (an example of a wide-angle image). Thus, even when the user changes the display position (e.g., the viewable area T) of the spherical image by an operation of changing the display direction of the spherical image or enlarging or reducing the spherical image, the drive direction icon 651b is displayed on the display screen. This enables the user to recognize the state (direction or drive direction) of the robot 10.

Still further, in the output control apparatus (e.g., the display terminal 50 or the information processing server 70) according to an embodiment of the present disclosure, the spherical image (an example of the wide-angle image) is represented as a solid sphere (e.g., the solid sphere CS) in a three-dimensional virtual space. The output control apparatus arranges the object 651a (an example of an object image) indicating the position of the robot 10 (an example of a mobile object) located at a remote site at the center position of the three-dimensional virtual space, and generates, as a display screen (e.g., the display screen 600b, the display screen 600c, the display screen 600e, or the display screen 600f), an image viewed from a virtual camera IC provided at a position of a viewpoint from which the spherical image is viewed, the virtual camera being arranged upward and rearward from the center position. Thus, the output control apparatus according to an embodiment of the present disclosure arranges the virtual camera IC at a position apart from the center position of the three-dimensional virtual space (solid sphere CS) having a spherical shape, and sets the position where the virtual camera IC is arranged as the origin of the field of view, thereby bringing the existence of the robot 10 (the object 651a) within the field of view of the virtual camera IC. Further, this enables the user of the display terminal 50 to recognize both the existence of the robot 10 (the object 651a) and the spherical image (e.g., the viewable-area image Q) at the same time from a so-called pseudo third-person view, thereby enabling the user to recognize the situation of the site smoothly and improving operability of the robot 10.

Still further, when the display position of the spherical image (an example of the first image) is changed, the output control apparatus (e.g., the display terminal 50 or the information processing server 70) according to an embodiment of the present disclosure generates an image viewed from the virtual camera IC whose position is changed so that the object 651a (an example of the object image) is viewable as a display screen (e.g., the display screen 600b, the display screen 600c, the display screen 600e, or the display screen 600f). Thus, the output control apparatus according to an embodiment of the present disclosure enables the user to recognize the presence of the robot (the object 651a), even when the display position (e.g., the viewable area T) of the spherical image is changed.

Still further, the output control apparatus according to an embodiment of the present disclosure is the display terminal 50 communicable with the control device 30 (an example of the communication apparatus) through the communication network 9. The display terminal 50 displays the received spherical image (an example of the first image) on the display 511 (an example of the display unit), changes the display position of the displayed spherical image, and transmits, to the control device 30, a change request for requesting to change the imaging position of the generic image capturing device 24 (an example of the second image capturing means) to the changed display position. Further, the display terminal 50 receives the detailed image (an example of the second image) that is acquired by the generic image capturing device 24 in response to the transmitted change request, and displays the received detailed image on the display 511 together with the spherical image. Thus, the display terminal 50 controls the display position of the spherical image and the imaging position of the generic image capturing device 24 to link with each other, thereby enabling the user to seamlessly recognize the entire remote site and an area where the user has interest to details. Therefore, the display terminal 50 improves both the operability and the resolution of the display image, while displaying images acquired by different types of imaging means in a suitable manner for viewing by the user.

Moreover, when the display position of the spherical image (an example of the first image) and the imaging position of the generic image capturing device 24 (an example of the second image capturing unit) are within a predetermined range, the display terminal 50 according to an embodiment of the present disclosure displays the acquired detailed image (an example of the second image) on the display 511 (an example of the display unit), and when the display position of the spherical image and the imaging position of the generic image capturing device 24 are outside the predetermined range, the display terminal 50 according to an embodiment of the present disclosure displays the acquired spherical image on the display 511. Thus, the display terminal 50 enables the user to view the spherical image to recognize the remote site until the imaging position of the detailed image catches up to the display position of the spherical image, and to view the detailed image to recognize more detailed information of the remote site when the imaging position of the detailed image catches up to the display position of the spherical image. This improves operability for the user.

Furthermore, the robot 10 according to an embodiment of the present disclosure is a mobile object communicable with the output control apparatus (e.g., the display terminal 50 or the information processing server 70) through the communication network 9, and includes the control device 30 (an example of the communication apparatus), the movement mechanism 17 that moves the robot 10, and plural generic image capturing devices 24 (an example of the second image capturing means) whose imaging direction is changeable. The robot 10 transmits the detailed image (an example of the second image) acquired by any of the plural generic image capturing devices 24 to the output control apparatus. This enables the robot 10 to reduce blind spots such as the ceiling or the floor in the image capturing by the generic image capturing device 24.

Still further, the robot 10 (an example of the mobile object) according to an embodiment of the present disclosure includes display means (e.g., the display 150 or the indicator lamps 160) configured to indicate the direction in which the user is looking at the spherical image (an example of the first image). Still further, the robot 10 receives a captured image obtained by capturing the user from the output control apparatus (e.g., the display terminal 50 or the information processing server 70), and the display 150 (an example of the display unit) displays the received captured image (e.g., the display screen 800). Still further, at least one of the indicator lamps 160 of the robot 10 is turned on indicating the direction in which the user of the display terminal 50 is looking at the spherical image. Thus, the robot 10 enables the user who is at the site where the robot 10 is located to recognize who is operating the robot 10 and the direction the operator is looking at.

Further, the display terminal 50 according to an embodiment of the present disclosure performs streaming communication with the control device 30 (an example of the communication apparatus) including the special image capturing device 21 (an example of image capturing means) configured to capture an image of a subject at a remote site, to communicate the spherical image (an example of a wide-angle image) captured by the special image capturing device 21. The display terminal 50 includes the display control unit 54 (an example of display control means) that controls the display 511 (an example of the display unit) to display a predetermined area (e.g., the viewable area T), which is a part of the spherical image transmitted from the control device 30, and the mouse 500 (an example of external input means) that is connected to the display terminal 50 and controls the display of the spherical image displayed on the display 511. The display control unit 54 changes the predetermined area, which is a part of the spherical image, to be displayed on the display 511 according to the movement of the mouse 500. Thus, the display terminal 50 changes an area, which is a part of the spherical image, to be displayed on the display 511 according to the movement of the mouse 500, thereby improving operability when the user checks the situation of the remote site while viewing the spherical image.

Still further, the display terminal 50 according to an embodiment of the present disclosure further includes the acceptance unit 52 (an example of detection means) configured to detect a movement of the mouse 500 (an example of the external input means). The display control unit 54 (an example of the display control means) of the display terminal 50 controls the display 511 (an example of the display unit) to display a first area, which is a part of the spherical image (an example of the wide-angle image), and in response to detection of the movement of the mouse 500, controls the display 511 to display a second area, which is a part of the spherical image and an area different from the first area. Thus, the display terminal 50 controls the display 511 to display an image indicating the different area, which is a part of the spherical image, according to the movement of the mouse 500, thereby improving operability when the user checks the situation of the remote site while viewing the spherical image.

Still further, the display terminal 50 according to an embodiment of the present disclosure further includes a display position identification unit 55 (an example of calculation means) configured to calculate the movement amount of the mouse 500 (an example of the external input means). The display control unit 54 (an example of the display control means) of the display terminal 50 controls the display 511 to display the second area, which is away from the center of the first area displayed on the display 511 by a distance corresponding to the calculated movement amount. Thus, the display terminal 50 changes the display position of the spherical image according to the movement amount of the mouse 500 instead of the movement amount of the mouse cursor, thereby smoothly displaying an image of the position that the user wants to view independent of the screen size or the like of the display 511.

The related art does not mention how to output images acquired by different types of cameras (imaging means). Thus, depending on how the images are output, there is a drawback that a user may not check information on a remote site in the user's desired manner.

According to one or more embodiments of the present disclosure, images acquired by different types of imaging device are displayed in a suitable manner for viewing by a user.

Supplementary Information on Embodiments

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Further, the various tables of the embodiment described above may be generated by the learning effect of machine learning. By classifying data of the associated items, the use of the tables is optional. In the present disclosure, machine learning is a technique that enables a computer to acquire human-like learning ability. Machine learning refers to a technology in which a computer autonomously generates an algorithm required for determination such as data identification from learning data loaded in advance, and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

Although the output control apparatus, the display terminal, the remote control system, the control method, and the program according to embodiments of the present disclosure are described above, the above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. A display terminal communicable with a communication apparatus including an image capturing device configured to capture an image of a subject, the communication apparatus being provided in a mobile object located at a remote site, the display terminal comprising:
   circuitry configured to
      receive, from the mobile object, state information indicating a movement state of the mobile object;
      receive a wide-angle image captured by the image capturing device of the communication apparatus;
      transmit, to the mobile object, a request for changing an image quality of the wide-angle image, based on the received state information of the mobile object;
      control a display to display an area of the wide-angle image, the wide-angle image being represented as a solid sphere in a three-dimensional virtual space;
      change a position of a virtual camera, provided at a position of a viewpoint from which the wide-angle image is viewed, in accordance with movement of an external input device coupled to the display terminal to change the area displayed on the display;

generate a display image in which an object image, indicating a position of the mobile object, is superimposed on the wide-angle image;

locate the object image at a center position of the three-dimensional virtual space; and control the display to display the display image, wherein the circuitry generates the display image as being viewed from the virtual camera which is at a position away from the center position.

2. The display terminal of claim 1, wherein the circuitry is further configured to detect the movement of the external input device, control the display to display a first image indicating a first area of the wide-angle image, and control the display to display a second image, indicating a second area of the wide-angle image and the second area being different from the first area, instead of the first image, in response to detecting the movement of the external input device.

3. The display terminal of claim 2, wherein the circuitry is further configured to calculate a movement amount of the external input device, and control the display to display the second image indicating the second area, and the second area is away from a center of the first area displayed on the display by a distance corresponding to the calculated movement amount.

4. The display terminal of claim 1, wherein the circuitry generates, as the display image, an image viewed from the virtual camera which is provided behind the center position so that the object image is viewable.

5. The display terminal of claim 1, wherein in response to a change of the area displayed on the display, the circuitry generates, as the display image, an image viewed from the virtual camera whose position is changed so that the object image is viewable.

6. The display terminal of claim 1, wherein the circuitry generates the display image in which a drive direction image indicating a drive direction of the mobile object is superimposed on the wide-angle image.

7. The display terminal of claim 6, wherein the circuitry is further configured to locate the drive direction image in the three-dimensional virtual space and generates an image viewed from the virtual camera as the display image.

8. A remote control system, comprising:

the display terminal of claim 1; and the mobile object, including:

the communication apparatus; and a first display configured to indicate a direction in which a user of the display terminal is looking at the wide-angle image.

9. The remote control system of claim 8, wherein the mobile object further includes second circuitry configured to receive, from the display terminal, a captured image obtained by capturing a user of the display terminal, and the first display displays the received captured image.

10. The remote control system according to claim 8, wherein the first display is one of a convex display and a flat display provided at a front side and at a rear side of the mobile object.

11. The remote control system of claim 8, wherein the first display includes an indicator lamp configured to turned on indicating a direction in which the user of the display terminal is looking at the wide-angle image.

12. The remote control system of claim 8, wherein the first display is provided on an exterior of the mobile object.

13. A display control method performed by a display terminal communicable with a communication apparatus including an image capturing device configured to capture an image of a subject, the communication apparatus being provided in a mobile object located at a remote site, the display control method comprising:

receiving, from the mobile object, state information indicating a movement state of the mobile object;

receiving a wide-mule image captured by the image capturing device of the communication apparatus;

transmitting, to the mobile object, a request for changing an image quality of the wide-angle image, based on the received state information of the mobile object;

controlling a display to display an area of the wide-angle image, the wide-angle image being represented as a solid sphere in a three-dimensional virtual space;

changing a position of a virtual camera, provided at a position of a viewpoint from which the wide-angle image is viewed, in accordance with movement of an external input device that is coupled to the display terminal to change the area displayed on the display;

generating a display image in which an object image, indicating a position of the mobile object, is superimposed on the wide-angle image;

locating the object image at a center position of the three-dimensional virtual space; and controlling the display to display the display image, wherein the generating includes generating the display image as being viewed from the virtual camera which is at a position away from the center position.

14. The display control method of claim 13, further comprising:

detecting the movement of the external input device;

controlling the display to display a first image indicating a first area of the wide-angle image; and controlling the display to display a second image, indicating a second area of the wide-angle image and the second area being different from the first area, instead of the first image, in response to detecting the movement of the external input device.

15. The display control method of claim 14, further comprising:

calculating a movement amount of the external input device; and controlling the display to display the second image indicating the second area, wherein the second area is away from a center of the first area displayed on the display by a distance corresponding to the calculated movement amount.

16. A non-transitory computer-readable medium storing computer executable instructions which, when executed by a display terminal communicable with a communication apparatus including an image capturing device configured to capture an image of a subject, the communication apparatus being provided in a mobile object located at a remote site, cause the display terminal to:

receive, from the mobile object, state information indicating a movement state of the mobile object;

receive a wide-angle image captured by the image capturing device of the communication apparatus;

transmit, to the mobile object, a request for changing an image quality of the wide-angle image, based on the received state information of the mobile object;
control a display to display an area of the wide-angle image, the wide-angle image being represented as a solid sphere in a three-dimensional virtual space;
change a position of a virtual camera, provided at a position of a viewpoint from which the wide-angle image is viewed, in accordance with movement of an external input device that is coupled to the display terminal to change the area displayed on the display;
generate a display image in which an object image, indicating a position of the mobile object, is superimposed on the wide-angle image;
locate the object image at a center position of the three-dimensional virtual space; and
control the display to display the display image, wherein the display image is generated as being viewed from the virtual camera which is at a position away from the center position.

* * * * *